(12) United States Patent
Faulkner et al.

(10) Patent No.: US 11,615,596 B2
(45) Date of Patent: Mar. 28, 2023

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Jeffrey M. Faulkner, San Francisco, CA (US); Stephen O. Lemay, Palo Alto, CA (US); William A. Sorrentino, III, Mill Valley, CA (US); Jonathan Ive, San Francisco, CA (US); Kristi E. S. Bauerly, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/483,722

(22) Filed: Sep. 23, 2021

(65) Prior Publication Data

US 2022/0092862 A1 Mar. 24, 2022

Related U.S. Application Data

(60) Provisional application No. 63/082,933, filed on Sep. 24, 2020.

(51) Int. Cl.
*G06T 7/20* (2017.01)
*G06T 19/00* (2011.01)
(Continued)

(52) U.S. Cl.
CPC ............ *G06T 19/006* (2013.01); *G06T 7/20* (2013.01); *G06T 7/70* (2017.01); *G06V 20/41* (2022.01); *G06V 40/10* (2022.01)

(58) Field of Classification Search
CPC .......... G06T 19/006; G06T 7/70; G06T 7/20; G06V 40/10; G06V 20/41
(Continued)

(56) References Cited

U.S. PATENT DOCUMENTS 5,528,735 A 6/1996 Strasnick et al.
5,671,381 A 9/1997 Strasnick et al.
(Continued)

FOREIGN PATENT DOCUMENTS

JP 2002073246 A 3/2002
WO WO 2013/180966 A1 12/2013
(Continued)

OTHER PUBLICATIONS

International Search Report and Written Opinion, dated Apr. 26, 2022, received in International Patent Application No. PCT/US2021/065537, which corresponds with U.S. Appl. No. 17/563,864, 19 pages.
(Continued)

*Primary Examiner* — Jin Ge
(74) *Attorney, Agent, or Firm* — Morgan, Lewis & Bockius LLP

(57) ABSTRACT

A computer system, while displaying a view of a computer-generated environment, detects movement of a physical object, and in response: in accordance with a determination that a user is within a threshold distance of a first portion of the physical object and that the physical object meets preset criteria, the computer system changes an appearance of virtual content displayed at a position corresponding to a current location of the physical object's first portion, without changing an appearance of virtual content displayed at a position corresponding to the physical object's second portion; and in accordance with a determination that the user is within the threshold distance and that the physical object does not meet the preset criteria, the computer system changes an appearance of virtual content displayed at a position corresponding to a current location of the physical object's first portion.

45 Claims, 19 Drawing Sheets

(51) Int. Cl.
  *G06T 7/70*  (2017.01)
  *G06V 20/40*  (2022.01)
  *G06V 40/10*  (2022.01)
(58) Field of Classification Search
  USPC .......................................................... 345/633
  See application file for complete search history.

(56) References Cited

U.S. PATENT DOCUMENTS

| | | | |
|---|---|---|---|
| 5,861,885 | A | 1/1999 | Strasnick et al. |
| 6,480,210 | B1 | 11/2002 | Martino et al. |
| 8,405,680 | B1 | 3/2013 | Cardoso Lopes et al. |
| 9,836,127 | B2 | 12/2017 | Jung |
| 10,261,595 | B1 | 4/2019 | Kin |
| 10,262,036 | B2 | 4/2019 | Paine et al. |
| 10,621,439 | B2 | 4/2020 | Fu |
| 10,725,308 | B1 * | 7/2020 | Trail ........................ G06F 3/012 |
| 11,086,475 | B1 | 8/2021 | Ravasz et al. |
| 11,436,828 | B1 | 9/2022 | Little et al. |
| 2010/0241525 | A1 | 9/2010 | Aguera y Arcas et al. |
| 2012/0047468 | A1 | 2/2012 | Santos et al. |
| 2012/0194554 | A1 | 8/2012 | Kaino |
| 2013/0050432 | A1 | 2/2013 | Perez et al. |
| 2014/0282220 | A1 | 9/2014 | Wantland et al. |
| 2015/0205484 | A1 | 7/2015 | Morishita et al. |
| 2016/0313790 | A1 | 10/2016 | Clement et al. |
| 2017/0343811 | A1 * | 11/2017 | Mese .................... G06T 19/006 |
| 2017/0345219 | A1 | 11/2017 | Holz |
| 2018/0095636 | A1 | 4/2018 | Valdivia et al. |
| 2018/0189354 | A1 | 7/2018 | Paine et al. |
| 2019/0026936 | A1 | 1/2019 | Gorur Sheshagiri et al. |
| 2019/0035124 | A1 * | 1/2019 | Kapinos ................ G06T 19/006 |
| 2019/0065027 | A1 | 2/2019 | Hauenstein et al. |
| 2019/0121517 | A1 | 4/2019 | Jackson et al. |
| 2019/0236835 | A1 | 8/2019 | Gorur Sheshagiri et al. |
| 2019/0362556 | A1 | 11/2019 | Ben-Dor et al. |
| 2020/0026922 | A1 * | 1/2020 | Pekelny ................ G06T 19/006 |
| 2020/0082555 | A1 | 3/2020 | Lyer et al. |
| 2020/0112711 | A1 * | 4/2020 | Enriquez ............... G06T 19/006 |
| 2021/0034222 | A1 * | 2/2021 | Brems ..................... G06F 3/165 |
| 2021/0096726 | A1 | 4/2021 | Faulkner et al. |
| 2021/0117712 | A1 | 4/2021 | Huang et al. |
| 2021/0233341 | A1 * | 7/2021 | Hayes ...................... G07C 9/20 |
| 2022/0091723 | A1 | 3/2022 | Faulkner et al. |
| 2022/0244835 | A1 | 8/2022 | Faulkner et al. |

FOREIGN PATENT DOCUMENTS

| | | |
|---|---|---|
| WO | WO 2019/067470 A1 | 4/2019 |
| WO | WO 2019/217163 A1 | 11/2019 |

OTHER PUBLICATIONS

Anonymous, "Micro-Gestures", https://web.archive.org/web/20190808194109/http://gestureml.org/doku.php/gestures/fusion/microgesture_index, Aug. 8, 2019, 5 pages.

Lang, "Microsoft is Adding Pass-through Video to Windows VR Headsets", http://www.roadtovr.com/microsoft-is-adding-pass-through-video-to-windows-vr-headsets, Jul. 27, 2018, 2 pages.

Microsoft HoloLens, "Gesture Input", https://www.youtube.com/watch?v=kwn9Lh0E_vU, Feb. 29, 2016, 3 pages.

Microsoft, "Introducing Instinctual Interactions", http://docs.microsoft.com/en-us/windows/mixed-reality/gestures, Apr. 11, 2019, 7 pages.

Soliman, "FingerInput: Capturing Expressive Single-Hand Thumb-to-Finger Microgestures" Proceedings of the 2018 ACM International Conference on Interactive Surfaces and Spaces, New York, Nov. 19, 2018, 4 pages.

Whitmire et al., DigiTouch: Reconfigurable Thumb-to-Finger Input and Text Extry on Head-Mounted Displayshttps://upicomplab.cs.washington.edu/pdfs/digitouch.pdf, Sep. 2017, 21 pages.

YouTube, "Envisioning the Future with Windows Mixed Reality", https://www.youtube.com/watch?v=2MqGrF6JaOM, Jun. 1, 2016, 4 pages.

YouTube, "Interactive Light Source Position Estimation for Augmented Reality with an RGB-D Camera", http://www.youtube.com/watch?v=1WHW4cOEe6c, Nov. 6, 2016, 3 pages.

YouTube, "Job Simulator Gameplay—Office Worker-HTC Vive", http://www.youtube.com/watch?v=jF6RzK50fDs, Apr. 6, 2016, 3 pages.

Office Action, dated Aug. 16, 2021, received in U.S. Appl. No. 17/030,200, 21 pages.

Invitation to Pay Additional Fees, dated Dec. 17, 2020, received in International Patent Application No. PCT/US2020/052640, which corresponds with U.S. Appl. No. 17/030,200, 18 pages.

International Search Report and Written Opinion, dated Feb. 8, 2021, received in International Patent Application No. PCT/US2020/052640, which corresponds with U.S. Appl. No. 17/030,200, 22 pages.

Crasto, et al., "The Smart Bookshelf: A Study of Camera Projector Scene Augmentation of an Everyday Environment", 2005 Seventh IEEE Workshops on Applications of Computer Vision, Los Alamitos, CA USA, Jan. 5, 2005, 8 pages.

Butz et al., "Searchlight_A_Lightweight_Search_Function_for_Pervasive_Environments", Springer-Verlag, Berlin/Heidelberg, Mar. 23, 2004, 3 pages.

Darzentas et al., "Designed to Thrill: Exploring the Effects of Multimodal Feedback on Virtual World Immersion", International Conference, ICB Proceedings; (Lecture Notes in Computer Science; Lect.notes Computer), Springer, Berlin, Heidelberg, Jul. 21, 2015, 30 pages.

Li Ming et al., "ProFi Design and Evaluation of a Product Finder in a Supermarket Scenario", proceedings of the 16th ACM International Conference on Modeling, Analysis & Simultation of Wireless and Mobile Systems, New York NY, Sep. 8, 2013, 8 pages.

Lu et al., "Attributes of Subtle Cues for Facilitating Visual Search in Augmented Reality", IEEE Transactions on Visualization and Computer Graphics, IEEE, USA, Mar. 21, 2014, 9 pages.

Mitsushita et al., "Interactive Bookshelf Surface for in Situ Book Searching and Storing Support", Proceedings of the 2nd Augmented Human International Conference, ACM, 2 Penn Plaza, Suite 701 New York NY 10121-0701, Mar. 13, 2011, 8 pages.

Notice of Allowance, dated Feb. 3, 2022, received in U.S. Appl. No. 17/030,200, 8 pages.

International Search Report and Written Opinion, dated Feb. 24, 2022, received in International Patent Application No. PCT/US2021/051976, which corresponds with U.S. Appl. No. 17/483,717, 57 pages.

International Search Report and Written Opinion, dated Mar. 14, 2022, received in International Patent Application No. PCT/US2021/052016, which corresponds with U.S. Appl. No. 17/483,722, 46 pages.

Office Action, dated Sep. 6, 2022, received in Indian Patent Application No. 202217011878, which corresponds with U.S. Appl. No. 17/030,200. 9 pages.

Notice of Allowance, dated Sep. 15, 2022, received in U.S. Appl. No. 17/483,717, 10 pages.

* cited by examiner

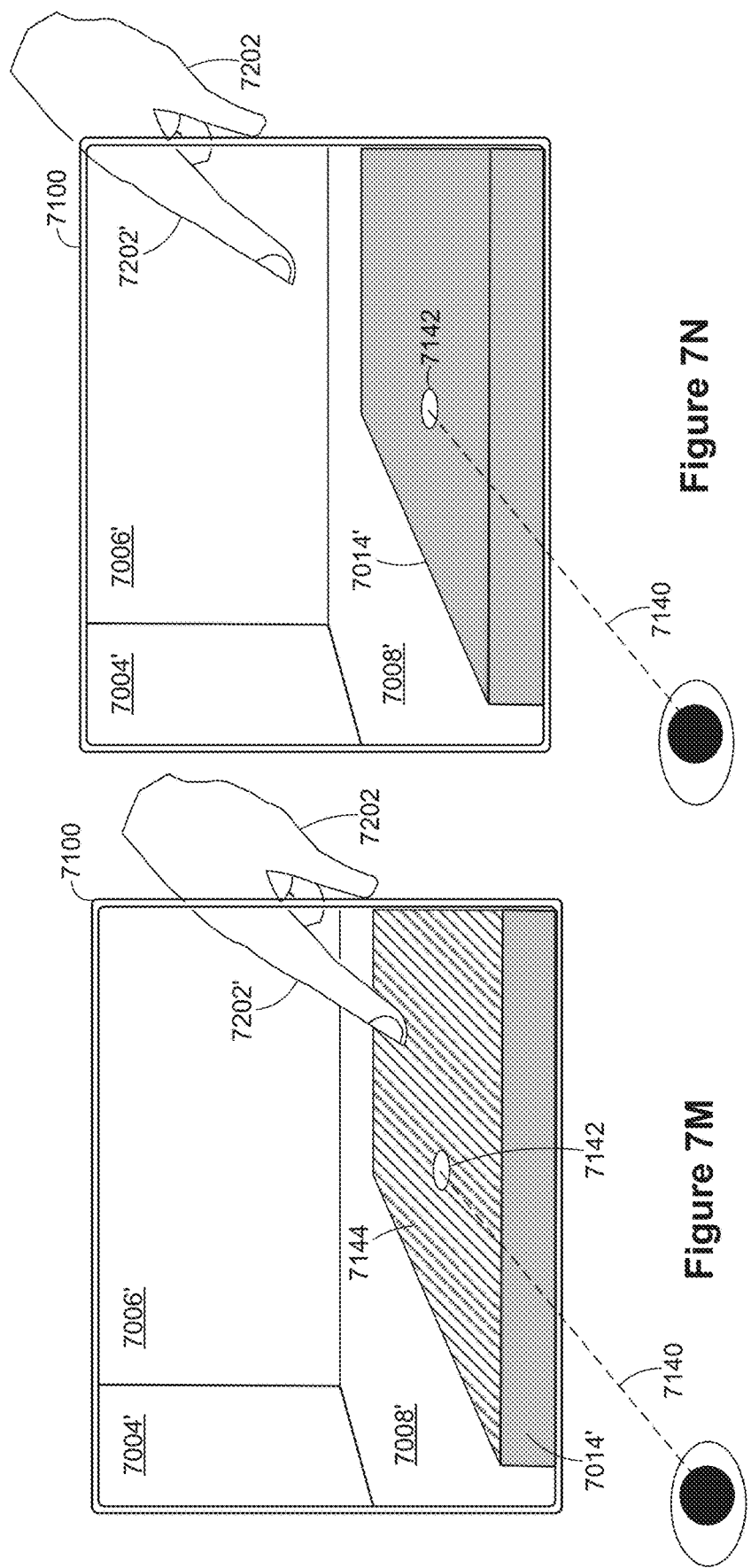

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Patent Application 63/082,933, filed Sep. 24, 2020, which is incorporated by reference in its entirety.

TECHNICAL FIELD

This disclosure relates generally to computer systems with a display generation component and one or more input devices that provide computer generated reality (CGR) experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

In accordance with some embodiments, a method is performed at a computer system that is in communication with a first display generation component, one or more audio output devices, and one or more input devices, including: displaying, via the first display generation component, a three-dimensional computer-generated environment; while displaying the three-dimensional computer-generated environment, detecting a first event that corresponds to a request to present first computer-generated content, wherein the first computer-generated content includes first visual content and first audio content corresponding to the first visual content; and in response to detecting the first event that corresponds to the request to present the first computer-generated content: in accordance with a determination that the first event corresponds to a respective request to present the first computer-generated content with a first level of immersion, wherein the first computer-generated content presented with the first level of immersion occupies a first portion of the three-dimensional computer-generated environment, displaying the first visual content within the first portion of the three-dimensional environment and outputting the first audio content using a first audio output mode; and in accordance with a determination that the first event corresponds to a respective request to present the first computer-generated content with a second level of immersion different from the first level of immersion, wherein the first computer-generated content presented with the second level of immersion occupies a second portion of the three-dimensional computer-generated environment that is greater than the first portion of the three-dimensional environment, displaying the first visual content within the second portion of the three-dimensional environment and outputting the first audio content using a second audio output mode that is different from the first audio output mode, wherein using the second audio output mode instead of the first audio output mode changes a level of immersion of the first audio content.

In accordance with some embodiments, a method is performed at a computer system that is in communication with a display generation component, including: displaying, via the display generation component, a view of a computer-generated environment; while displaying the computer-generated environment and while the computer-generated environment does not include a visual representation of a first portion of a first physical object present in a physical environment in which a user is located, detecting first movement of the first physical object in the physical environment; in response to detecting the first movement of the first physical object in the physical environment: in accordance with a determination that the user is within a threshold distance of the first portion of the first physical object and that the first physical object meets preset criteria, the preset criteria including a requirement related to a preset characteristic of the first physical object other than a distance of the first physical object from the user, changing an appearance of a portion of virtual content displayed at a position corresponding to a current location of the first portion of the first physical object, without changing an appearance of a portion of the virtual content displayed at a position corresponding to a second portion of the first physical object, wherein the first portion of the first physical object and the second portion of the physical object are both part of an extent of the first physical object that is potentially visible to the user based on the field of view of the user for the computer-generated environment; and in accordance with a determination that the user is within the threshold distance of the first physical object present in the physical environment surrounding the user and that the first physical object does not meet the preset criteria, forgoing changing an appearance of a portion of virtual content displayed at a position corresponding to a current location of the first portion of the first physical object.

In accordance with some embodiments, a method is performed at a computer system that is in communication with a first display generation component, and one or more input devices, including: displaying, via the first display generation component, a three-dimensional environment that includes a representation of a physical environment; while displaying the three-dimensional environment that includes the representation of the physical environment, detecting a user's hand touching a respective portion of the physical environment; in response to detecting that the user's hand is touching the respective portion of the physical environment: in accordance with a determination that the user's hand is touching a first portion of the physical environment, displaying a first visual effect at a location in the three-dimensional environment that corresponds to the first portion of the physical environment that has been identified based on a scan of the first portion of the physical environment; and in accordance with a determination that the user's hand is touching a second portion of the physical environment that is different from the first portion of the physical environment, displaying a second visual effect at a location in the three-dimensional environment that corresponds to the second portion of the physical environment that has been identified based on a scan of the second portion of the physical environment.

In accordance with some embodiments, a method is performed at a computer system that is in communication with a first display generation component, and one or more input devices, including: displaying, via the first display generation component, a view of a three-dimensional environment, wherein the view of the three-dimensional environment concurrently includes first virtual content and a representation of a first portion of a physical environment, the first portion of the physical environment includes a first physical surface, and the first virtual content includes a first user interface object that is displayed at a position in the three-dimensional environment corresponding to a location of the first physical surface within the first portion of the physical environment; while displaying the view of the three-dimensional environment, detecting a portion of a user at a first location within the first portion of the physical environment, wherein the first location is between the first physical surface and a viewpoint corresponding to the view of the three-dimensional environment; in response to detecting the portion of the user at the first location within the first portion of the physical environment, ceasing to display a first portion of the first user interface object while maintaining display of a second portion of the first user interface object so that a representation of the portion of the user is visible at a position that previously displayed the first portion of the first user interface object; and while displaying the view of the three-dimensional environment, detecting movement of the portion of the user from the first location to a second location within the first portion of the physical environment, wherein the second location is between the first physical surface and the viewpoint corresponding to the view of the three-dimensional environment; and in response to detecting the movement of the portion of the user from the first location to the second location, restoring display of the first portion of the first user interface object and ceasing to display the second portion of the first user interface object so that the representation of the portion of the user is visible at a position that previously displayed the second portion of the first user interface object.

In accordance with some embodiments, a computer system includes or is in communication with a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7I-7N are block diagrams that illustrate applying a visual effect to a region in a three-dimensional environment that corresponds to a portion of the physical environment that has been identified (e.g., characterized by a shape, plane, and/or surface) based on a scan of the portion of the physical environment, in accordance with some embodiments.

DESCRIPTION OF EMBODIMENTS

Figure 1:
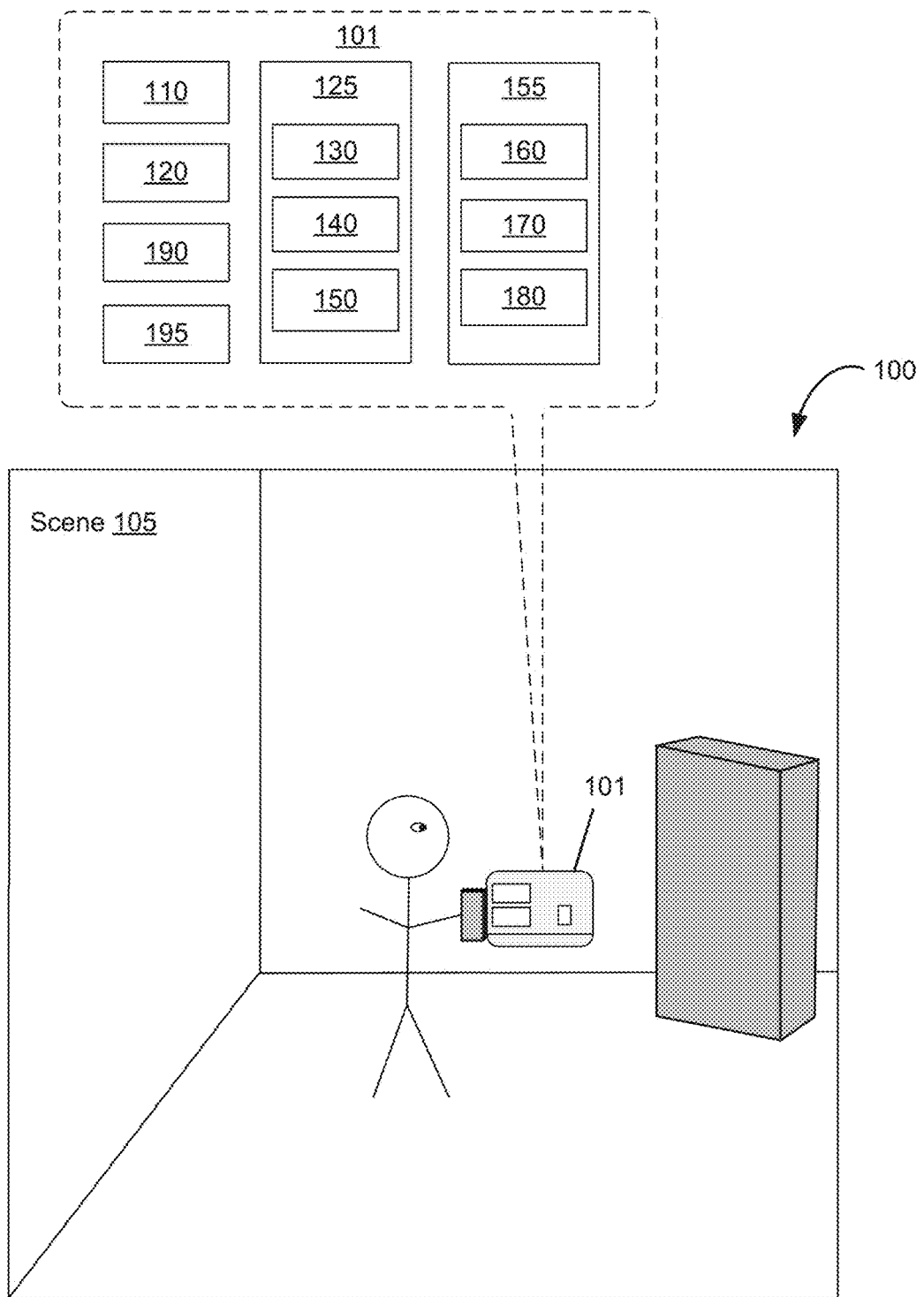
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, a computer system displays computer-generated content, such as a movie, a virtual office, an application environment, a game, a computer-generated experience (e.g., a virtual reality experience, an augmented reality experience, or a mixed reality experience), etc. In some embodiments, the computer-generated content is displayed in a three-dimensional environment. In some embodiments, the computer system is capable of displaying the visual component of the computer-generated content with multiple levels of immersion which correspond to varying degrees of emphasis on visual sensory inputs from virtual content over visual sensory inputs from the physical environment. In some embodiments, a higher level of immersion corresponds to greater emphasis on the visual sensory inputs from the virtual content over those from the physical environment. Similarly, in some embodiments, the audio component of the computer-generated content that accompanies and/or corresponds to the visual component of the computer-generated content (e.g., sound effects and sound tracks in a movie; audio alerts, audio feedback, and system sounds in an application environment; sounds effects, speech, and audio feedback in a game; and/or sound effects and audio feedback in a computer-generated experience) can be output with multiple levels of immersion. In some embodiments, the multiple levels of immersion optionally correspond to varying degrees of spatial correspondence between the positions of virtual sound sources in the virtual content displayed via the display generation component and the perceived locations of the virtual sound sources in a selected frame of reference for the virtual sound sources. In some embodiments, the selected frame of reference of a respective virtual sound source is based on the physical environment, based on a virtual three-dimensional environment of the computer-generated content, based on a viewpoint of the currently displayed view of the three-dimensional environment of the computer-generated content, based on the location of the display generation component in the physical environment, or based on the location of the user in the physical environment, etc. In some embodiments, a higher level of immersion corresponds to greater level of correspondence between the positions of virtual sound sources in the computer-generated environment and the perceived locations of the virtual sound sources in a selected frame of reference (e.g., a frame of reference based on the three-dimensional environment depicted in the computer-generated experience, a frame of reference based on the location of the viewpoint, a frame of reference based on the location of the display generation component, a frame of reference based on the location of the user, etc.) for the audio component of the computer-generated content. In some embodiments, a lesser level of correspondence between the positions of virtual sound sources in the computer-generated environment and the perceived locations of the sound sources in the selected frame of reference for the audio component of the computer-generated content is a result of a greater level of correspondence between the perceived locations of the virtual sound sources and the location of the audio output devices in the physical environment (e.g., sound appears to come from the locations of the audio output devices, irrespective of the positions of the virtual sound sources in the three-dimensional environment of the computer-generated content, and/or irrespective of the location of the viewpoint, the location of the display generation component, and/or the location of the user, etc.). In some embodiments, the computer system detects a first event that corresponds to a request to present first computer-generated experience, and the computer system selects the audio output mode for outputting the audio component of the computer-generated experience in accordance with the level of immersion with which the visual component of the computer-generated experience is displayed via the display generation component. With a higher level of immersion associated with the display of the visual content of the first computer-generated experience, the computer system selects an audio output mode that presents the audio content of the computer-generated experience with a corresponding higher level immersion. In some embodiments, displaying the visual content with a higher level of immersion includes displaying the visual content with a greater spatial extent in a three-dimensional environment, and outputting the audio content with the corresponding higher level of immersion includes outputting the audio content with a spatial audio output mode. In some embodiments, when switching between displaying the visual content with two different levels of immersion (e.g., from a higher level of immersion to a lower level of immersion, from a lower level of immersion to a higher level of immersion, etc.), the computer system also switches between outputting the audio content with two different levels of immersion (e.g., from a spatial audio output mode to a stereo audio output mode, from a surround sound output mode to a stereo audio output mode, from a stereo audio output mode to a surround sound output mode, from a stereo audio output mode to a spatial audio output mode, etc.). Selecting a suitable audio output mode for outputting the audio component of a computer-generated content in accordance with the level of immersion with which visual content of the computer-generated content is displayed allow the computer system to provide a computer-generated experience that is more consistent with the user's expectations and avoid causing confusion when the user interacts with the computer-generated environment while engaged with the computer-generated experience. This may reduce user mistakes and make user interaction with the computer system more efficient.

In some embodiments, when displaying virtual content in a three-dimensional environment (e.g., a virtual reality environment, an augmented reality environment, etc.), all or part of the view of the physical environment are blocked or replaced by the virtual content. In some cases, it is advantageous to give display priority to certain physical objects in the physical environment over virtual content such that at least a portion of the physical object is visually represented in the view of the three-dimensional environment. In some embodiments, the computer system utilizes various criteria for determining whether to give display priority to a respective physical object, such that the representation of the respective physical object can break through a portion of the virtual content currently displayed in the three-dimensional environment when the location of the respective physical object in the physical environment corresponds to the position of the portion of the virtual content in the three-dimensional environment. In some embodiments, the criteria include a requirement that at least a portion of the physical object has approached and entered a threshold spatial region surrounding the user of the display generation component (e.g., the user that is viewing the virtual content through the display generation component, a user for whom the view of the portion of the physical object is blocked or replaced by the display of the virtual content, etc.), and an additional requirement that the computer system detects presence of one or more characteristics with respect to the physical object that indicate a heightened significance of the physical object to the user. In some embodiments, the physical object of heightened significance to the user may be a friend or family member of the user, a team member or supervisor of the user, a pet of the user, etc. In some embodiments, the physical object of heightened significance to the user may be a person or object that requires attention of the user to deal with an emergency. In some embodiments, the physical object of heightened significance to the user may be a person or object that requires attention of the user to take an action that the user does not wish to miss. The criteria are adjustable by the user based on the needs and desires of the user and/or by the system based on contextual information (e.g., time, location, scheduled events, etc.). In some embodiments, giving display priority to a physical object of significance over virtual content and visually representing at least a portion of the physical object in the view of the three-dimensional environment include replacing display of a portion of the virtual content with the representation of the portion of the physical object, or changing the appearance of the portion of the virtual content in accordance with the appearance of the portion of the physical object. In some embodiments, at least a portion of the physical object is not visually represented in the view of the three-dimensional environment and remains blocked or replaced by the display of virtual content, even if the position that corresponds to location of the said portion of the physical object is visible within the field of view provided by the display generation component (e.g., the position is currently occupied by virtual content). In some embodiments, the portion of the three-dimensional environment that is altered to show the presence of the physical object and the portion of the three-dimensional environment that is not altered to show the presence of the physical object (e.g., the portion of the three-dimensional environment can continue to change based on the progress of the computer-generated experience, and/or user interaction with the three-dimensional environment, etc.) correspond to positions on a continuous portion of a virtual object or surface. Allowing at least a portion of a physical object of significance to break through display of virtual content and be visually represented at a position that corresponds to the location of the portion of the physical object, while keeping at least a portion of the physical object visually obscured by the virtual content, in accordance with a determination that the physical object meets preset criteria for identifying physical objects of heightened significance to the user and that the physical object has entered a preset spatial region surrounding the user, provides the user with opportunity to perceive and interact with the physical object, without fully stopping the computer-generated experience that the user is engaged in, and without indiscriminately allowing physical objects of little significance to the user (e.g., a rolling ball, a passerby, etc.) to interrupt the computer-generated experience. This improves the user's experience and reduces the number, extent, and/or nature of the inputs from the user to achieve a desired outcome (e.g., manually stopping the computer-generated experience when physically disturbed or touched by the physical object, manually restarting the computer-generated experience after it is unnecessarily interrupted, etc.), thereby creating a more efficient human-machine interface.

In some embodiments, a computer system displays a representation of a physical environment in response to a request to display a three-dimensional environment that includes the representation of the physical environment (e.g., in response to the user putting on a head-mounted display, in response to a user's request to start an augmented reality environment, in response to a user's request to exit a virtual reality experience, in response to the user turning on or waking up the display generation component from a low-power state, etc.). In some embodiments, the computer system initiates a scan of the physical environment to identify objects and surfaces in the physical environment and optionally build a three-dimensional or pseudo-three-dimensional model of the physical environment based on the identified objects and surfaces in the physical environment. In some embodiments, the computer system initiates the scan of the physical environment in response to receiving the request to display the three-dimensional environment (e.g., if the physical environment has not been scanned and characterized before by the computer system, or if a rescan is requested by the user or the system based on preset rescanning criteria being met (e.g., the last scan was performed more than a threshold amount of time before, the physical environment has changed, etc.), etc.). In some embodiments, the computer system initiates the scan in response to detecting the user's hand touching a portion of the physical environment (e.g., a physical surface, a physical object, etc.). In some embodiments, the computer system initiates the scan in response to detecting that a user's gaze that is directed to a position corresponding to a portion of the physical environment meets preset stability and/or duration criteria. In some embodiments, the computer system displays visual feedback regarding progress and results of the scan (e.g., identification of physical objects and surfaces, determination of physical and spatial characteristics of the physical objects and surfaces, etc. in the physical environment). In some embodiments, the visual feedback includes displaying a respective visual effect at a respective portion of the three-dimensional environment that corresponds to a portion of the physical environment that is touched by the user's hand and that has been identified based on a scan of the portion of the physical environment. In some embodiments, the visual effect expands from the respective portion of the three-dimensional environment, and/or includes representation of a movement that propagates out from the respective portion of the three-dimensional environment. In some embodiments, the computer system displays the visual effect in response to detecting the user's hand touching a respective portion of the physical environment, while the three-dimensional environment is displayed in response to an earlier request for displaying the three-dimensional environment and after the scan of the physical environment has been completed. In some embodiments, displaying a visual effect indicating progress and results of a scan of the physical environment at a position that corresponds to a location of a user's touch on a portion of the physical environment helps the user to visualize the spatial environment that the computer will be using to display and anchor virtual objects and surfaces, and facilitates subsequent interactions between the user and the spatial environment. This makes the interactions more efficient and reduce input mistakes, which creates a more efficient human-machine interface. In some embodiments, the location of the user's contact with the portion of the physical environment is utilized by the computer system to provide more accurate boundary conditions for generating the three-dimensional model of the physical environment and identifying the boundaries of the surfaces and objects based on the scan, which makes the display of virtual objects more accurate and seamless in three-dimensional environment.

In some embodiments, a computer system displays an interactive user interface object in a three-dimensional environment. The computer system also displays a representation of a physical environment in the three-dimensional environment, where the interactive user interface object has a respective spatial relationship relative to various positions in the three-dimensional environment that correspond to different locations in the physical environment. When the user interacts with the three-dimensional environment with a portion of the user's hand, such as one or more fingers of the user's hand or the whole hand, through touch inputs and/or gesture inputs, a portion of the user including the user's hand and possibly wrist and arm connected to the hand may enter a spatial region that is between a location that corresponds to the position of the user interface object (e.g., the location of a physical object or physical surface, a location in free space in the physical environment, etc.) and a location that corresponds to the viewpoint of the currently displayed view of the three-dimensional environment (e.g., the location of the user's eyes, the location of the display generation component, the location of the camera that captures the view of the physical environment shown in the three-dimensional environment, etc.). The computer system, based on the spatial relationships between the location of the user's hand, the location that corresponds to the position of the user interface object, and the location that corresponds to the viewpoint, determines which portion of the user interface object would be visually blocked by the portion of the user and which portion of the user interface object would not be visually blocked by the portion of the user when viewed by a user from the location of the viewpoint. The computer system then ceases to display a respective portion of the user interface object that would be visually blocked by the portion of the user (e.g., as determined by the computer system), and instead allows the representation of the portion of the user to be visible at the position of the respective portion of the user interface object, while maintaining display of another portion of the user interface object that would not be visually blocked by the portion of the user (e.g., as determined by the computer system). In some embodiments, in response to detecting movement of the portion of the user or the movement of the viewpoint (e.g., due to movement of the display generation component, movement of the camera that captures the physical environment, movement of the user's head or torso, etc.), the computer system, based on the new spatial relationships between the portion of the user, the location corresponding to the viewpoint, and the location corresponding to the position of the user interface object, reevaluates which portion of the user interface object would be visually blocked by the portion of the user and which portion of the user interface object would not be visually blocked by the portion of the user when viewed by a user from the location of the viewpoint. The computer system then ceases to display another portion of the user interface object that would be visually blocked by the portion of the user (e.g., as determined by the computer system), and allowing a portion of the user interface object that ceased to be displayed earlier to be restored in the view of the three-dimensional environment. Visually segmenting a user interface object into multiple portions and replacing display of one or more portions of the user interface object with the representation of a portion of the user that has entered the spatial region between the location corresponding to the position of the user interface object and the location corresponding to the viewpoint of the currently displayed view of the three-dimensional environment helps the user to visualize and sense the placement location of the user interface object relative to his/her hand, and facilitates interactions between the user and the user interface object in the three-dimensional environment. This makes the interaction more efficient and reduce input mistakes, which creates a more efficient human-machine interface.

FIGS. 1-6 provide a description of example computer systems for providing CGR experiences to users. FIGS. 7A-7B are block diagrams that illustrate selecting different audio output modes in accordance with the level of immersion by which computer-generated content is presented, in accordance with some embodiments. FIGS. 7C-7H are block diagrams that illustrate altering an appearance of a portion of the virtual content when a physical object of significance approaches a location of the display generation component or the user of the display generation component, in accordance with some embodiments. FIGS. 7I-7N are block diagrams that illustrate applying a visual effect to a region in a three-dimensional environment that corresponds to a portion of the physical environment that has been identified based on a scan of the portion of the physical environment, in accordance with some embodiments. FIGS. 7O-7Q are block diagrams that illustrate displaying an interactive user interface object at a position in a three-dimensional environment that corresponds to a first portion of a physical environment, and selectively forgoing display of a respective sub-portion of the user interface object in accordance with a location of a portion of the user that moves in the space between the first portion of physical environment and a location that corresponds to a viewpoint of the currently displayed view of the three-dimensional environment, in accordance with some embodiments. The user interfaces in FIGS. 7A-7Q are used to illustrate the processes in FIGS. 8-11, respectively.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
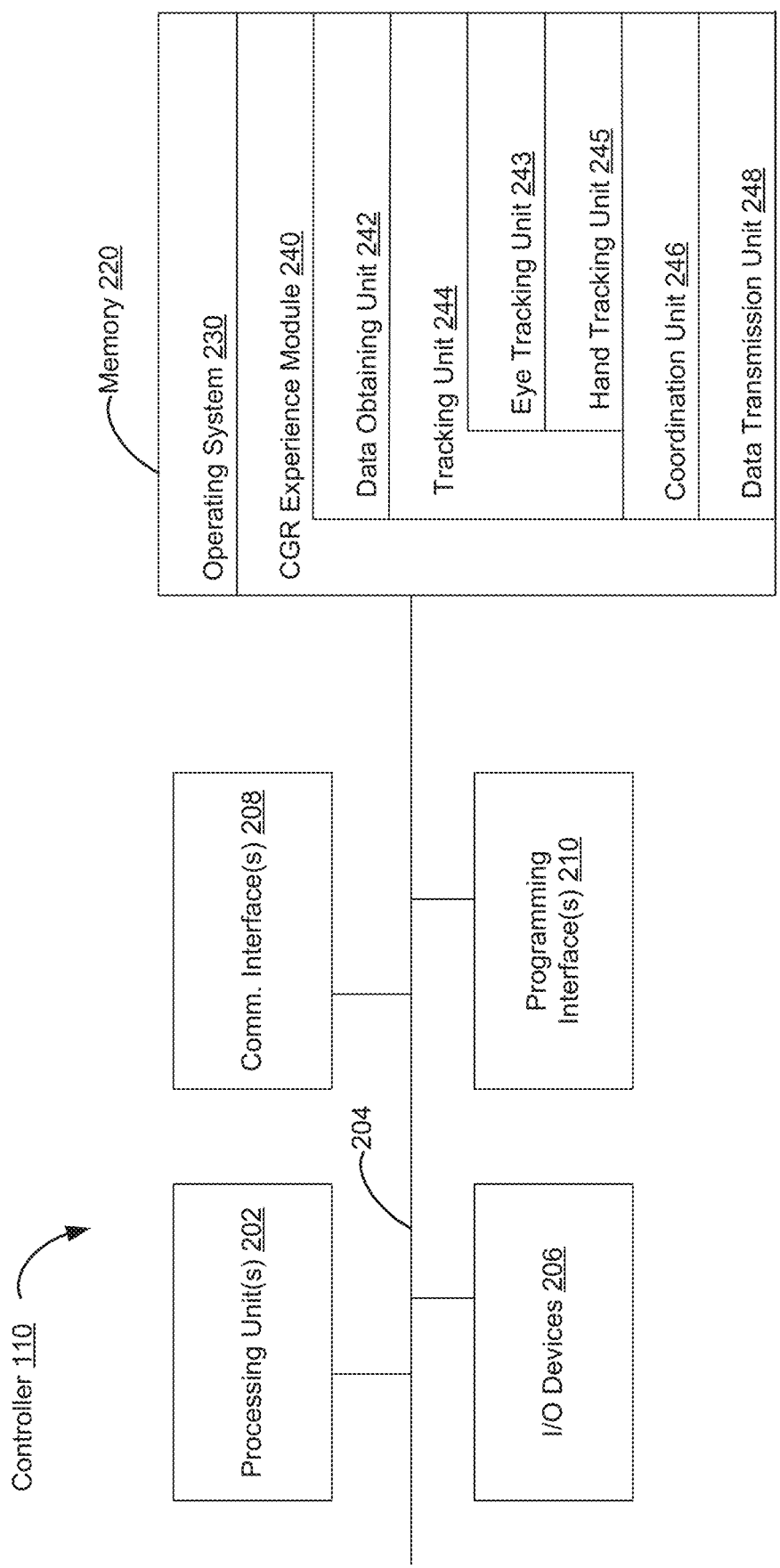
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 243 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
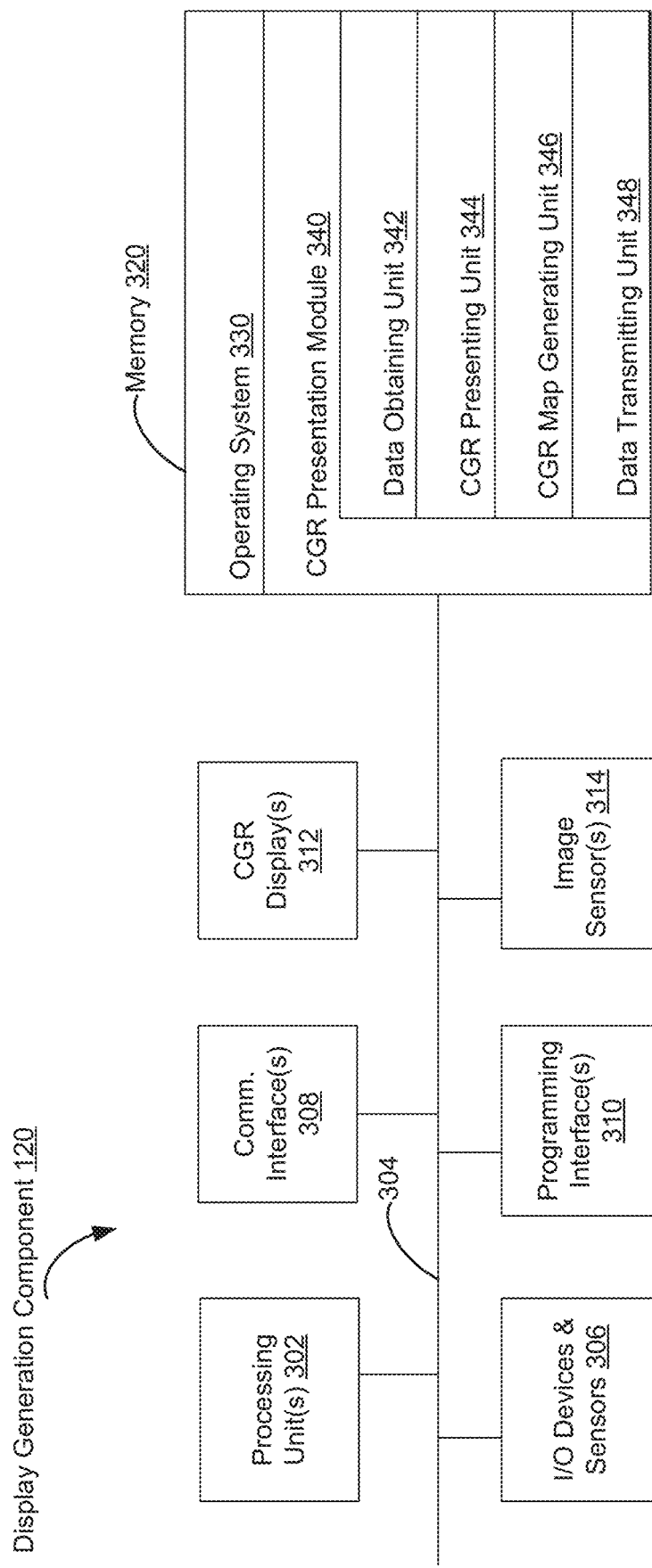
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
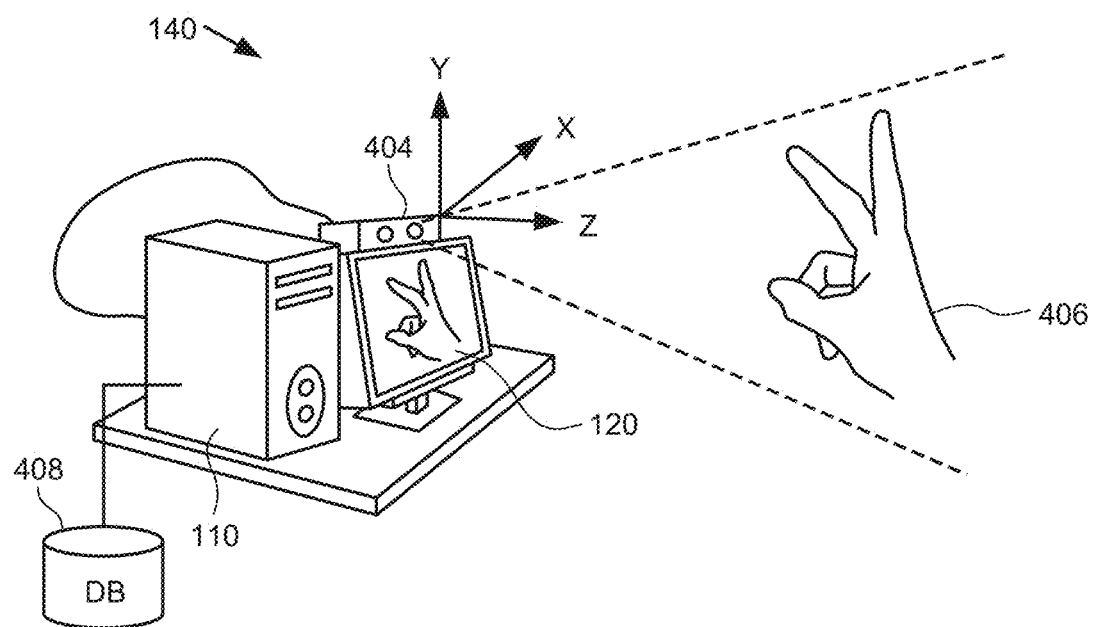
FIG. 4 is a block diagram illustrating a hand tracking unit of a computer system that is configured to capture gesture inputs of the user in accordance with some embodiments.
Figure 4:
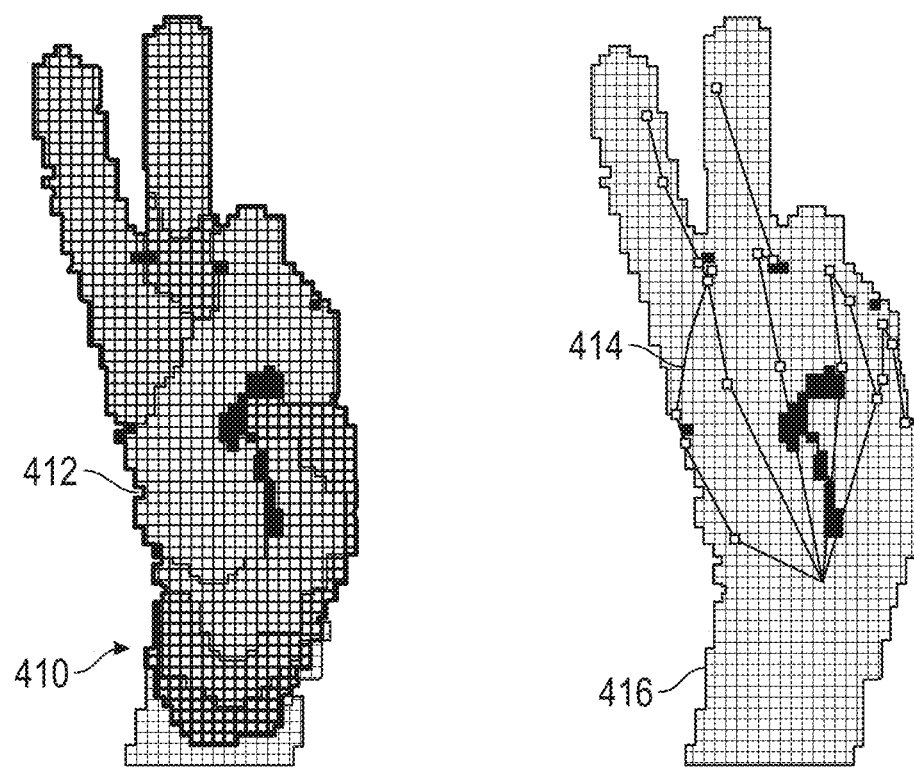

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, e.g., a measured z distance from the image sensors 404, with the shade of gray growing darker with increasing depth. The controller 110 processes these depth values in order to identify and segment a component of the image (e.g., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
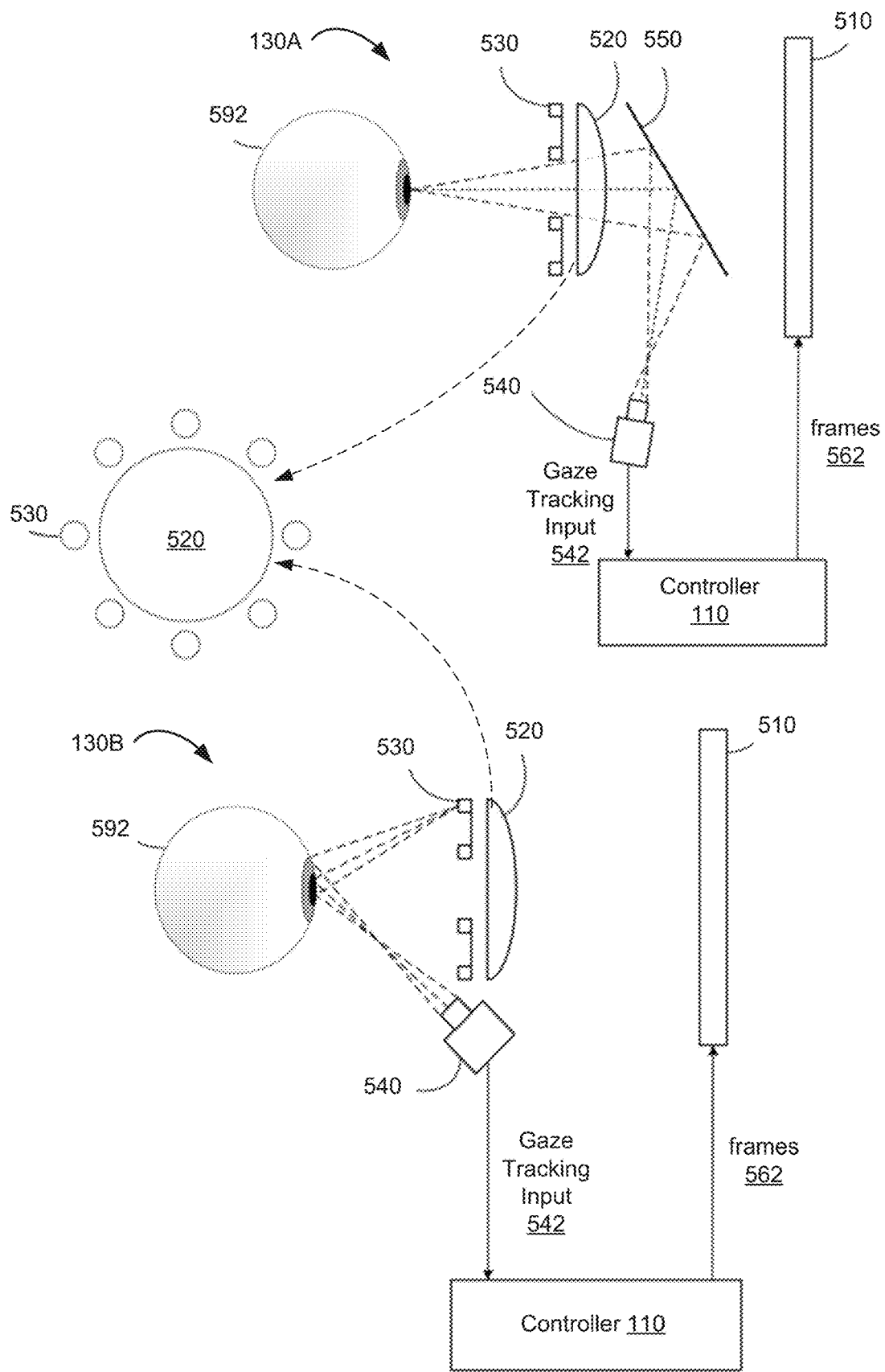
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
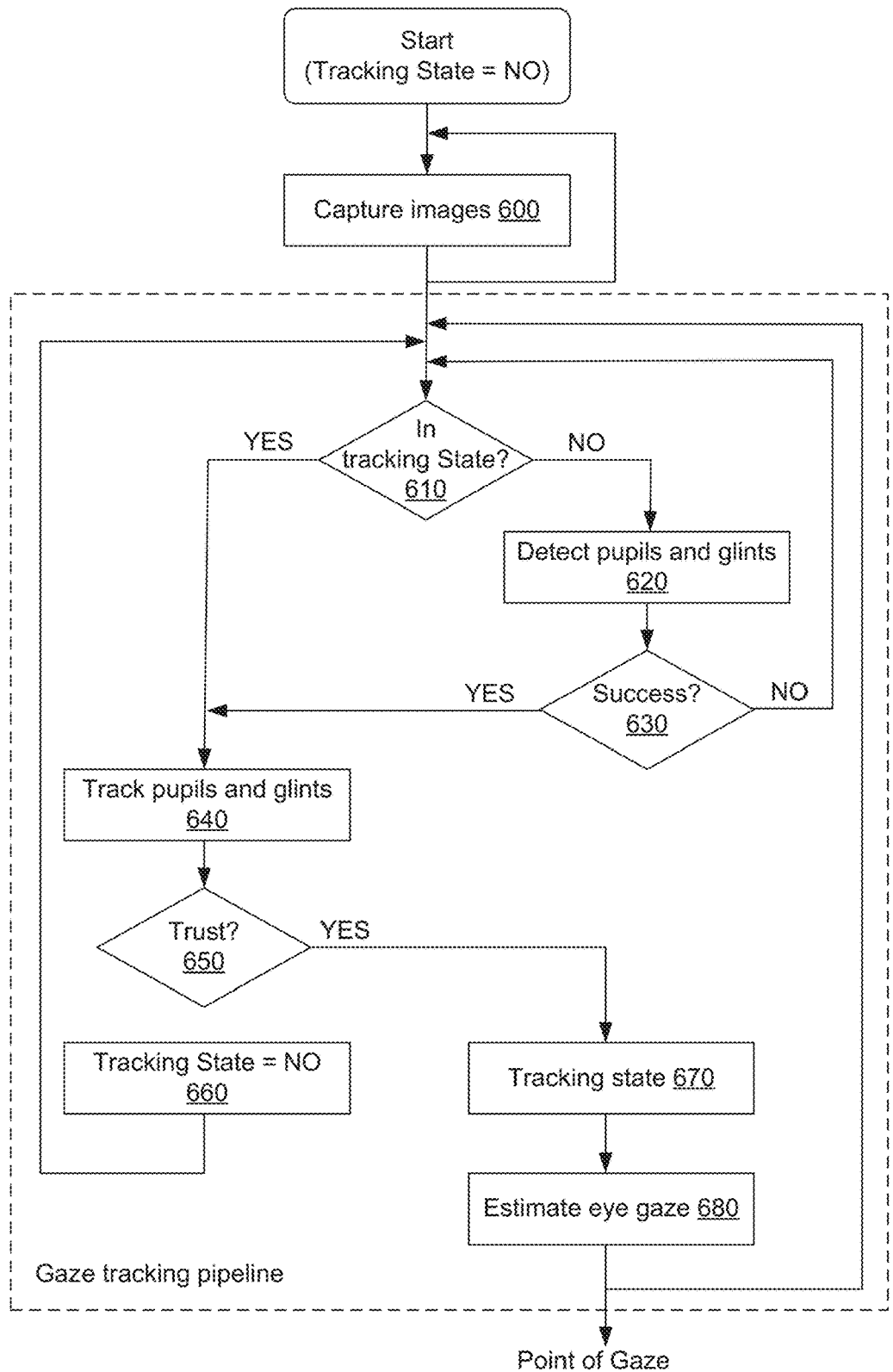
FIG. 6 is a flowchart illustrating a glint-assisted gaze tracking pipeline in accordance with some embodiments.
Figure 7B:
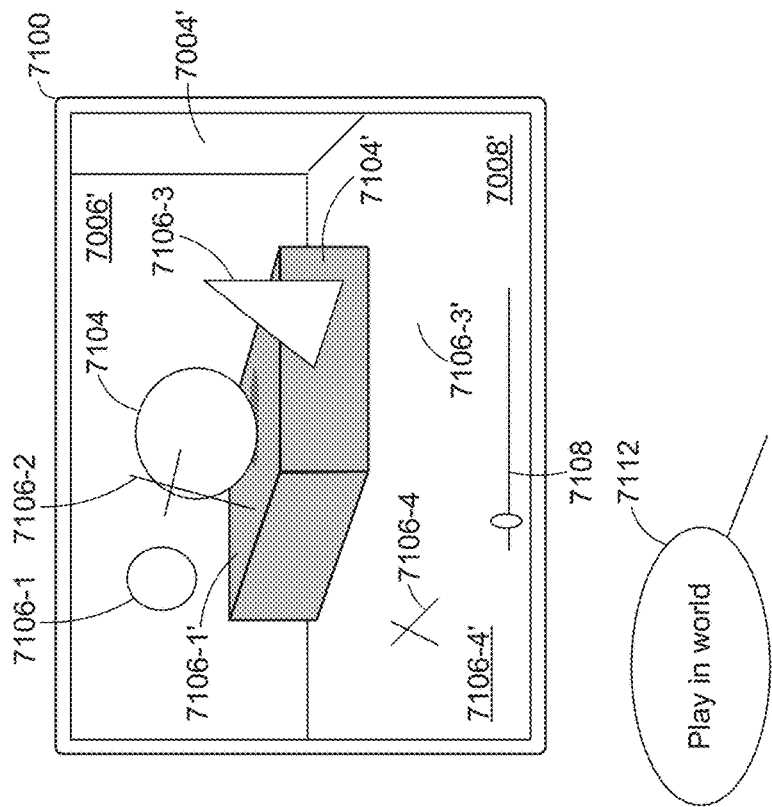
FIGS. 7A-7B are block diagrams that illustrate selecting different audio output modes in accordance with the level of immersion by which computer-generated content is presented, in accordance with some embodiments.
Figure 7A:
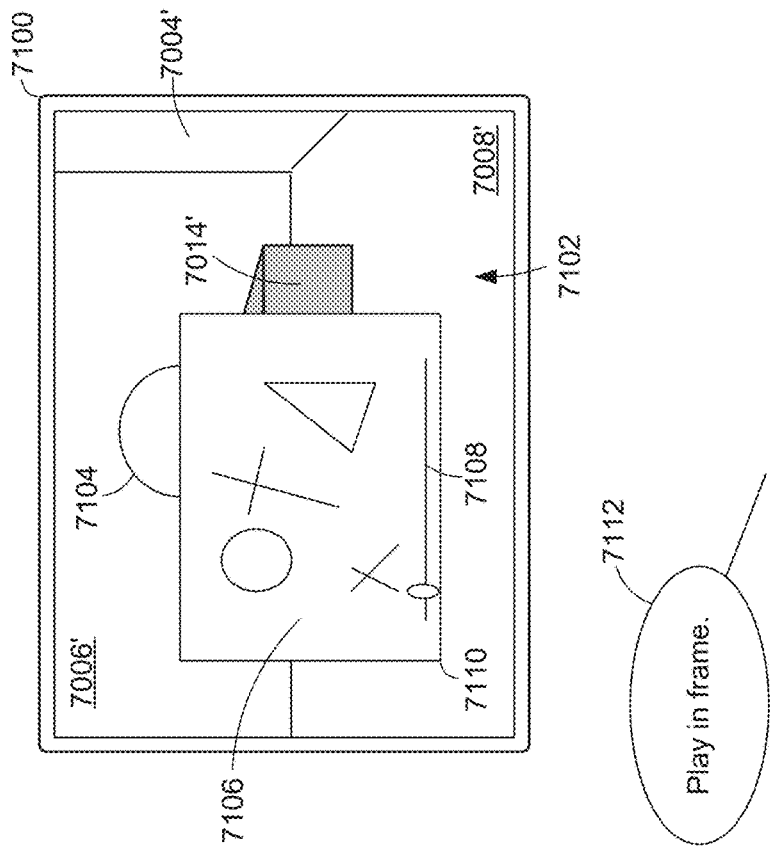

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7Q illustrate three-dimensional environments displayed via a display generation component (e.g., a display generation component 7100, a display generation component 120, etc.) and interactions that occur in the three-dimensional environment caused by user inputs directed to the three-dimensional environment, in accordance with various embodiments. In some embodiments, the inputs are directed to virtual objects within the three-dimensional environment by a user's gaze detected at the positions of the virtual objects, by a hand gesture performed at a location in the physical environment that corresponds to the position of the virtual object, by a hand gesture that is performed at a location in the physical environment that is independent of the position of the virtual object while the virtual object has input focus (e.g., selected by a gaze, selected by a pointer, selected by a previous gesture input, etc.). In some embodiments, the inputs are directed to a representation of a physical object or a virtual object that corresponds to a physical object by the user's hand movement (e.g., whole hand movement, whole hand movement in a respective posture, movement of one portion of hand relative to another portion of the hand, relative movement between two hands, etc.) and/or manipulation with respect to the physical object (e.g., touching, swiping, tapping, opening, moving toward, moving relative to, etc.).

In some embodiments, the three-dimensional environment that is displayed via the display generation component is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, etc.). In some embodiments, the three-dimensional environment is an augmented reality environment that includes a representation of the physical environment. The representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. When virtual objects are placed relative to the positions of the representations of physical objects and surfaces in the three-dimensional environment, they appear to have corresponding spatial relationships with the physical objects and surfaces in the physical environment.

In some embodiments, the display generation component includes a pass-through portion in which the representation of the physical environment is displayed. In some embodiments, the pass-through portion is a transparent or semi-transparent (e.g., a see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of the mobile device or associated with the head-mounted display, or other cameras that feed image data to the electronic device). In some embodiments, the one or more cameras point at a portion of the physical environment that is directly in front of the user's eyes (e.g., behind the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment, at least some of the virtual objects are displayed in placed of (e.g., replacing display of) a portion of the live view (e.g., a portion of the physical environment captured in the live view) of the cameras. In some embodiments, at least some of the virtual object and content are projected onto the physical surfaces or empty space in the physical environment and are visible through the pass-through portion of the display generation component (e.g., viewable as part of the camera view of the physical environment, or through the transparent or semi-transparent portion of the display generation component, etc.). In some embodiments, at least some of the virtual objects and content are displayed to overlay a portion of the display and blocks the view of at least a portion of, but not all of, the physical environment visible through the transparent or semi-transparent portion of the display generation component. In some embodiments, at least some of the virtual objects are projected directly onto the user's retina at positions relative to an image of the representation of the physical environment (e.g., as viewed through a camera view of the physical environment, or through a transparent portion of the display generation component, etc.)

In some embodiments, the display generation component displays different views of the three-dimensional environment in accordance with user inputs or movements that changes the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, gestures performed by movement of one portion of the hand relative to another portion of the hand, etc.) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD, etc.), etc., relative to the physical environment causes corresponding movement of the viewpoint (e.g., with corresponding movement direction, movement distance, movement speed, and/or change in orientation, etc.) relative to the three-dimensional environment, resulting corresponding change in the currently displayed view of the three-dimensional environment. In some embodiments, when a virtual object has a preset spatial relationship relative to the viewpoint, movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement (e.g., the display generation component and/or other location sensing component of the computer system rotating around a fixed location of the user in the physical environment).

In some embodiments, the views of the three-dimensional environment shown in FIGS. 7A-7Q includes a representation of the user's hand(s), arm(s), and/or wrist(s). In some embodiments, the representation is part of the representation of the physical environment provided via the display generation component. In some embodiments, the representation is not part of the representation of the physical environment and is separately captured (e.g., by one or more camera's pointing toward the user's hand(s), arm(s), and wrist(s)) and displayed in the three-dimensional environment independent of the view of the three-dimensional environment. In some embodiments, the representation includes camera images as captured by one or more cameras of the computer system(s), or stylized versions of the arms, wrists and/or hands based on information captured by various sensors). In some embodiments, the representation replace display of, is overlaid on, or block the view of, a portion of the representation of the physical environment. In some embodiments, when the display generation component does not provide a view of a physical environment, and provides a completely virtual environment (e.g., no camera view or transparent pass-through portion), real-time visual representations (e.g., stylize representations or segmented camera images) of one or both arms, wrists, and/or hands of the user may still be displayed in the virtual environment. In some embodiments, even though a representation of the user's hand is shown in the Figures, it is to be understood that, unless otherwise made clear by the corresponding description, the representation of the user's hand is not necessarily always displayed, and/or may not be required to be displayed or in the user's field of view, when providing the required inputs to interact with the three-dimensional environment.

FIGS. 7A-7B are block diagrams that illustrate selecting different audio output modes in accordance with the level of immersion by which computer-generated content is presented, in accordance with some embodiments.

In some embodiments, a computer system displays computer-generated content, such as a movie, a virtual office, an application environment, a game, a computer-generated experience (e.g., a virtual reality experience, an augmented reality experience, a mixed reality experience, etc.), etc. In some embodiments, the computer-generated content is displayed in a three-dimensional environment (e.g., an environment 7102 in FIGS. 7A-7B, or another environment). In some embodiments, the computer system is capable of displaying the visual component of the computer-generated content (e.g., visual content 7106, or other visual content) with multiple levels of immersion which correspond to varying degrees of emphasis on visual sensory inputs from virtual content over visual sensory inputs from the physical environment. In some embodiments, a higher level of immersion corresponds to greater emphasis on the visual sensory inputs from the virtual content over those from the physical environment. Similarly, in some embodiments, the audio component of the computer-generated content that accompanies and/or corresponds to the visual component of the computer-generated content (e.g., sound effects and sound tracks in a movie; audio alerts, audio feedback, and system sounds in an application environment; sounds effects, speech, and audio feedback in a game; and/or sound effects and audio feedback in a computer-generated experience, etc.) can be output with multiple levels of immersion. In some embodiments, the multiple levels of immersion optionally correspond to varying degrees of spatial correspondence between the positions of virtual sound sources in the virtual content displayed via the display generation component and the perceived locations of the virtual sound sources in a selected frame of reference for the virtual sound sources. In some embodiments, the selected frame of reference of a respective virtual sound source is based on the physical environment, based on a virtual three-dimensional environment of the computer-generated content, based on a viewpoint of the currently displayed view of the three-dimensional environment of the computer-generated content, based on the location of the display generation component in the physical environment, or based on the location of the user in the physical environment, etc. In some embodiments, a higher level of immersion corresponds to greater level of correspondence between the positions of virtual sound sources in the computer-generated environment and the perceived locations of the virtual sound sources in a selected frame of reference (e.g., a frame of reference based on the three-dimensional environment depicted in the computer-generated experience, a frame of reference based on the location of the viewpoint, a frame of reference based on the location of the display generation component, a frame of reference based on the location of the user, etc.) for the audio component of the computer-generated content. In some embodiments, a lesser level of correspondence between the positions of virtual sound sources in the computer-generated environment and the perceived locations of the sound sources in the selected frame of reference for the audio component of the computer-generated content is a result of a greater level of correspondence between the perceived locations of the virtual sound sources and the location of the audio output devices in the physical environment (e.g., sound appears to come from the locations of the audio output devices, irrespective of the positions of the virtual sound sources in the three-dimensional environment of the computer-generated content, and/or irrespective of the location of the viewpoint, the location of the display generation component, and/or the location of the user, etc.). In some embodiments, the computer system detects a first event that corresponds to a request to present first computer-generated experience (e.g., request 7112, request 7114, etc. in FIGS. 7A-7B, or other requests, etc.), and the computer system selects the audio output mode for outputting the audio component of the computer-generated experience in accordance with the level of immersion with which the visual component of the computer-generated experience is displayed via the display generation component. With a higher level of immersion associated with the display of the visual content of the first computer-generated experience, the computer system selects an audio output mode that presents the audio content of the computer-generated experience with a corresponding higher level immersion. In some embodiments, displaying the visual content with a higher level of immersion includes displaying the visual content with a greater spatial extent in a three-dimensional environment (e.g., as shown in FIG. 7B, in contrast to FIG. 7A), and outputting the audio content with the corresponding higher level of immersion includes outputting the audio content with a spatial audio output mode. In some embodiments, when switching between displaying the visual content with two different levels of immersion (e.g., from a higher level of immersion to a lower level of immersion, from a lower level of immersion to a higher level of immersion, etc.), the computer system also switches between outputting the audio content with two different levels of immersion (e.g., from a spatial audio output mode to a stereo audio output mode, from a surround sound output mode to a stereo audio output mode, from a stereo audio output mode to a surround sound output mode, from a stereo audio output mode to a spatial audio output mode, etc.).

As described herein, audio output devices, including standalone speakers (e.g., sound bars, external speakers, etc.), built-in audio output components of a display or computer system (e.g., built-in speakers in a head-mounted display device, touch-screen display device, portable electronic device, or heads-up display, etc.), wearable audio output devices (e.g., headphones, earbuds, earcups, and earphones, etc.) are widely used to provide audio outputs to a user. The same audio content, when output using different audio output devices and/or using different output modes of the same audio output device, may have different audio characteristics that make the audio content sound different to a user perceiving the audio output. For this reason, it is desirable to adjust audio output modes, including changing characteristics of sounds, characteristics of sound sources, and/or audio output devices, based on the level of immersion by which the visual content of a computer-generated experience is provided to the user, so that the audio content and visual content of the computer-generated experience are harmonious and more seamlessly complement each other, when the computer-generated experience is being provided to the user.

Existing stereo and mono audio output modes provide audio with respect to a frame of reference that is tied to the audio output devices. For stationary audio output devices, the sound appears to originated from the locations of the audio output devices in the physical environment, irrespective of movement of the user in the physical environment and irrespective to the changes in the visual content of the computer-generated experience (e.g., changes due to movement of virtual sound sources and/or movement of the viewpoint, etc. in the three-dimensional environment of the computer-generated experience). For wearable audio output devices that stay stationary relative to a portion of the user's body (e.g., ears, head, etc.), the sound appears to be locked to the portion in user's body, irrespective to the changes in the visual content of the computer-generated experience (e.g., changes due to movement of the virtual sound sources, changes due to movement of the viewpoint (e.g., movement of the viewpoint caused by a locomotion request by the user or computer system, and not caused by and does not correspond to the movement of the portion of the user's body, etc.), etc.) in the three-dimensional environment of the computer-generated experience. In some cases, the audio output devices and the display generation component of the computer system are separately housed and may move relative to each other in the physical environment during the presentation of computer-generated content via the audio output devices and the display generation component. In such cases, the sound still appears to originate from the audio output devices, irrespective the location of the display generation component in the physical environment, or the changes in the visual content of the computer-generated experience (e.g., changes due to movement of a virtual sound source and/or movement of the viewpoint (e.g., movement caused by a locomotion request, or in response to and in accordance with movement of the user or a portion thereof in the physical environment, etc.), etc. in the three-dimensional environment of the computer-generated experience). As such, stereo and mono audio output modes provide a less immersive listening experience and sounds less realistic than a spatial audio output mode, when the audio content of a computer-generated experience is provided to the user using the stereo audio output mode or the mono audio output mode.

In some embodiments, the spatial audio output mode simulates a more realistic listening experience in which audio seems to come from sources of sound in a separate frame of reference, such as the three-dimensional environment displayed via the display generation component (e.g., an augmented reality environment, a virtual reality environment, a pure pass-through view of the physical environment surrounding the user, etc.) and in which the positioning of simulated sources of sound is decoupled from the location and movement of the audio output devices in the physical environment.

In some embodiments, the frame of reference for a spatial audio output mode is based on the physical environment that is represented in the three-dimensional environment of the computer-generated experience, and the frame of reference, optionally, does not change due to movement of the user, movement of the audio output devices, and/or movement of the display generation component, in the physical environment.

In some embodiments, the frame of reference for a spatial audio output mode is based on a virtual three-dimensional environment of the computer-generated experience. In some embodiments, the frame of reference optionally does not change due to movement of the user, movement of the audio output device, and/or movement of the display generation component, in the physical environment, if these movement do not cause a corresponding movement of the virtual three-dimensional environment.

In some embodiments, the frame of reference for a spatial audio output mode is based on a three-dimensional environment that is tied to the viewpoint of the currently displayed view of the three-dimensional environment. In some embodiments, the frame of reference, optionally, does not change due to the movement of the user, movement of the audio output device, and/or movement of the display generation component in the physical environment, if these movement do not cause a corresponding movement of the viewpoint of the currently displayed view of the three-dimensional environment.

In some embodiments, the frame of reference for the audio content output in the spatial audio mode is optionally different from the frame of reference for the visual content in the computer-generated experience. For example, in some embodiments, while the visual content is displayed relative to a frame of reference that is tied to the physical environment or virtual environment that is visually presented via the display generation component, at least some of the virtual sound sources (e.g., an external narrator, internal dialogue, etc.) are in a frame of reference that is tied to the user's viewpoint.

In some embodiments, the audio content of the computer-generated experience optionally includes sound sources tied to different frames of references, such as a first frame of reference for virtual sound sources that do not have corresponding virtual positions in the three-dimensional environment of the computer-generated experience (e.g., system-level sound, external narration, etc.), a second frame of reference for virtual sound sources that have corresponding visual embodiments (e.g., virtual object, virtual surface, virtual light, etc.) in the three-dimensional environment of the computer-generated experience, and optionally, a third frame of reference for virtual sound sources that are far away from the viewpoint, outside of the field of view, hidden, etc. (e.g., ambient noise, such as sound of waves, insects, wind, rain, jungle, etc.). In some embodiments, the first frame of reference is fixe to, optionally, moves with, the user's head, the display generation component, and/or the viewpoint. In some embodiments, the second frame of reference is tied to the three-dimensional environment of the computer-generated experience, and optionally, moves with the display generation component. In some embodiments, the third frame of reference is tied to the physical environment, and optionally, does not move with the user, the display generation component, or the viewpoint. The computer system can select and configure the spatial audio mode to output sound based on different frame(s) of references based on the visual content that is being presented via the display generation component, based on the spatial configuration between the audio output device(s) and the display generation component in the physical environment, and based on the spatial configuration between the user, the display generation component, and the audio output devices, to provide a more realistic, and more immersive listening experience in conjunction with providing the visual content using the display generation component.

In some embodiments, a spatial audio output mode is a mode that allows audio that is output from the audio output device(s) to sound as though the audio is coming from one or more locations (e.g., one or more sources of sound) in a respective frame of reference chosen for the virtual sound sources, such as the three-dimensional environment of the computer-generated experience or the physical environment, where the positioning of the one or more simulated or perceived sources of sound is decoupled from or independent of the movement of audio output device(s) relative to the respective frame of reference. Typically, the one or more perceived sound sources, when fixed, are fixed relative to the respective frame of reference associated with the sound sources, and, when moving, move relative to the respective frame of reference.

In some embodiments, the frame of reference is a frame of reference based on a physical environment represented in a computer-generated experience that is provided via the display generation component of the computer system. In some embodiments, where the frame of reference is based on a physical environment (e.g., when the computer-generated experience is an augmented reality experience based on the physical environment, or a pass-through view of the physical environment, etc.), the one or more perceived sound sources have respective spatial locations in the physical environment. For example, in some embodiments, the computer-generated experience includes visual counterparts of the perceived sound sources (e.g., virtual objects that generated the sounds in the computer-generated experience) that have respective positions that correspond to the respective spatial locations in the physical environment. In some embodiments, the computer-generated experiences include sounds without a visual counterpart (e.g., remote or hidden virtual objects that generated the sounds in the computer-generated experience, virtual wind, sound effect, external narrator, etc.) but have origins corresponding to respective spatial locations in the physical environment. In some embodiments, as the audio output device(s) move about the physical environment, the audio output from the audio output device(s) is adjusted so that the audio continues to sound as though it is coming from the one or more perceived sound sources at the respective spatial locations in the physical environment. Where the one or more perceived sound sources are moving sources that move through a sequence of spatial locations about the physical environment, the audio output from the audio output device(s) is adjusted so that the audio continues to sound as though it is coming from the one or more perceived sound sources at the sequence of spatial locations in the physical environment. Such adjustment for moving sound sources also takes into account any movement of audio output device(s) relative to the physical environment (e.g., if the audio output device(s) move relative to the physical environment along an analogous path as the moving source of sound so as to maintain a constant spatial relationship with the source of sound, the audio would be output so that the sound does not appear to move relative to audio output device(s)). In some embodiments, when the audio content is output using spatial audio output mode and a frame of reference based on the physical environment represented in the computer-generated experience, the viewpoint of the currently displayed view of the three-dimensional environment changes in accordance with the movement of the user and/or the display generation component in the physical environment; and the user will perceive the sound as coming from the virtual positions of the virtual sound sources and experience the visual content of the three-dimensional environment in the same frame of reference based on the physical environment represented in the computer-generated experience.

In some embodiments, the frame of reference is a frame of reference based on a virtual three-dimensional environment of a computer-generated experience provided via the display generation component of the computer system. In some embodiments, where the frame of reference is based on a virtual three-dimensional environment (e.g., an environment of a virtual three-dimensional movie, a three-dimensional game, a virtual office, etc.), the one or more perceived sound sources have respective spatial positions in the virtual three-dimensional environment. In some embodiments, as the audio output device(s) move about the physical environment, the audio output from the audio output device(s) is adjusted so that the audio continues to sound as though it is coming from the one or more perceived sound sources at the respective spatial positions in the virtual three-dimensional environment. Where the one or more perceived sound sources are moving sources that move through a sequence of spatial positions about the virtual three-dimensional environment, the audio output from the audio output device(s) is adjusted so that the audio continues to sound as though it is coming from the one or more perceived sound sources at the sequence of spatial positions in the virtual three-dimensional environment. In some embodiments, when the audio content is output using spatial audio output mode and a frame of reference based on the three-dimensional environment of the computer-generated experience, the viewpoint of the currently displayed view of the three-dimensional environment changes in accordance with the movement of the user and/or the display generation component in the physical environment; and the user will perceive the sound as coming from the virtual positions of the virtual sound sources and experience the visual content of the three-dimensional environment in the same frame of reference. In some embodiments, when the audio content is output using a spatial audio output mode and a frame of reference based on the three-dimensional environment of the computer-generated experience, the viewpoint of the currently displayed view of the three-dimensional environment changes in accordance with a locomotion request provided by the user and/or in accordance with the movement of the user and/or the display generation component in the physical environment; and the user will perceive the sound as coming from the virtual positions of the virtual sound sources and experience the visual content of the three-dimensional environment in the same frame of reference, with the user's virtual position tied to the viewpoint of the currently displayed view.

In some embodiments, the frame of reference for the spatial audio output mode is fixed to an electronic device, such as a display generation component, that is outputting visual content corresponding to the audio content that is being output via the audio output device (e.g., the sound follows the display generation component). For example, locations of the simulated sources of the audio in a physical environment move corresponding to movement of the display generation component in the physical environment, but not corresponding to the movement of the audio output device in the physical environment. For example, in some embodiments, the display generation component is a head-mounted display device, or a hand-held display device, while the audio output devices are placed in the physical environment and do not follow the movement of the user. In some embodiments, the frame of reference of the spatial audio effect is fixed to the display generation component and indirectly to the user, as the display generation component and the user move around the physical environment, relative to the audio output device(s). In some embodiments, when the audio content is output using spatial audio output mode and a frame of reference based on the three-dimensional environment of the computer-generated experience, the viewpoint of the currently displayed view of the three-dimensional environment changes in accordance with a locomotion request provided by the user and/or in accordance with the movement of the user and/or the display generation component in the physical environment; and the user will perceive the sound as coming from the virtual positions of the virtual sound sources and experience the visual content of the three-dimensional environment in the same frame of reference, with the user's virtual position tied to the viewpoint of the currently displayed view.

In some embodiments, the frame of reference for at least some of the spatial audio effect is fixed to a viewpoint of the currently displayed view of the three-dimensional environment (e.g., an augmented reality environment, a mixed reality environment, a virtual reality environment, etc.) that is presented via the display generation component. In some embodiments, the viewpoint moves relative to the three-dimensional environment to provide a view of the three-dimensional environment from different positions or viewing perspectives in the three-dimensional environment during the computer-generated experience. In some embodiments, the viewpoint stays stationary in the three-dimensional environment during the computer-generated experience. In some embodiments, movement of the viewpoint in the three-dimensional environment is caused by and corresponds to movement of the display generation component in the physical environment. In some embodiments, movement of the viewpoint in the three-dimensional environment is caused by and corresponds to move of the user as a whole or movement of the user's head to torso relative to the physical environment. In some embodiments, movement of the viewpoint in the three-dimensional environment is caused by and corresponds to a navigation or locomotion request provided by the user, and/or generated by the computer system. In some embodiments, the one or more perceived sound sources have respective spatial locations in the three-dimensional environment relative to the viewpoint. For example, in some embodiments, the computer-generated experience includes visual counterparts of the perceived sound sources (e.g., virtual objects that generated the sounds in the computer-generated experience, virtual light, virtual surfaces, etc.) that have respective positions in the three-dimensional environment relative to the viewpoint. In some embodiments, the computer-generated experience includes sounds without a visual counterpart (e.g., remote or hidden virtual objects that generated the sounds in the computer-generated experience, virtual wind, sound effect, external narrator, etc.) but have origins corresponding to respective positions in the three-dimensional environment relative to the viewpoint. In some embodiments, as the viewpoint moves about the three-dimensional environment, the audio output from the audio output device(s) is adjusted so that the audio continues to sound as though it is coming from the one or more perceived sound sources at the respective positions in the three-dimensional environment.

In some embodiments, the computing system is configured to display visual component of CGR content via a display generation component with two or more levels of immersion. In some embodiments, the computer system displays the visual component of the CGR content with at least a first level of immersion, a second level of immersion, and a third level of immersion. In some embodiments, the computer system displays the visual component of the CGR content with at least two levels of immersion, respectively providing a less immersive visual experience and a more immersive visual experience relative to each other. In some embodiments, the computing system causes the visual content displayed via the display generation component to transition between the different levels of immersion in response to a sequence of one or more events (e.g., natural progression of an application or experience; the start, stop, and/or pausing of an experience in response to a user input; changing the levels of immersion of an experience in response to a user input; a change in the state of the computing device; a change in external environment, etc.). In some embodiments, the first, second, and third levels of immersion correspond to increasing amount of virtual content that is present in the CGR environment and/or decreasing amount of representations of the surrounding physical environment (e.g., representation of the portion of the physical environment in front of the first display generation component) present in the CGR environment. In some embodiments, first, second, and third levels of immersion correspond to different modes of content display that have increasing image fidelity (e.g., increasing pixel resolution, increasing color resolution, increasing color saturation, increasing luminance, increasing opacity, increasing image details, etc.) and/or spatial extent (e.g., angular extent, spatial depth, etc.) for the visual component of the computer-generated content, and/or decreasing image fidelity and/or spatial extent for the representation of the surrounding physical environment. In some embodiments, the first level of immersion is a pass-through mode where the physical environment is fully visible to the user through the display generation component (e.g., as a camera view of the physical environment or through a transparent or semi-transparent portion of the display generation component). In some embodiments, the visual CGR content presented in the pass-through mode includes the pass-through view of the physical environment with a minimal amount of virtual elements concurrently visible as the view of the physical environment or with only virtual elements that are peripheral (e.g., indicators and controls displayed in the peripheral region of the display) to the user's view of the physical environment. For example, a view of the physical environment occupies the central and majority region of the field of view provided by the display generation component, and only a few controls (e.g., the title of the movie, the progress bar, playback control (e.g., play button), etc.) are displayed in the peripheral region of the field of view provided by the display generation component. In some embodiments, the first level of immersion is a pass-through mode where the physical environment is fully visible to the first user through the display generation component (e.g., as a camera view of the physical environment or through a transparent portion of the display generation component), and the visual CGR content is displayed in a virtual window or frame that overlays, replacing display of, or blocking the view of, etc. a portion of the representation of the physical environment. In some embodiments, the second level of immersion is a mixed reality mode where the pass-through view of the physical environment is augmented with virtual elements generated by the computer system, where the virtual elements occupy the central and/or majority region of the user's field of view (e.g., the virtual content is integrated with the physical environment in the view of the computer-generated environment). In some embodiments, the second level of immersion is a mixed reality mode where the pass-through view of the physical environment is augmented with a virtual window, viewport, or frame that overlays, replacing display of, or blocking the view of, etc. a portion of the representation of the physical environment, and that has additional depth or spatial extent that are revealed when the display generation component is moved relative to the physical environment. In some embodiments, the third level of immersion is an augmented reality mode where virtual content is displayed in a three-dimensional environment with a representation of the physical environment, and virtual objects are distributed throughout the three-dimensional environment at positions corresponding to different locations of the physical environment. In some embodiments, the third level of immersion is a virtual reality mode where virtual content is displayed in a three-dimensional environment without a representation of the physical environment. In some embodiments, the different levels of immersion described above represents increasing levels of immersion relative to one another.

As described herein, the computer system selects the audio output mode for outputting the audio content of a computer-generated experience (e.g., an application, a movie, a video, a game, etc.) in accordance with the level of immersion with which the visual content of the computer-generated experience is being displayed by the display generation component, in accordance with some embodiments. In some embodiments, when the level of immersion with which the visual content is displayed increases (e.g., from the first level of immersion to the second level of immersion, from the first level of immersion to the third level of immersion, or from the second level of immersion to the third level of immersion, etc.), the computer system switches the audio output mode from a less immersive output mode to a more immersive output mode (e.g., from a first audio output mode to a second audio output mode, or from a first audio output mode to a third audio output mode, or from a second audio output mode to a third audio output mode, etc., where the first audio output mode, the second audio output mode, and the third audio output mode correspond to audio output with increasing levels of immersion). As described herein, a spatial audio output mode corresponds to a higher level of immersion than a stereo audio output mode and a mono audio output mode. A spatial audio output mode corresponds to a higher level of immersion than a surround sound output mode. A surround sound output mode corresponds to a higher level of immersion than a stereo audio output mode and a mono audio output mode. A stereo audio output mode corresponds to a higher level of immersion than a mono audio output mode. In some embodiments, the computer system selects an audio output mode from multiple available audio output modes, e.g., a mono audio output mode, a stereo audio output mode, a surround sound output mode, a spatial audio output mode, etc. based on the level of immersion with which visual content of a computer-generated experience is being provided via the display generation component.

FIGS. 7A-7B illustrate an example scenario in which a first computer-generated experience is provided by a computer system (e.g., computing system 101 in FIG. 1 or computing system 140 in FIG. 4, etc.) in communication with a display generation component (e.g., a display 7100, another type of display generation component, such as a head-mounted display, etc.) and one or more audio output devices.

In FIG. 7A, the visual content (e.g., content 7106, or other content, etc.) of the computer-generated experience is provided with a first level of immersion which is a lesser level of immersion of two or more levels of immersion with which the computer-generated experience can be provided. In FIG. 7B, the visual content (e.g., content 7106, or other content, etc.) of the computer-generated experience is provided with a second level of immersion which is a greater level of immersion of the two or more levels of immersion with which the computer-generated experience can be provided.

In some embodiments, a respective one of the scenarios shown in FIGS. 7A and 7B may occur at a time when the computer-generated experience is started (e.g., in response to a user command, in response to an event generated by the computer system, etc.), without requiring a transition from the scenario shown in the other figure (e.g., without requiring displaying the visual content with another level of immersion first). As a result, a corresponding audio output mode is selected by the computer system to output the audio content of the computer-generated experience in accordance with the level of immersion with which the visual content of the computer-generated experience is being provided.

In some embodiments, the computer system transitions from the scenario shown in FIG. 7A to the scenario shown in FIG. 7B, or vice versa (e.g., in response to a user command, in response to an event generated by the computer system, in accordance with preset conditions being met, etc.). As a result, the computer system transitions from one audio output mode to another audio output mode in accordance with the change in the level of immersion with which the visual content of the computer-generated experience is being provided.

In some embodiments, the computer-generated experience (e.g., a three-dimensional movie, a virtual reality game, a video, a three-dimensional environment that includes user interface objects, etc.) is a virtual experience occurring in a virtual three-dimensional environment. In some embodiments, the computer-generated experience is an augmented reality experience that includes representation of a physical environment and virtual content. In FIGS. 7A and 7B, the objects (e.g., object 7104, etc.) and surfaces (e.g., vertical surfaces 7004' and 7006', horizontal surface 7008', etc.) may represent virtual objects and surfaces in a virtual three-dimensional environment (e.g., environment 7102, or another virtual environment, etc.), in accordance with some embodiments. In FIGS. 7A and 7B, the three-dimensional environment 7102 may also represent an augmented reality environment that includes virtual objects and surfaces (e.g., object 7104, a surface of a virtual table, etc.) and representations of physical objects and surfaces (e.g., vertical walls represented by representations 7004' and 7006', floor represented by representation 7008', tables, windows, etc.), in accordance with some embodiments. The environment 7102 is an environment that can exist independent of and prior to the display of the visual content 7106 of the computer-generated experience in this example.

As shown in FIG. 7A, the spatial relationship between the display generation component (e.g., display 7100, or another type of display, etc.) and a user is such that the user is in a position to view the visual CGR content presented via the display generation component. For example, the user is facing toward a display side of the display generation component. In some embodiments, the display generation component is a display of an HMD, and the spatial relationship represented in FIG. 7A corresponds to the user wearing or holding the HMD with the display side of the HMD facing the user's eyes. In some embodiments, the user is in a position to view the CGR content presented via the display generation component when the user is facing a portion of the physical environment that is illuminated by a projection system of the display generation component. For example, virtual content is projected onto a portion of the physical environment and the virtual content and the portion of the physical environment are seen by the user through a camera view of the portion of the physical environment, or through a transparent portion of the display generation component when the user is facing the display side of the display generation component. In some embodiments, the display generation component emits light that form images on the user's retina when the user faces the display side of the display generation component. For example, the virtual content is displayed by an LCD or LED display overlaid or replacing a portion of the view of the physical environment displayed by the LCD or LED display, and the user facing the display side of the LCD or LED display can see the virtual content together with a view of the portion of the physical environment. In some embodiments, the display generation component displays a camera view of the physical environment in front of the user or includes a transparent or semi-transparent portion through which a portion of the physical environment in front of the first user is visible to the user.

In some embodiments, the computer system controls one or more audio output devices that respectively provide audio outputs (e.g., audio portion of the CGR content that accompany of the visual portion of the CGR content that is being displayed, system-level sound that is external to the CGR content, etc.) to the user. In some embodiments, the computer system generates and/or adjust the audio outputs before outputting the audio CGR content using a respective audio output mode of the audio output devices, including two or more of a stereo audio output mode, a surround sound output mode, and a spatial audio output mode, etc., which correspond to different levels of immersion with which the audio CGR content may be output. In some embodiments, the computing system optionally partially or completely shields (e.g., through one or more active or passive noise suppression or cancellation components) the user from the sounds propagated from the surrounding physical environment. In some embodiments, the amount of active sound shielding or sound pass-through is determined by the computing system based on the current level of immersion associated with the CGR content shown via the display generation component (e.g., no sound shielding when in pass-through mode, or partial sound shielding when in mixed reality mode, full sound shielding when in virtual reality mode, etc.).

In some embodiments, as shown in FIG. 7A, the computing system displays visual CGR content 7106 via the display generation component 7100 (e.g., in response to a user command 7112 to display the CGR content in a frame or a viewport (e.g., frame or viewpoint 7110, a window, a virtual screen, etc.), or in response to a transition from a lesser immersive mode, or a transition from a more immersive mode (e.g., that shown in FIG. 7B), etc.). In the moment illustrated in FIG. 7A, the computing system is displaying a movie (e.g., a three-dimensional movie, a two-dimensional movie, an interactive computer-generated experience, etc.). The movie is displayed in a frame or viewpoint 7110, such that the content of the movie is concurrently visible with a representation of a physical environment in the environment 7102. In some embodiments, this display mode corresponds to a low or intermediate level of immersion associated with the CGR content presented via the display generation component.

In some embodiments, the representation of the physical environment shown in the three-dimensional environment (e.g., environment 7102, another environment, etc.) includes a camera view of the portion of the physical environment that would be within the first user's field of view if the user's eyes were not blocked by the presence of the display generation component (e.g., if the first user were not wearing the HMD or holding the HMD in front of his/her eyes). In the display mode shown in FIG. 7A, the CGR content 7106 (e.g., the movie, a three-dimensional augmented reality environment, user interfaces, virtual objects, etc.) is displayed to overlay or replace a limited portion of, but not all of, the representation of the physical environment. In some embodiments, the display generation component includes a transparent portion through which a portion of the physical environment is visible to the first user. In some embodiments, in the display mode shown in FIG. 7A, the CGR content 7106 (e.g., the movie, a three-dimensional augmented reality environment, user interfaces, virtual objects, etc.) is projected onto the physical surfaces or empty space in the physical environment and are visible through the transparent portion of the display generation component with the physical environment or viewable through a camera view of the physical environment provided by the first display generation component. In some embodiments, the CGR content 7106 is displayed to overlay a limited portion of the display and blocks the view of a limited portion of, but not all of, the physical environment visible through the transparent or semi-transparent portion of the first display generation component. In some embodiments, as shown in FIG. 7A, the visual CGR content is confined in a sub-portion of the field of view provided by the display generation component, such as in a virtual window 7110, a virtual viewport, a virtual screen, a position corresponding to a location of a finite physical surface, etc., while the field of view concurrently includes other sub-portions of the three-dimensional environment (e.g., virtual objects and/or representations of the physical environment, etc.).

In some embodiments, as shown in FIG. 7A, other user interface objects (e.g., playback controls 7108, a dock with application icons, etc.) related to the CGR content and/or unrelated to the CGR content are, optionally, displayed concurrently with the visual CGR content in the three-dimensional environment. In some embodiments, the visual CGR content is, optionally three-dimensional content, and a viewpoint of the currently displayed view of the three-dimensional content in the window 7110 moves in response to user inputs and/or movement of the display generation component or the user's head in the physical environment.

In some embodiments, the location of sub-portion of the three-dimensional environment in which the visual CGR content is confined (e.g., the window 7110, a viewport, etc.) is movable during display of the visual CGR content. For example, the window 7110 or viewport that displays the visual CGR content is moveable in accordance with a pinch and drag gesture of the user, in accordance with some embodiments. In some embodiments, the window or viewport that displays the visual CGR content stays at a preset portion of the field of view provided by the display generation component (e.g., in the center of the field of view, or at a position selected by the user, etc.), as the user moves the display generation component relative to the physical environment (e.g., when the user is wearing the HMD and walking in the physical environment, or moving the handheld display in the physical environment, etc.).

In this example, when displaying the visual CGR content with a low or intermediate level of immersion, as shown in FIG. 7A, the computer system chooses an audio output mode that corresponds to the low or intermediate level of immersion, such as a stereo audio output mode which is output sound with respect to a frame of reference that is tied to the location of the audio output device(s) in the physical environment. In this example, the audio output device is, optionally moveable relative to the display generation component and/or the user in the physical environment, in accordance with some embodiments. The audio CGR content output in accordance with the stereo audio output mode does not take into account for the position and/or movement of the window 7110 or viewport of the visual CGR content within the three-dimensional environment 7106, in accordance with some embodiments. The audio CGR content output in accordance with the stereo audio output mode does not take into account for the positions and/or movement of the virtual sound source(s) within the window 7110 or viewport of the visual CGR content, in accordance with some embodiments. The audio CGR content output in accordance with the stereo audio output mode does not take into account for the position and/or movement of the viewpoint of the visual CGR content within the three-dimensional environment 7106, in accordance with some embodiments. The audio CGR content output in accordance with the stereo audio output mode does not take into account for the positions and/or movement of the display generation component in the physical environment, in accordance with some embodiments. The audio CGR content output in accordance with the stereo audio output mode is optionally locked to a frame of reference tied to the location of the user's head, even as the user moves relative to the display generation component, as the user's virtual position moves relative to the three-dimensional environment represented in the CGR content (e.g., causing movement of the viewpoint, etc.), as the window 7110 moves in the three-dimensional environment, and/or as the visual embodiments of the virtual sound sources move in the window 7110, etc., in accordance with some embodiments.

In some embodiments, the low or intermediate level of immersion, as shown in FIG. 7A, also corresponds to partial shielding or partial pass-through of the sounds propagated from the physical environment (e.g., the portion of the physical environment that surrounds the first user).

FIG. 7B illustrates that the same portion of the visual CGR content 7106 being displayed by the display generation component (e.g., display 7100, or another type of display, such as an HMD, etc.) using a higher level of immersion than that shown in FIG. 7A. In some embodiments, the switching between the levels of immersion can occur at any time chosen by the user or the computer system during the presentation of the visual CGR content. At this time, the CGR content 7106 is still displayed in an augmented reality environment 7102 but is occupying a greater spatial extent than that shown in FIG. 7A. For example, the virtual objects 7106-1, 7106-2, 7106-3, and 7106-4 in the visual CGR content 7106 are displayed with spatial positions corresponding to physical locations in the physical environment, and integrated into the representation of the physical environment. In some embodiments, additional virtual objects, e.g., virtual shadows 7106-1', 7106-4' 7106-3', etc., are added to respective virtual positions that correspond to physical locations (e.g., locations of physical surfaces) that support or are below the virtual objects 7106-1, 7106-4, and 7106-3, etc.) in the three-dimensional environment. In some embodiments, in accordance with the movement of the display generation component relative to the physical environment, the computing system updates the view of the three-dimensional environment 7102 and the viewing angle and viewing distance of the virtual objects in the visual CGR content 7106 in FIG. 7B.

In some embodiments, FIG. 7B optionally represents the display of the CGR content 7106 with an even greater level of immersion, e.g., in a virtual reality mode (e.g., the environment of the 3D movie, or game, etc.) with no representation of the physical environment. In some embodiments, the switching performed by the computing system is in response to a request from the first user (e.g., a gesture input that meets preset criteria for changing the level of immersion of the CGR content, or an event generated by the computer system based on the current context, etc.).

In some embodiments, as shown in FIG. 7B, the computing system displays visual CGR content 7106 via the display generation component 7100 (e.g., in response to a user command 7114 to display the CGR content 7106 in an augmented reality mode throughout the representation of the physical environment, or in response to a transition from a lesser immersive mode (e.g., that shown in FIG. 7A), or a transition from a more immersive mode (e.g., a virtual reality mode), etc.). In some embodiments, as shown in FIG. 7B, when displaying the CGR content 7106 using the higher level of immersion as compared to that in FIG. 7A, the visual CGR content 7106 is no longer confined in a limited sub-portion of the field of view provided by the display generation component, such as in the virtual window 7110, a virtual viewport, a location of a finite physical surface, a virtual screen, etc., but is distributed to different positions throughout different portions of the three-dimensional environment 7102. In some embodiments, other user interface objects (e.g., playback controls 7108, a dock with application icons, etc.) related to the CGR content and/or unrelated to the CGR content are, optionally, displayed concurrently with the visual CGR content 7106 in the three-dimensional environment 7102 (e.g., in the peripheral portion of the field of view, in a portion selected by the user, etc.). In some embodiments, when the visual CGR content 7106 is three-dimensional content, a viewpoint of the currently displayed view of the three-dimensional content, optionally, moves in response to user inputs and/or movement of the display generation component or the user's head in the physical environment.

In this example, when displaying the visual CGR content 7106 with the increased level of immersion, as shown in FIG. 7B, the computer system chooses an audio output mode that corresponds to the increased level of immersion, such as a surround sound audio output mode or a spatial audio output mode which is output with respect to a frame of reference that is no longer tied to the location of the audio output device(s) in the physical environment.

In this example, the audio output device is, optionally moveable relative to the display generation component and/or the user in the physical environment, in accordance with some embodiments. The audio CGR content output in accordance with the spatial audio output mode takes into account of the position and/or movement of the virtual sound sources in the three-dimensional environment 7102, in accordance with some embodiments. The audio CGR content output in accordance with the spatial audio output mode takes into account of the position and/or movement of the viewpoint of the visual CGR content within the three-dimensional environment 7106, in accordance with some embodiments. The audio CGR content output in accordance with the spatial audio output mode takes into account of the position and/or movement of the display generation component in the physical environment, in accordance with some embodiments.

In some embodiments, the higher level of immersion also corresponds to increased shielding or reduced pass-through of the sounds propagated from the physical environment (e.g., the portion of the physical environment that surrounds the first user).

In some embodiments, in order to achieve the adjustment needed to output the audio CGR content in a spatial audio output mode that accounts for the movement of the display generation component, the user, the audio output devices, the viewpoint, and/or the virtual sound sources, etc. in their respective environments, while continuing to reflect the position(s) and/or movement of the sound source(s) in their respective frame(s) of reference that are decoupled from the location of the audio output device(s), the computer system optionally utilizes one or more additional audio output components to output sound as compared to those used in the stereo audio output mode. In some embodiments, the additional audio output components are located at different locations from those used in the stereo audio output mode. In some embodiments, the computer system dynamically selects the audio output components that are activated when outputting a respective portion of the audio CGR content in the spatial audio output mode, based on the positions and movements of the virtual sound sources in the corresponding portion of visual CGR content of the computer-generated experience that is concurrently provided via the display generation component with the higher level of immersion. In some embodiments, the audio output components used to output the audio CGR content in the spatial audio output mode is a superset of the audio output components used to output audio CGR content in the stereo audio output mode and/or the surround sound output mode. In some embodiments, the audio output components used to output audio CGR content in the spatial audio output mode spans a wider spatial area than the audio output components used to output audio CGR content in the stereo audio output mode and/or the surround sound audio output mode.

In some embodiments, the spatial audio output mode provides localization of sound based on visual content, while the stereo audio output provides head-locked sound. In some embodiments, the display generation component and the audio output devices are enclosed in the same head-mounted device. In some embodiments, the display generation component and audio output devices are separately placed relative to the user's head (e.g., eyes and ears, in the physical environment away from the user, respectively, etc.). In some embodiments, the display generation component is not fixedly positioned relative to the user's head, while the audio output device(s) are fixedly positioned to the user's ears, during presentation of the CGR content. In some embodiments, the display generation component is fixedly positioned relative to the user's head, while the audio output device(s) are not fixedly positioned to the user, during presentation of the CGR content. In some embodiments, the computer system adjust the generation of the sound corresponding to the audio CGR content to provide localization of sound based on the visual content (e.g., moving viewpoint, changing virtual sound sources, moving virtual sound sources, etc.), while the audio CGR content is output using the spatial audio output mode, depending on the relative movement and spatial configuration of the display generation component, the user, and the audio output device(s).

In some embodiments, when providing localization of sound based on the positions of virtual sound sources in the visual CGR content, the computer system determines the virtual position of a respective virtual sound source in the three-dimensional environment of the CGR content, determines a suitable frame of reference for the sound corresponding to the respective virtual sound source (e.g., a frame of reference based on the physical environment, based on the virtual environment, based on the viewpoint, etc., that is selected based on the type of CGR content that is being presented), determines the respective position of the virtual sound source in the chosen frame of reference based on the current position of the respective sound source in the three-dimensional environment of the CGR content, and controls the operation of the audio output components of the audio output device(s) to output the sound corresponding to the respective sound source, such that the sound is perceived in the physical environment to be originating from the respective position of the respective sound source in the chosen frame of reference. In the example shown in FIG. 7B, if the virtual object 7106-1 is a virtual sound source (e.g., a virtual bird, a virtual train, a virtual assistant, etc.) that is associated with an audio output (e.g., a chirping sound, a training's chugging sound, a speech sound, etc.), when the audio CGR content is being output using the spatial audio output mode, the computer system controls the audio output components of the output the sound of the virtual sound source in a way such that, the sound, when perceived by the user, appears to have originated from a physical location that corresponds to the current virtual position of the virtual object 7106-1 in the three-dimensional environment 7102, optionally, irrespective of the movement of the display generation component, the movement of the user, and/or the movement of the audio output device(s) in the physical environment. Similarly, in the example shown in FIG. 7B, if the virtual object 7106-3 is another virtual sound source (e.g., another virtual bird, a virtual conductor, etc.) that is associated with another audio output (e.g., another chirping sound, a whistling sound, etc.), when the audio CGR content is being output using the spatial audio output mode, the computer system controls the audio output components of the output the sound of this other virtual sound source in a way such that, the sound, when perceived by the user, appears to have originated from a physical location that corresponds to the current virtual position of the virtual object 7106-3 in the three-dimensional environment 7102, optionally, irrespective of the movement of the display generation component, the movement of the user, and/or the movement of the audio output device(s) in the physical environment.

In some embodiments, when providing localization of sound based on the positions of the user, the computer system determines the virtual position of a respective virtual sound source in the three-dimensional environment of the CGR content, determines a frame of reference that is associated with the location of the user relative to the three-dimensional environment of the CGR content, determines the respective position of the virtual sound source in the frame of reference based on the location of the user, and controls the operation of the audio output components of the audio output device(s) to output the sound corresponding to the respective sound source, such that the sound is perceived in the physical environment to be originating from the respective position of the respective sound source in the frame of reference fixed to the current location of the user. In the example shown in FIG. 7B, a virtual sound source (e.g., an external narrator, a virtual assistant, ambient sound sources, etc.) that is associated with an audio output optionally does not have a corresponding virtual object. When the audio CGR content is being output using the spatial audio output mode, the computer system controls the audio output components of the output the sound of the virtual sound source in a way such that, the sound, when perceived by the user, appears to have originated from a fixed location or region relative to the user, optionally, irrespective of movement of the display generation component, the movement of the user, and/or the movement of the audio output device(s) in the physical environment. The viewpoint of the visual CGR content optionally changes in accordance with the movement of the display generation component and/or the movement of the user, while the audio output corresponding to the virtual sound source remains fixed relative to the user, in accordance with some embodiments.

FIGS. 7C-7H are block diagrams that illustrate altering an appearance of a portion of the virtual content when a physical object of significance approaches a location of the display generation component or the user (e.g., allowing a representation of a portion of the physical object to break through the virtual content, changing one or more visual properties of the virtual content based on the visual properties of the portion of the physical object, etc.), in accordance with some embodiments.

Figure 7D:
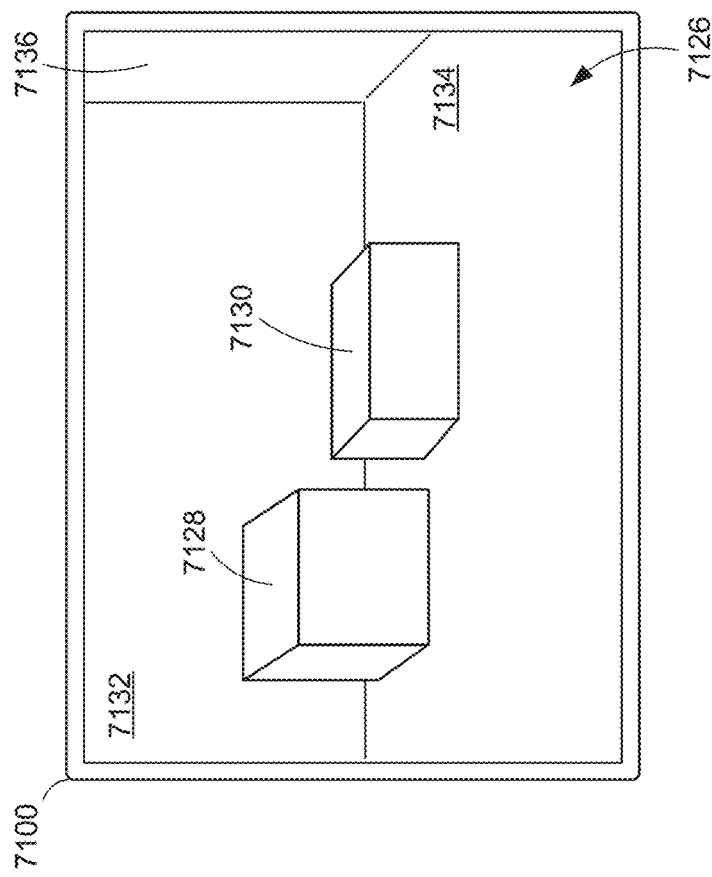
FIGS. 7C-7H are block diagrams that illustrate altering an appearance of a portion of the virtual content when a physical object of significance approaches a location of the display generation component or the user (e.g., allowing a representation of a portion of the physical object to break through the virtual content, changing one or more visual properties of the virtual content based on the visual properties of the portion of the physical object, etc.), in accordance with some embodiments.
Figure 7C:
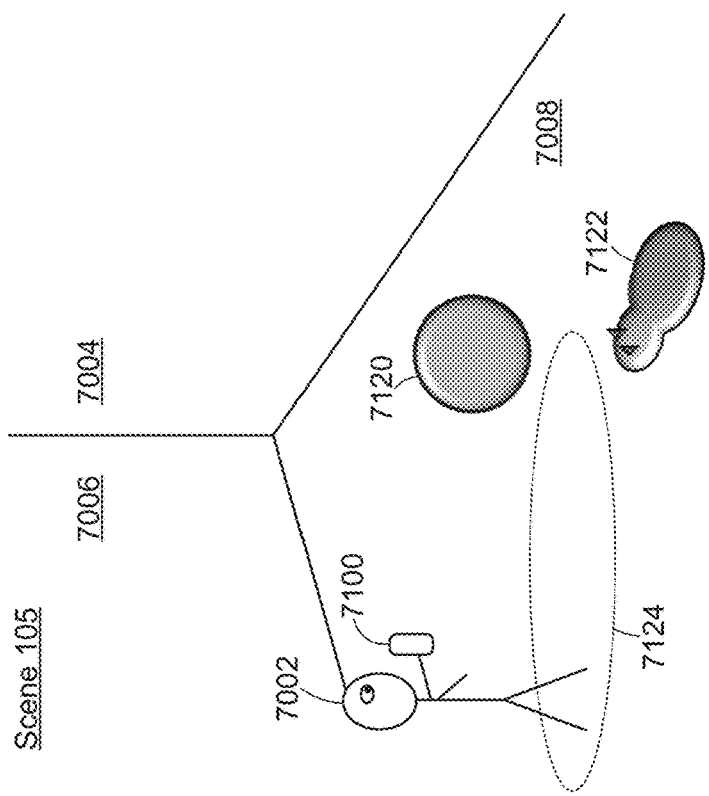
Figure 7F:
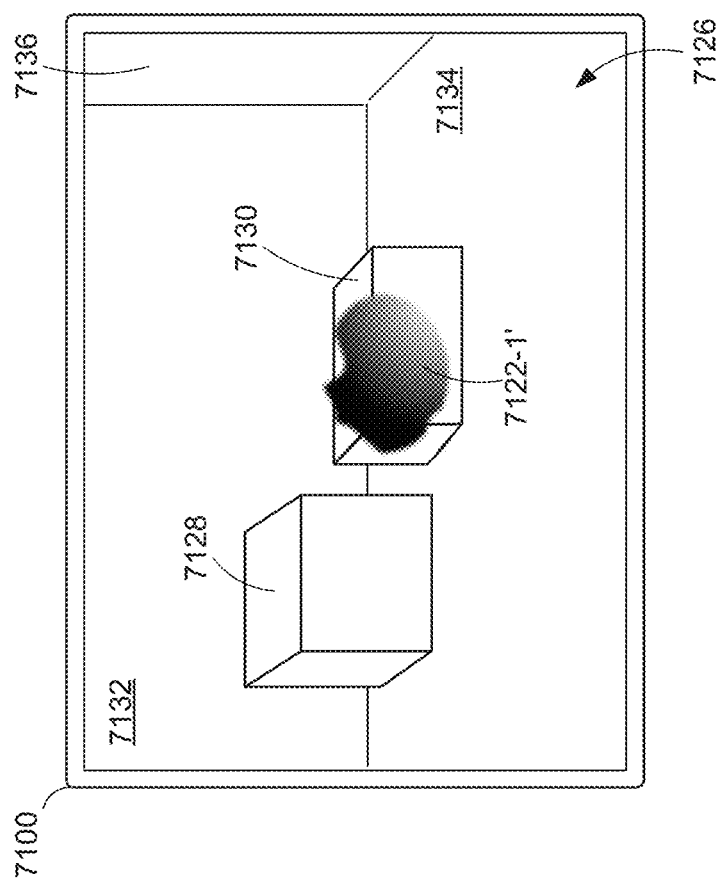
Figure 7E:
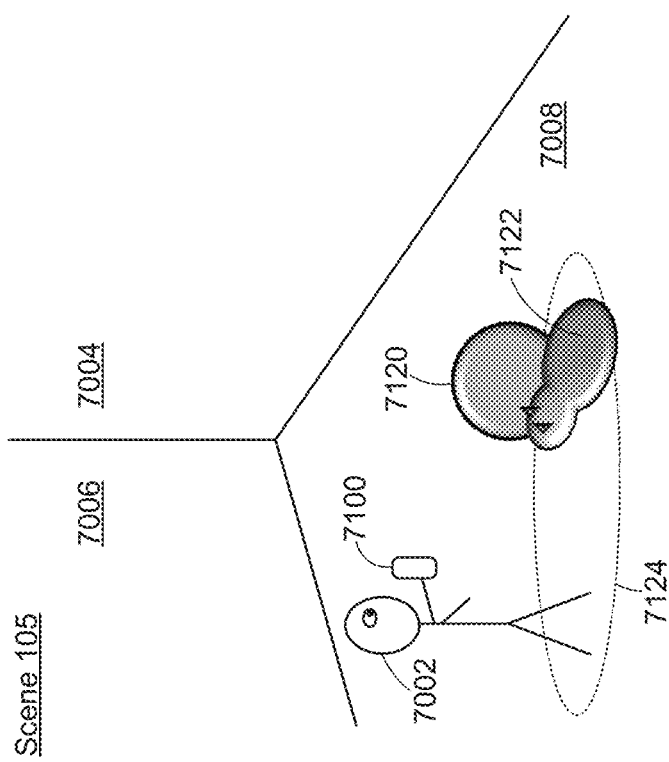
Figure 7H:
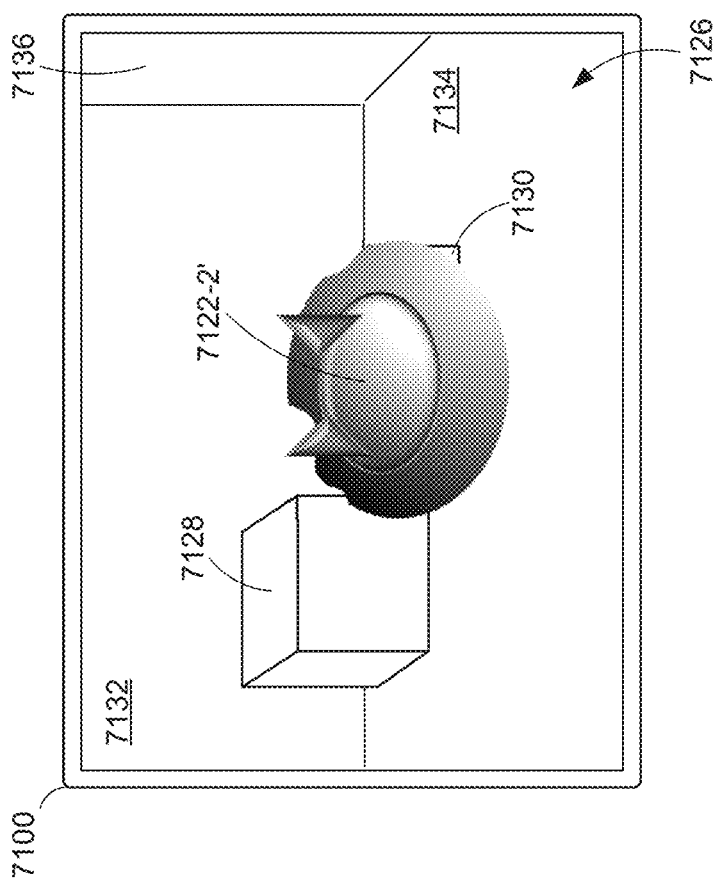

In some embodiments, when displaying virtual content in a three-dimensional environment (e.g. environment 7126 in FIGS. 7C-7H, another environment, etc.) (e.g., a virtual reality environment, an augmented reality environment, etc.), all or part of the view of the physical environment are blocked or replaced by the virtual content (e.g., virtual objects 7128, 7130, etc. in FIG. 7D). In some cases, it is advantageous to give display priority to certain physical objects (e.g., a physical object 7122 in FIG. 7C, another physical object of significance to the user, etc.) in the physical environment (e.g., scene 105 in FIGS. 7C, 7E and 7G) over virtual content such that at least a portion of the physical object (e.g., a physical object 7122 in FIG. 7C, another physical object of significance to the user, etc.) is visually represented in the view of the three-dimensional environment (e.g., as shown in FIGS. 7F and 7H). In some embodiments, the computer system utilizes various criteria for determining whether to give display priority to a respective physical object, such that the representation of the respective physical object can break through a portion of the virtual content currently displayed in the three-dimensional environment when the location of the respective physical object in the physical environment corresponds to the position of the portion of the virtual content in the three-dimensional environment. In some embodiments, the criteria include a requirement that at least a portion of the physical object has approached and entered a threshold spatial region (e.g., spatial region 7124 in FIGS. 7C, 7E, and 7G, another spatial region, etc.) surrounding the user of the display generation component (e.g., the user 7002 that is viewing the virtual content through the display generation component, a user for whom the view of the portion of the physical object is blocked or replaced by the display of the virtual content, etc.), and an additional requirement that the computer system detects presence of one or more characteristics with respect to the physical object (e.g., a physical object 7122 in FIG. 7C, another physical object of significance to the user, etc.) that indicate a heightened significance of the physical object to the user. In some embodiments, the physical object of heightened significance to the user may be a friend or family member of the user, a team member or supervisor of the user, a pet of the user (e.g., as shown in the example of FIGS. 7C-7H), etc. In some embodiments, the physical object of heightened significance to the user may be a person or object that requires attention of the user to deal with an emergency. In some embodiments, the physical object of heightened significance to the user may be a person or object that requires attention of the user to take an action that the user does not wish to miss. The criteria are adjustable by the user based on the needs and desires of the user and/or by the system based on contextual information (e.g., time, location, scheduled events, etc.). In some embodiments, giving display priority to a physical object of significance over virtual content and visually representing at least a portion of the physical object in the view of the three-dimensional environment include replacing display of a portion of the virtual content (e.g., a portion of the virtual object 7130 in FIG. 7F, a portion of the virtual object 7128 in FIG. 7H, etc.) with the representation of the portion of the physical object, or changing the appearance of the portion of the virtual content in accordance with the appearance of the portion of the physical object. In some embodiments, at least a portion of the physical object (e.g., the ears and body of the pet 7122 in FIG. 7F, a portion of the body of the pet 7122 in FIG. 7H, etc.) is not visually represented in the view of the three-dimensional environment and remains blocked or replaced by the display of virtual content, even if the position that corresponds to location of the said portion of the physical object is visible within the field of view provided by the display generation component (e.g., the position is currently occupied by virtual content). In some embodiments, the portion of the three-dimensional environment that is altered to show the presence of the physical object and the portion of the three-dimensional environment that is not altered to show the presence of the physical object (e.g., the portion of the three-dimensional environment (e.g., virtual object 7128, portion of the virtual object 7130, etc.) can continue to change based on the progress of the computer-generated experience, and/or user interaction with the three-dimensional environment, etc.) correspond to positions on a continuous portion of a virtual object or surface (e.g., virtual object 7128, portion of the virtual object 7130, etc.).

In some embodiments, when a user is engaged in a computer-generated experience, such as a virtual reality experience or an augmented reality experience, etc., via the display generation component, the user's view of the physical environment is blocked or obscured by the presence of the virtual content in the computer-generated experience. In some embodiments, there are situations where it is desirable to reveal or visually indicate to the user of the presence of a physical object of significance (e.g., a person, a pet, etc.) that is approaching the physical vicinity of the user while the user is engaged in an virtual reality experience or augmented reality experience. In some embodiments, while the physical object of significance is within the user's potential field of view but for the presence of the display generation component and the virtual content of the computer-generated experience (e.g., the physical object would be visible to the user if the display generation component and/or the virtual content are not present), a portion of the virtual content at a position corresponding to the a first portion of the physical object is removed or changed in appearance to reflect the appearance of the first portion of the physical object, while another portion of the virtual content at a position that corresponds to another portion of the physical object adjacent to the first portion of the physical object is not removed or changed to reflect the appearance of said other portion of the physical object. In other words, the virtual content is not abruptly removed or altered to show all portions of the physical object that is potentially within the user's field of view, but gradually removed or altered portion by portion to ease the disruption to computer-generated experience.

In various embodiments, the physical object of significance is identified by the computer system based on criteria that includes at least one requirement that is unrelated to or independent the distance between the physical object and the user. In some embodiments, the computer system takes in account various information, such as the user's previously entered settings, presence of previously identified characteristics, the current context, the presence of marker objects or signals associated with the physical object, etc., when determining whether an approaching physical object is a physical object of significance to the user, and warrants instituting a visual disruption to the computer-generated experience.

As shown in FIG. 7C, a user 7002 is present in a physical environment (e.g., scene 105, or another physical environment, etc.). The user 7002 is in a position relative to a display generation component (e.g., display generation component 7100, another type of display generation component, such as an HMD, etc.) to view the content displayed via the display generation component. A preset spatial region 7124 surrounding the user 7002 is indicated in FIG. 7C by the dashed line around the user 7002. In some embodiments, the preset spatial region 7124 is a three-dimensional region surrounding the user 7002. In some embodiments, the preset spatial region 7124 is defined by a preset threshold distance (e.g., arm's length, two meters, etc.) relative to a characteristic location of the user (e.g., the location of the user's head, the location of the user's center of mass, etc.) in the physical environment. In some embodiments, the preset spatial region 7124 has a boundary surface that has a greater distance from the user's front side (e.g., face, chest, etc.) than from the user's back side (e.g., back of the head, back, etc.). In some embodiments, the preset spatial region 7124 has a boundary surface that has a greater distance from one side of the user than the other side of the user (e.g., greater distance from the left side of the user than the right side of the user, or vice versa). In some embodiments, the preset spatial region 7124 has a boundary surface that is symmetric on the two sides of the user. In some embodiments, the preset spatial region 7124 has a greater distance from the upper portion of the user's body (e.g., the user's head, the user's chest, etc.) than from the lower portion of the user's body (e.g., the user's feed, the user's legs, etc.). In some embodiments, the display generation component has a fixed spatial relationship with the user's head. In some embodiments, the display generation component encloses the user's eyes and blocks the user's view of the physical environment, except for the view provided via the display generation component.

In some embodiments, as shown in FIG. 7C, there are other physical objects (e.g., physical object 7120, physical object 7122, etc.) and physical surfaces (e.g., walls 7004, and 7006, floor 7008, etc.) in the physical environment. In some embodiments, at least some of the physical objects are stationary objects relative to the physical environment. In some embodiments, at least some of the physical objects move relative to the physical environment and/or the user. In the example shown in FIG. 7C, the physical object 7122 represents an instance of a first type of physical object that is of significance to the user 7002, based on the evaluation according to preset criteria; and the physical object 7120 represents an instance of a second type of physical object that is not of significance to the user 7002, based on the evaluation according the preset criteria. In some embodiments, the physical environment may include only one of the two types of physical objects at a given time. In some embodiments, a physical object of a respective one of the two types of physical object may enter the physical environment after the user 7002 has already started a computer-generated experience and does not necessarily perceive the entrance of the physical object into the physical environment due to the presence of the display generation component and/or the virtual content displayed via the display generation component.

FIG. 7D illustrates that the display generation component is displaying a view of a three-dimensional environment 7126 at a time corresponding to that shown in FIG. 7C. In this example, the three-dimensional environment 7126 is a virtual three-dimensional environment without including a representation of the physical environment surrounding the display generation component and the user. In some embodiments, the virtual three-dimensional environment includes virtual objects (e.g., virtual object 7128, virtual object 7130, user interface objects, icons, avatars, etc.) and virtual surfaces (e.g., virtual surfaces 7132, 7136, and 7138, virtual windows, virtual screens, background surfaces of user interfaces, etc.) at various positions in the virtual three-dimensional environment 7126. In some embodiments, movement of the user and/or the display generation component causes a viewpoint of the currently displayed view of the three-dimensional environment 7126 to change in accordance with the movement of the user and/or display generation component in the physical environment. In some embodiments, the computer system moves or changes the viewpoint of the currently displayed view of the three-dimensional environment 7126 in accordance with a user input, the preprogrammed progress of the computer-generated experience, and/or an event generated by the computer system based on preset conditions being met. In some embodiments, the virtual content (e.g., a movie, a game, etc.) changes over time in accordance with the progress of the computer-generated experience, without user input.

In some embodiments, the three-dimensional environment 7126 shown in FIG. 7D represents an augmented reality environment, and virtual content (e.g., virtual surfaces and virtual objects) are concurrently displayed with a representation of the physical environment (e.g., the scene 105, or another physical environment surrounding the user, etc.). At least a portion of the representation of the physical environment (e.g., one or more continuous (or contiguous) portions, and/or discrete and disconnected portions of the physical environment) in front of the user (e.g., the portions of the physical environment that would have been visible to the user or within the user's field of view if the display generation component were not present or were displaying the virtual content) is blocked, replaced, or obscured by the virtual content that is displayed by the display generation component. For example, in some embodiments, the virtual surfaces 7132, 7136 are representations of the walls 7006 and 7004 in the physical environment 105, and virtual surface 7134 is a representation of the floor 7008 in the physical environment 105, while virtual objects 7128 and 7130 block, replace display of, or overlay at least a portion of the representation of the physical environment (e.g., part of the representation of the wall 7006 and the floor 7008, and the representations of the physical objects 7120 and 7122, etc.).

As shown in FIGS. 7C and 7D, at the time when the physical objects 7122 and 7120 are both outside of the preset spatial portion 7124 surrounding the user 7002 but within the user's potential field of view without the presence of the display generation component 7100, the virtual content (e.g., virtual objects 7128 and 7130, etc.) of the three-dimensional environment 7126 are displayed via the display generation component 7100 without disruption of the physical objects 7122 and 7120. For example, if the three-dimensional environment 7126 is a virtual environment, the portions of the virtual content that have respective virtual positions corresponding to the locations of the physical objects 7122 and 7120 are displayed normally in accordance with the original CGR experience, even though the positions corresponding to the locations of the physical object 7122 and 7120 are within the field of view provided by the display generation component. In another example, if the three-dimensional environment 7126 is an augmented reality environment, the portions of the virtual content that have respective virtual positions corresponding to the locations of the physical objects 7122 and 7120 are displayed normally in accordance with the original CGR experience, even though the positions corresponding to the locations of the physical object 7122 and 7120 are within the field of view provided by the display generation component and even though some portions of the physical environment (e.g., portions of the walls, floor, portions of the physical objects 7122 and 7120, etc.) may be visible in the space not currently occupied or visually blocked by the virtual content of the CGR experience.

FIGS. 7E-7F illustrate a scenario in which the physical objects 7122 and 7120 have moved closer to the user 7002 in the physical environment 105. At this time, only a portion of the total spatial extend of the physical object 7122 is within the preset spatial region 7124 surrounding the user 7002. Similarly, only a portion of the total spatial extent of the physical object 7120 is within the preset spatial region 7124 surrounding the user 7002. In some embodiments, in response to detecting the movement of the physical object (e.g., physical object 7120, physical object 7122, etc.) in the physical environment and in accordance with a determination that the user is within a threshold distance of the physical object (e.g., the threshold distance is determined based on the boundary surface of the preset spatial region 7124 and the respective relative spatial relationship between the user and the physical object, a fixed preset threshold distance, etc.), the computer system determines whether the physical object is a physical object of significance to the user in accordance with preset criteria.

In this example, the physical object 7122 meets the requirement for qualifying as a physical object of significance to the user 7002, and accordingly, the computer system alters the appearance of the virtual content displayed at a position that corresponds to the location of a first portion of the physical object 7122 in accordance with the appearance of the first portion of the physical object 7122. As shown in FIG. 7F, the virtual content shown at the position corresponding to the location of the first portion of the physical object 7122 is removed and revealing a representation 7122-1' of the first portion of the physical object 7122 (e.g., a portion of a pet's head, a head portion of the physical object 7122, etc.). In some embodiments, the visual characteristics (e.g., color, simulated refractive index, transparency level, brightness, etc.) of the virtual content (e.g., a portion of the virtual object 7130 in FIG. 7F, in this example) shown at the position corresponding to the location of the first portion of the physical object 7122 is changed in accordance with the appearance of the first portion of the physical object 7122. In some embodiments, as shown in FIG. 7F, the virtual content at a position corresponding to the location of some parts of the portion of the physical object 7122 within the preset spatial region 7124 is not altered in the view of the three-dimensional environment 7126 (e.g., the portion of the virtual object 7130 around the wavy edges of the representation 7122-1' in FIG. 7F), even though those parts of the portion of the physical object (e.g., part of the head portion of the physical object 7122, and part of the body portion of the physical object 7122, as shown in FIG. 7E) are within the threshold distance of the user, and would be within the user's natural field of view at this moment if the display generation component were removed. In some embodiments, the virtual content at the position corresponding to the location of all parts of the portion of the physical object 7122 within the preset spatial region 7124 may eventually be removed or altered in the view of the three-dimensional environment 7126 after a period of time that the portion of the physical object 7122 remains within the preset spatial region 7124.

In this example, the physical object 7120 does not meet the requirement for qualifying as a physical object of significance to the user 7002, and accordingly, the computer system does not alter the appearance of the virtual content (e.g., virtual object 7128 in FIG. 7F) displayed at a position that corresponds to the location of a first portion of the physical object 7120 in accordance with the appearance of the first portion of the physical object 7120. As shown in FIG. 7F, the virtual content shown at the position corresponding to the location of the first portion of the physical object 7120 is not removed and the first portion of the physical object 7120 is not visible in the view of the three-dimensional environment 7126.

In some embodiments, the contrast between the treatments of the physical object 7120 and the physical object 7122 are based on preset criteria against which the physical objects 7120 and 7122 are evaluated. For example, the physical object 7120 is not previously marked by the user as important while the physical object 7122 is; the physical object 7120 is not moving toward the user with more than the threshold speed while the physical object 7122 is, the physical object 7120 is not a person or pet while the physical object 7122 is, the physical object 7120 is a person but is not speaking while the physical object 7122 is a person that is speaking as he/she is approaching the user, the physical object 7120 is not wearing a preset identifier object (e.g., a collar with a radio-transmitted ID, an RFID tag, a color coded tag, etc.), etc.) while the physical object 7122 is, etc.

In the view shown FIG. 7F, a first portion of the physical object 7120 comes within the threshold distance of the user 7002, its corresponding position in the computer-generated environment 7126 is visible to the user based on the user's field of view of the computer-generated environment, and the position corresponding to the first portion of the physical object 7120 is not blocked by a position corresponding to another physical object or another portion of the physical object 7120 from the viewing perspective of the user, the computer system still does not modify the appearance of the portion of virtual content (e.g., virtual object 7128 in FIG. 7F) displayed at the position corresponding to the first portion of the physical object 7120 because the physical object 7120 does not meet the preset criteria for being a physical object of significance to the user 7002. For example, a ball does not meet the preset criteria that require the first physical object to be a person or pet; and when the ball rolls close to the user, the computer system does not change the appearance of the virtual content displayed at the position in the computer-generated environment that corresponds to the location of the ball relative to the user. In contrast, if a pet comes close to the user, the computer system changes the appearance of the virtual content displayed at a position corresponding to the portion of the pet that enters the preset distance of the user, without changing the appearance of the virtual content displayed at positions that correspond to another portion of the pet that has not entered the preset distance of the user, even though the positions that correspond to said other portion of the pet are also within the user's current field of view.

Figure 7G:
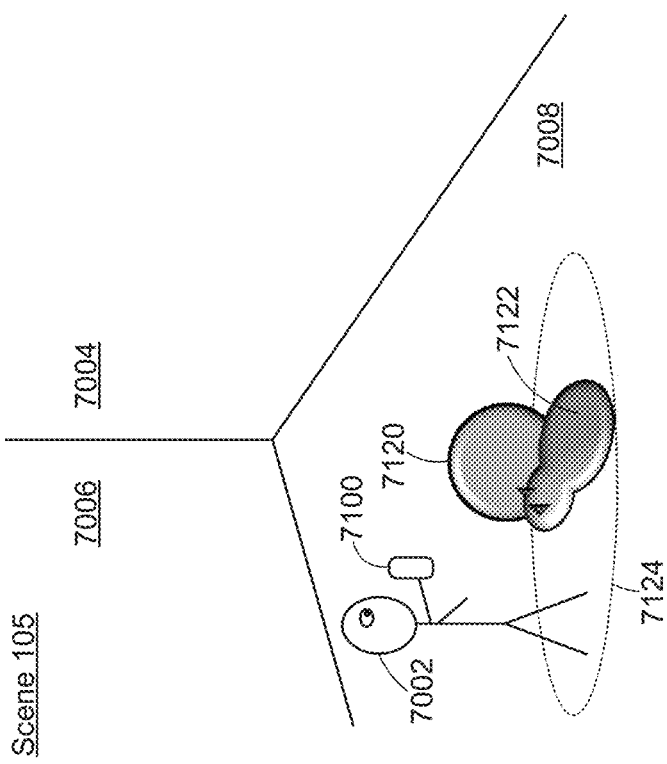

FIGS. 7G and 7H illustrate that, at a later time, the physical objects 7120 and 7122 have both moved even closer to the user, and fully entered the preset spatial portion 7124 surrounding the user and would be within the user's field of view if the display generation component were removed.

As shown in FIG. 7H, the computer system alters the appearance of the virtual content (e.g., virtual object 7130 and at least a portion of the virtual object 7128, etc.) displayed at a position that corresponds to the location of a second portion of the physical object 7122 (e.g., head portion and at least a part of the body portion of the physical object 7122) in accordance with the appearance of the second portion of the physical object 7122 (e.g., a portion that includes the first portion of the physical object 7122 and additional portion of the physical object 7122 that has entered the preset spatial region 7124 surrounding the user). As shown in FIG. 7H, the virtual content shown at the position corresponding to the location of the second portion of the physical object 7122 is removed and reveals a representation 7122-2' of the second portion of the physical object 7122 (e.g., a greater portion of the physical object 7122 than that corresponding to the representation 7122-1' shown in FIG. 7F). In some embodiments, the visual characteristics (e.g., color, simulated refractive index, transparency level, brightness, etc.) of the virtual content shown at the position corresponding to the location of the second portion of the physical object 7122 is changed in accordance with the appearance of the second portion of the physical object 7122. In some embodiments, as shown in FIG. 7H, the virtual content at a position corresponding to the location of some parts of the portion of the physical object 7122 within the preset spatial region 7124 is not altered in the view of the three-dimensional environment 7126, even though those parts of the portion of the physical object are within the threshold distance of the user, and would be within the user's natural field of view at this moment if the display generation component were removed. In some embodiments, the virtual content at the position corresponding to the location of all parts of the portion of the physical object 7122 within the preset spatial region 7124 may eventually be removed or altered in the view of the three-dimensional environment 7126 after a period of time that the portion of the physical object 7122 remains within the preset spatial region 7124.

In this example, the physical object 7120 does not meet the requirement for qualifying as a physical object of significance to the user 7002, and accordingly, the computer system does not alter the appearance of the virtual content displayed at a position that corresponds to the location of a second portion of the physical object 7120 in accordance with the appearance of the second portion of the physical object 7120. As shown in FIG. 7H, the virtual content shown at the position corresponding to the location of the second portion of the physical object 7120 is not removed and second first portion of the physical object 7120 is not visible in the view of the three-dimensional environment 7126, in FIG. 7H.

In some embodiments, there is no clear structural or visual divisions between the portion of the physical object 7122 that is revealed in the view of the three-dimensional environment 7126 and other portions of the physical object 7122 that are not revealed in the view of the three-dimensional environment that provide the basis for the different treatments applied to the different portions of the first physical object; instead, the difference is based on the fact that the portion of the physical object 7120 that is revealed is within the threshold distance or region of the user while the other portions of the physical object 7122 are not within the threshold distance or region of the user. For example, the physical object 7122 is a pet, and at a given time, the portion of the physical object that is revealed by the removal of the virtual content or change in the appearance of the virtual content includes a first portion of the pet's head (e.g., nose, whiskers, part of the face, etc.), and the remaining portions of the physical object that are not revealed by the removal or change in the virtual content includes additional portions of the pet's head (e.g., remainder of the face and ears, etc.) and torso connected to the head that are not within the threshold distance of the user.

In some embodiments, the portion of the virtual content that is altered or removed to reveal the presence of a portion of the physical object 7122 that is within the preset spatial region 7124 is part of a continuous virtual object or surface, and other parts of the continuous virtual object or surface continues to be displayed without alteration. For example, as shown in FIG. 7F, only part of the virtual object 7130 is removed or altered in appearance to reveal the presence of a portion of the physical object 7122 at a location that is within the preset spatial portion 7124 and that has a corresponding position at the position of the part of the virtual object 7130.

In some embodiments, the physical object 7122 qualifies as a physical object of significance to the user 7002 based on a first characteristic that is detected by the computer system and that distinguishes between a person and non-person physical objects. In some embodiments, the first characteristic includes a preset facial structure (e.g., presence and/or movement of eyes, relative locations of eyes, nose, and mouth, etc.), proportions and relative positions of body parts (e.g., head, body, and limbs, etc.),) on the physical object 7122, human speech that accompanies the movement of the physical object 7122, movement pattern associated with human walking or running (e.g., swing of arms, gait, etc.), etc. The physical object 7120 does not quality as a physical object of significance to the user 7002 because the first characteristic is absent from the physical object 7120.

In some embodiments, the physical object 7122 qualifies as a physical object of significance to the user 7002 based on a second characteristic that is detected by the computer system and that is indicative of human speech coming from the physical object 7122 as the physical object 7122 is moving toward the user. In some embodiments the second characteristic includes preset vocal characteristics (e.g., presence of a voiceprint, speech patterns of a human language, etc.) of sound originating from a location of the physical object 7122, characteristics of human speech that accompanies the movement of the physical object 7122, utterance of one or more preset words (e.g., "Hi!" "Hey!" "Hello!", "[user's name]", etc. The physical object 7120 does not quality as a physical object of significance to the user 7002 because the second characteristic is absent from the physical object 7120.

In some embodiments, the physical object 7122 qualifies as a physical object of significance to the user 7002 based on a third characteristic that is detected by the computer system and that distinguishes an animal from a person and non-person physical objects. In some embodiments the third characteristic includes a preset head structure (e.g., presence and/or movement of eyes, relative locations of eyes, nose, ears, whiskers, and mouth, etc.), proportions and relative positions of body parts (e.g., head, body, tail, and limbs, etc.), presence of fur, coat color and pattern, etc.) on the physical object 7122, detection of animal calls vs. human speech that accompanies the movement of the physical object 7122, detection of movement pattern associated with animal walking or running (e.g., four legs on the ground, flapping of wings, gait, etc.) etc. The physical object 7120 does not quality as a physical object of significance to the user 7002 because the third characteristic is absent from the physical object 7120.

In some embodiments, the physical object 7122 qualifies as a physical object of significance to the user 7002 based on a fourth characteristic that is detected by the computer system and that is based on a characteristic movement speed of the physical object 7122 exceeding a preset threshold speed. In some embodiments the characteristic movement speed includes a movement speed of at least a portion of the physical object relative to another portion of the physical object or the physical environment (e.g., waving hand of a person, popping cork shooting off a bottle, etc.), or movement speed of at least a portion of the physical object toward the user, etc. The physical object 7120 does not quality as a physical object of significance to the user 7002 because its characteristic movement speed did not meet the preset threshold movement speed.

In some embodiments, the physical object 7122 qualifies as a physical object of significance to the user 7002 based on a fifth characteristic of the physical object 7122 that is detected by the computer system and that is indicative of occurrence of an event that requires the user's immediate attention (e.g., an emergency, danger, etc.). In some embodiments, the fifth characteristic includes flashing lights, movement pattern (e.g., door or window opening, closing, etc., a person waving, etc.), vibration (e.g., shaking of a sign, curtain, falling objects, etc.), shouting, siren, etc. The physical object 7120 does not quality as a physical object of significance to the user 7002 because the fifth characteristic is absent from the physical object 7120.

In some embodiments, the physical object 7122 qualifies as a physical object of significance to the user 7002 based on a sixth characteristic of the physical object 7122 that is detected by the computer system and that is indicative of presence of an identifier object (e.g., RFID, badge, ultrasonic tag, serial number, logo, name, etc.) on the physical object. The physical object 7120 does not quality as a physical object of significance to the user 7002 because the sixth characteristic is absent from the physical object 7120.

In some embodiments, the physical object 7122 qualifies as a physical object of significance to the user 7002 based on a seventh characteristic of the physical object 7122 that is detected by the computer system and that is based on a movement pattern of the physical object (e.g., movement pattern of at least a portion of the physical object relative to another portion of the physical object or the physical environment, or movement pattern of at least a portion of the physical object relative to the user, etc.). The physical object 7120 does not quality as a physical object of significance to the user 7002 because the seventh characteristic is absent from the physical object 7120.

In some embodiments, the physical object 7122 qualifies as a physical object of significance to the user 7002 based on an eighth characteristic of the physical object 7122 that is detected by the computer system and that that is based on a match (e.g., a match or correspondence above a threshold confidence value as determined by a computer algorithm or artificial intelligence (e.g., facial recognition, voice recognition, speech recognition, etc.) based on detected sensor data, image data, etc.) between a recognized identity (e.g., spouse, favorite pet, boss, children, police, conductor on train, etc.) of the physical object and a first preset identity (e.g., identifies previously established as "important", "needing attention", etc.). The physical object 7120 does not quality as a physical object of significance to the user 7002 because the eighth characteristic is absent from the physical object 7120.

FIGS. 7I-7N are block diagrams that illustrate applying a visual effect to a region in a three-dimensional environment that corresponds to a portion of the physical environment that has been identified (e.g., characterized by a shape, plane, and/or surface, etc.) based on a scan of the portion of the physical environment, in accordance with some embodiments.

Figure 7J:
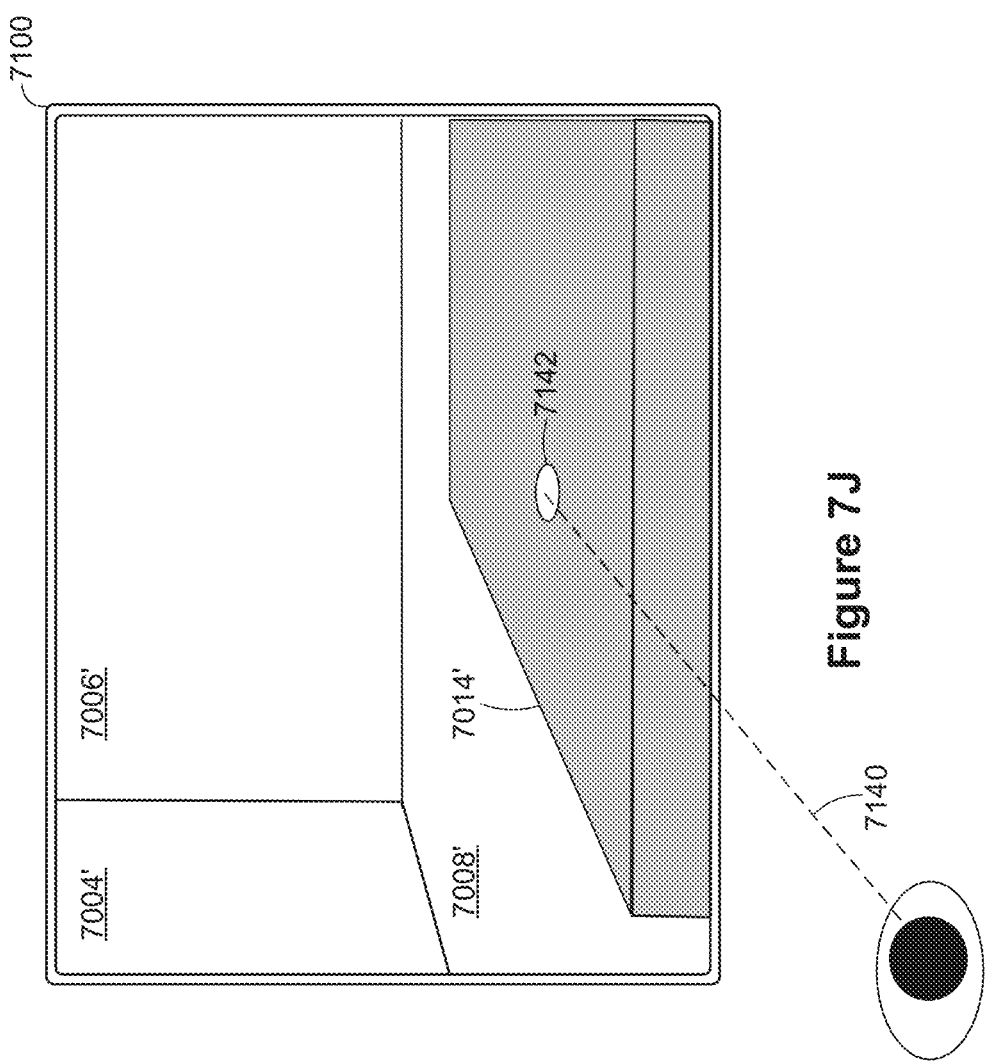

In some embodiments, a computer system displays a representation of a physical environment (e.g., scene 105 in FIG. 7I, another physical environment, etc.) in response to a request to display a three-dimensional environment that includes the representation of the physical environment (e.g., in response to the user putting on a head-mounted display, in response to a user's request to start an augmented reality environment, in response to a user's request to exit a virtual reality experience, in response to the user turning on or waking up the display generation component from a low-power state, etc.). In some embodiments, the computer system initiates a scan of the physical environment to identify objects and surfaces (e.g., walls 7004, 7006, floor 7008, object 7014, etc.) in the physical environment and optionally build a three-dimensional or pseudo-three-dimensional model of the physical environment based on the identified objects and surfaces in the physical environment. In some embodiments, the computer system initiates the scan of the physical environment in response to receiving the request to display the three-dimensional environment (e.g., if the physical environment has not been scanned and characterized before by the computer system, or if a rescan is requested by the user or the system based on preset rescanning criteria being met (e.g., the last scan was performed more than a threshold amount of time before, the physical environment has changed, etc.), etc.). In some embodiments, the computer system initiates the scan in response to detecting the user's hand (e.g., hand 7202 in FIG. 7K) touching a portion of the physical environment (e.g., a physical surface (e.g., top surface of physical object 7014, surface of wall 7006, etc.), a physical object, etc.). In some embodiments, the computer system initiates the scan in response to detecting that a user's gaze (e.g., gaze 7140 in FIG. 7J, another gaze, etc.) that is directed to a position corresponding to a portion of the physical environment meets preset stability and/or duration criteria. In some embodiments, the computer system displays visual feedback (e.g., visual effect 7144 in FIGS. 7K-7L) regarding progress and results of the scan (e.g., identification of physical objects and surfaces, determination of physical and spatial characteristics of the physical objects and surfaces, etc. in the physical environment). In some embodiments, the visual feedback includes displaying a respective visual effect (e.g., visual effect 7144) at a respective portion of the three-dimensional environment that corresponds to a portion of the physical environment that is touched by the user's hand (e.g., the top surface of the physical object 7014) and that has been identified based on a scan of the portion of the physical environment. In some embodiments, as shown in FIGS. 7K-7L, the visual effect (e.g., visual effect 7144) expands from the respective portion of the three-dimensional environment (e.g., the position that corresponds to the touch location of the hand 7202), and/or includes representation of a movement that propagates out from the respective portion of the three-dimensional environment. In some embodiments, the computer system displays the visual effect in response to detecting the user's hand touching a respective portion of the physical environment, while the three-dimensional environment is displayed in response to an earlier request for displaying the three-dimensional environment and after the scan of the physical environment has been completed.

In some embodiments, when scans of a physical environment is performed by a computer system in preparation of generating a mixed reality environment (e.g., augmented reality environment, augmented virtuality environment, etc.), it is sometimes helpful to receive a user input that identifies a region of interest and/or a region of well-defined surface or plane to anchor the scanning of the physical environment and identifying the objects and surfaces in the physical environment. It is also advantageous to provide visual feedback to the user regarding the progress and result of the scan and characterization of the physical environment from a position that corresponds to the location of the user's input, such that if the position does not result in correct characterization, the user can adjust the input and restart the scan from a different location or surface in the physical environment. In some embodiments, after a physical surface is scanned and identified based on the scan, the computer system displays an animated visual effect at a position that corresponds to the identified surface, and the animated visual effect is started and propagates from a position that corresponds to a contact location between the physical surface and the user's hand. In some embodiments, in order to further ascertain the location of interest, the computer system requires that a gaze input be detected at the position of the physical surface that the user is touching. In some embodiments, the position of the gaze does not need to overlap with the position that corresponds to the location of the user's touch, as long as both positions are on the same extended physical surface and/or within a threshold distance of each other.

Figure 7I:
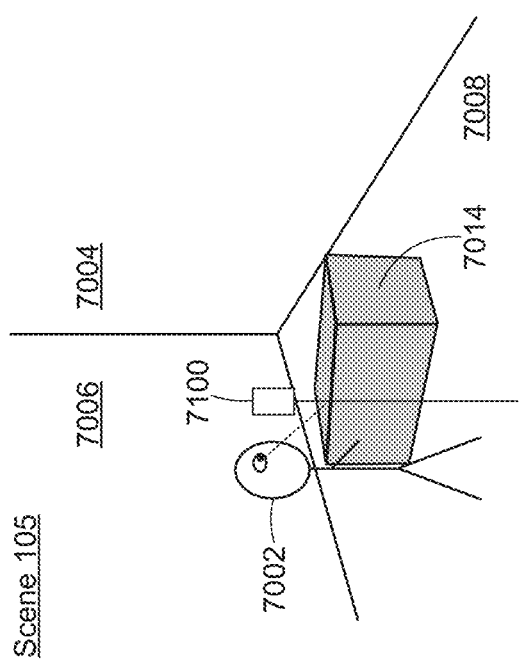
Figure 7L:
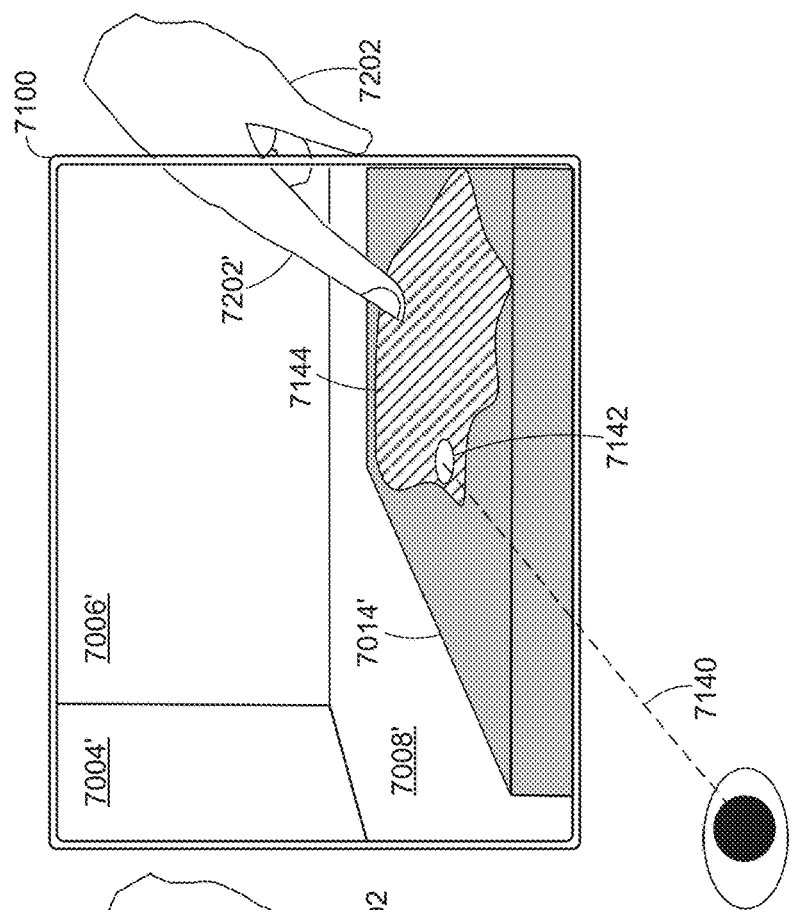
Figure 7K:
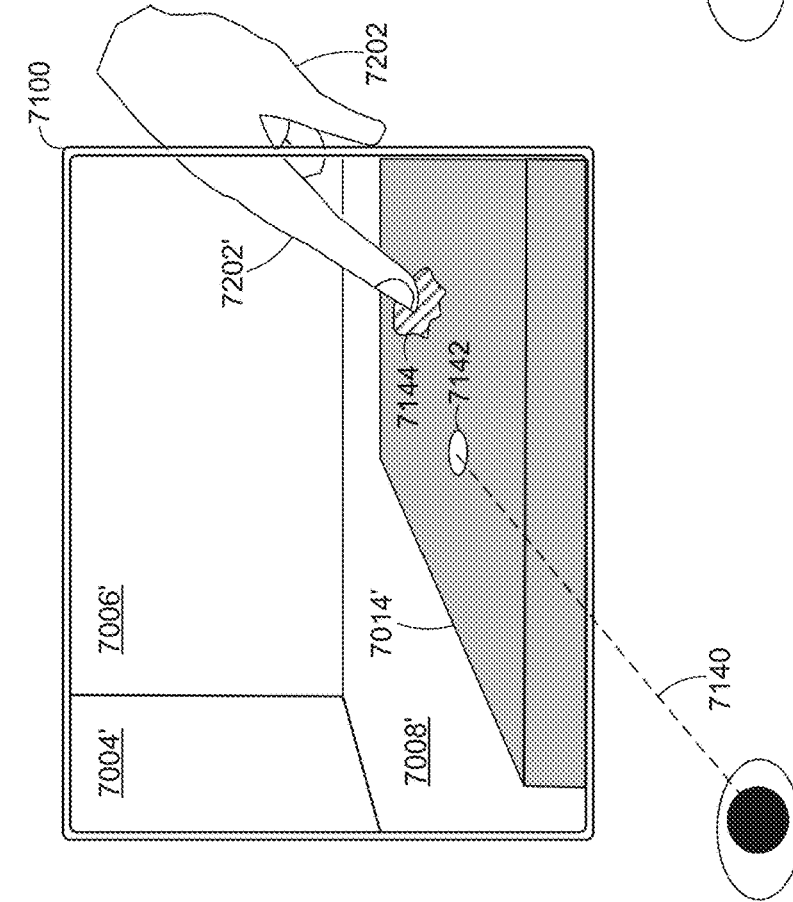
Figure 7P:
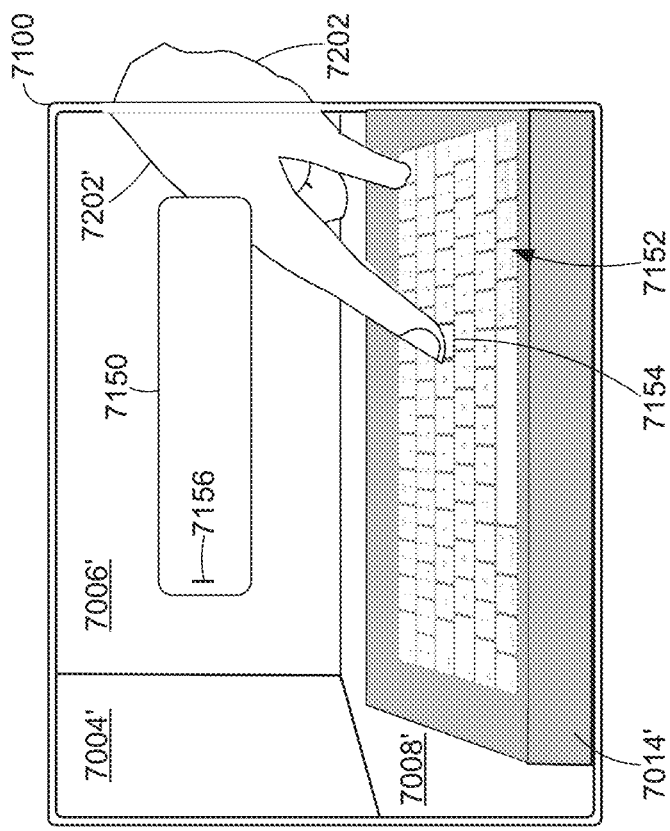
FIGS. 7O-7Q are block diagrams that illustrate displaying an interactive user interface object at a position in a three-dimensional environment that corresponds to a first portion of a physical environment (e.g., a location of a physical surface, or a location in free space, in a physical environment), and selectively forgoing display of a respective sub-portion of the user interface object in accordance with a location of a portion of the user (e.g., the user's finger, hand, etc.) that moves in the space between the first portion of physical environment and a location that corresponds to a viewpoint of the currently displayed view of the three-dimensional environment, in accordance with some embodiments.
Figure 7O:
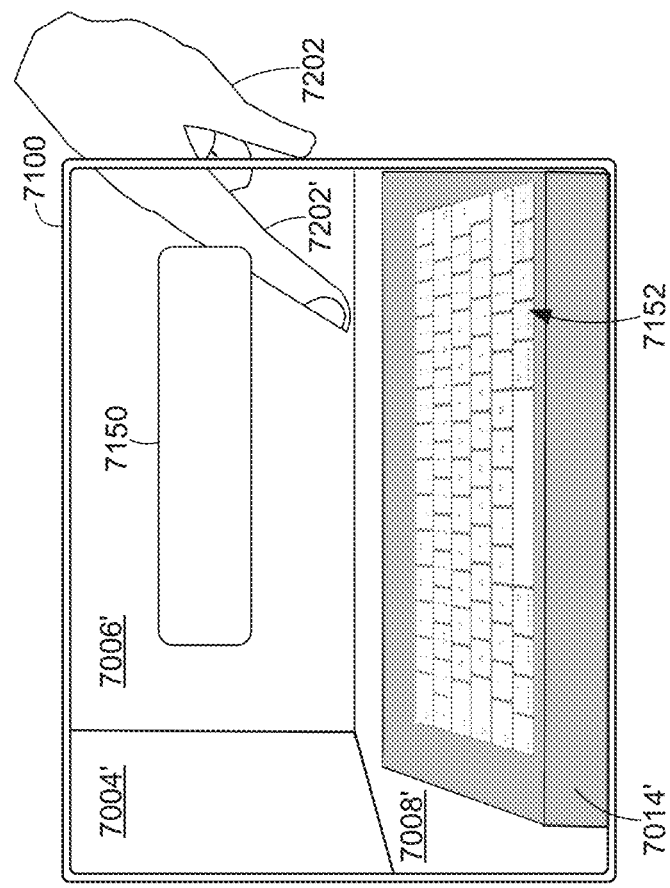
Figure 7Q:
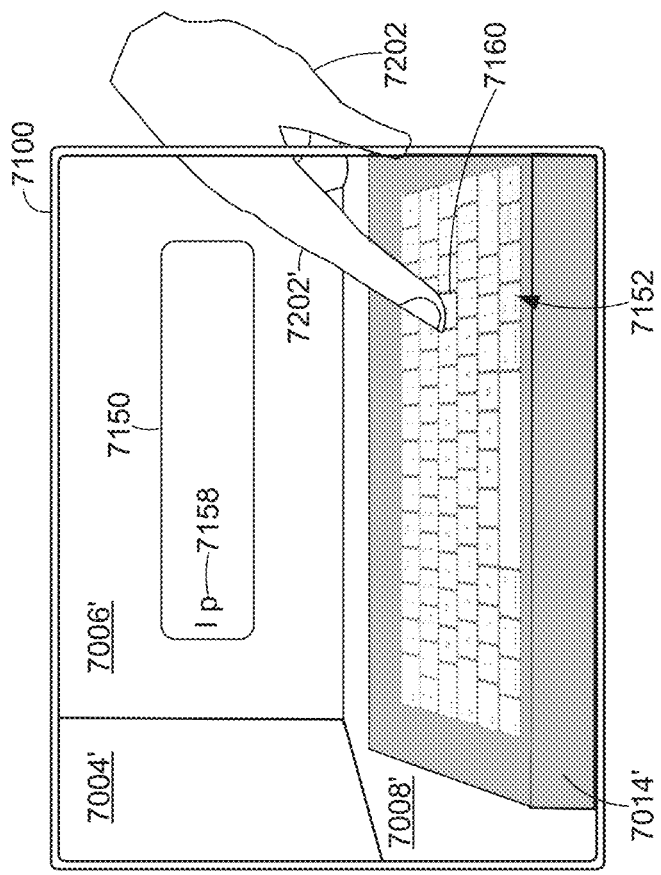

As shown in FIG. 7I, a user 7002 is present in a physical environment (e.g., scene 105, or another physical environment, etc.). The user 7002 is in a position relative to a display generation component (e.g., display generation component 7100, another type of display generation component, such as an HMD, etc.) to view the content displayed via the display generation component. In some embodiments, the display generation component has a fixed spatial relationship with the user's head. In some embodiments, the display generation component encloses the user's eyes and blocks the user's view of the physical environment, except for the view provided via the display generation component. In some embodiments, as shown in FIG. 7C, the physical environment includes physical objects (e.g., physical object 7014, and other physical objects, etc.) and physical surfaces (e.g., walls 7004 and 7006, floor 7008, etc.). The user may look at different locations in the physical environment through a view of the physical environment provided via the display generation component, and the location of the user's gaze is determined by an eye tracking device, such as the eye tracking device disclosed in FIG. 6. In this example, the physical object 7014 has one or more surfaces (e.g., a horizontal top surface, a vertical surface, a planar surface, a curved surface, etc.).

FIG. 7J displays a view 7103 of the physical environment 105 that is displayed via the display generation component. The view of the physical environment includes representations of physical surfaces and objects in a portion of the physical environment from a viewing perspective of a viewpoint that corresponds to the location of the display generation component 7100 in the physical environment (e.g., a location that also corresponds to the user's eyes or head when the display generation component 7100 is an HMD), in accordance with some embodiments. In FIG. 7J, the view 7103 of the physical environment includes representations 7004' and 7006' of two adjacent walls (e.g., walls 7004 and 7006) in the physical environment of the user and the display generation component, a representation 7008' of the floor 7008, and representation 7014' of the physical object 7014 (e.g., furniture, objects, appliances, etc.) in the physical environment. The spatial relationships among the physical surfaces and physical objects in the physical environment are represented in the three-dimensional environment by the spatial relationships among the representations of the physical surfaces and physical objects in the three-dimensional environment, in accordance with some embodiments. When the user moves the display generation component relative to the physical environment, a different view of the physical environment from a different viewing perspective is displayed via the display generation component. In some embodiments, when the physical environment is an unknown environment for the computer system, the computer system performs a scan of the environment to identify surfaces and planes and builds a three-dimensional model for the physical environment. After the scan, the computer system can define positions of virtual objects relative to the three-dimensional model, so that the virtual objects can be positioned in a mixed reality environment based on the three-dimensional model with various spatial relationships to the representations of the physical surfaces and objects in the three-dimensional environment, in accordance with some embodiments. For example, a virtual object is optionally given an upright orientation relative to the three-dimensional model, and may be displayed at a position and/or with an orientation that simulates a certain spatial relationship (e.g., overlaying, standing on, parallel to, perpendicular to, etc.) with a representation of a physical surface or object.

In some embodiments, as shown in FIG. 7J, the computer system detects a gaze input (e.g., gaze input 7140, in this example) directed to a portion of the representation of the physical environment in the view 7013 of the three-dimensional environment. In some embodiments, the computer system displays a visual indication (e.g., visual indication 7142) at the position of the gaze. In some embodiments, the position of the gaze is determined based on a the user's line of sight and a focal length of the user's eyes as detected by the eye tracking device of the computer system. In some embodiments, the precise location of the user's gaze is difficult to ascertain to a high degree before the scan of the physical environment has been completed. In some embodiments, the area occupied by the representation 7014' of the physical object can be identified by two-dimensional image segmentation, before the three-dimensional scan of the physical environment is performed or completed, and a location of the gaze can be determined to be the area occupied by the representation 7014' as determined by the two-dimensional segmentation.

In some embodiments, as the user moves the display generation component around the physical environment and looking at different surfaces or objects through the display generation component in search of a suitable position to start the scan, the computer provides real-time feedback to indicate to the user the location of the gaze in the portion of the physical environment that is currently within the field of view provided by the display generation component.

In FIGS. 7K-7L, while the user's gaze 7140 is directed to the representation 7014' of the physical object 7014, the computer system detects that the user's hand has moved in the physical environment to a first location on the top surface of the physical object 7014, and maintains contact with the top surface of the physical object 7014 at the first location. In response to detecting the user's hand 7202 making contact with the top surface of the physical object 7014 (e.g., optionally, in conjunction with the detection of the user's gaze 7140 on the same surface of the physical object 7014, etc.), the computer system starts scanning the physical environment from the location of the user's hand (e.g., from the location of contact between the user's hand and the top surface of the physical object 7014). In some embodiments, the computer system, optionally, performs scans in other portions of the physical environment in addition to and in parallel to the scan at the location of the user's hand. As the portion of the surface of the physical object 7014 near the location of contact is scanned and characterized (e.g., as a planar surface, or a curved surface, etc.), the computer system displays visual feedback to indicate the result and progress of the scan. In FIG. 7K, the appearance of a portion of the representation 7014' at and near the position that corresponds to the location of the user's contact with the physical object 7014 is altered by a visual effect (e.g., highlighted, animated, and/or changed in color, brightness, transparency, and/or opacity, etc., etc.). The visual effect has one or more spatial characteristics (e.g., position, orientation, surface characteristics, spatial extent, etc.) that are based on the result of the scan at the portion of the physical surface at or near the location of the user's contact with the physical object. For example, in this case, the computer system determines, based on the scan of the region near the location of the tip of the index finger (e.g., the location of the contact between the user's hand 7202 and the physical object 7014), that the representation 7014' is a planar surface with a horizontal orientation at the position corresponding to the location of the tip of the user's hand 7202. The tip of the user's finger provides an anchor location for the surface scan, in some embodiments. In some embodiments, the depth data of the physical environment at the location of the tip of the user's finger is correlated with the depth data of the user's fingertip, and the accuracy of the scan is improved with this additional constraint.

In FIGS. 7L-7M, while the user's hand 7202 maintains contact with the top surface of the physical object 7014 in the physical environment, optionally, at the initial touch location on the top surface of the physical object 7014, the computer system continues to apply and display the visual feedback 7144 to indicate the progress of the scan and the identification of additional portions of the physical surface that is connected to the initial touch location on the top surface of the physical object 7014. In FIG. 7M, the scan and identification of the top surface of the physical object 7014 is completed and the visual effect has spread from the position that corresponds to the initial touch location of the top surface of the physical object 7014 to cover the entirety of the top surface of the representation 7014'. In some embodiments, the spreading of the visual effect 7144 is stopped once the boundary of the physical surface is identified and the visual effect has been applied to the representation of the entire surface. In some embodiments, the visual effect 7144 continues to spread to representations of additional portions of the physical environment that have been scanned and characterized in the meantime. In some embodiments, the computer system detects movement of the user's hand 7202 that moves the point of contact to other locations on the top surface of the physical object 7014 and starts a new scan from the new touch location of the physical object or continues the previous scan in parallel with the new scan. In some embodiments, as the scans from the one or more touch locations continue, the corresponding visual effects are spreading from the positions corresponding to the touch locations based on the results of the scans. In some embodiments, while the gaze 7140 is detected on the top surface of the physical object 7014, the computer system detects the user's finger moving across multiple positions along a path on the top surface of the physical object 7014, and optionally performs the scan from the location of the path and spreading the visual effect from the location of the path or area that is touched by the user's hand. With the depth data at more points on the top surface as the constraints for the scan, the scan may be performed with more accuracy and speed than from a single point of touch, in accordance with some embodiments.

In FIGS. 7M-7N, while displaying the visual effect at the position that corresponds to the location of the user's hand touching the top surface of the physical object 7014 in accordance with the physical surface identified by the scan performed by the computer system, the computer system detects movement of the user's hand that results in breaking of contact from the top surface of the physical object 7014. In response to detecting that the hand of the user has moved away from the surface of the physical object 7014, the computer system ceases to display the visual effect at the position of the surface that has been identified based on the scan, as shown in FIG. 7N. The representation 7014' is restored to its original appearance before the application of the visual effect 7144 in FIG. 7N.

In some embodiments, after the scan is completed and the physical object and surfaces within the portion of the physical environment have been identified, if the computer system detects the user's contact with the physical surface (e.g., by the user's hand 7202, another hand, etc.), the computer system, optionally, redisplays the visual effect 7144 to illustrate the spatial characteristics of the physical surface that starts from the position that corresponds to the location of the user's touch. In some embodiments, the visual effect is applied to the representation of the entire physical surface as soon as the touch is detected on the physical surface. In some embodiments, the visual effect grows and expands from the position that corresponds to the location of the touch gradually across the representation of the physical surface.

In some embodiments, the representation 7014' of the physical object 7014 is provided by a camera view of the physical environment, and the visual effect 7144 replaces display of at least a portion of the representation 7014' of the physical object in the view of the three-dimensional environment displayed via the display generation component. In some embodiments, the representation 7014' of the physical object 7014 is provided by a camera view of the physical environment, and the visual effect is projected onto the surface of the physical object and overlays a portion of the surface of the physical object in the physical environment, and is viewed as part of camera view of the physical environment. In some embodiments, the representation 7014' of the physical object is part of a view of the physical environment that is visible through a transparent or semi-transparent portion of the display generation component, and the visual effect is displayed by the display generation component at a position that blocks the view of at least a portion of the surface of the physical object 7014. In some embodiments, the representation 7014' of the physical object is part of a view of the physical environment that is visible through a transparent or semi-transparent portion of the display generation component, and the visual effect is projected onto the surface of the physical object 7014 and overlays a portion of the surface of the physical object 7014 in the physical environment and is viewed as part of the physical environment through the transparent or semi-transparent portion of the display generation component. In some embodiments, the visual effect is projected directly onto the user's retina overlaying an image of the portion of the surface of the physical object 7014 on the retina.

In some embodiments, if the user's hand 7202 touches a different portion of the physical environment, such as the wall 7006 or floor 7008, etc., the computer system applies the visual effect to a position that corresponds to the surface that is identified at or near the location of the user's touch on said different portion of the physical environment (e.g., visual effect is applied to the vertical surface of the representation 7006' of the wall, or the horizontal surface of the representation 7008' of the floor, etc.).

In some embodiments, detection of the gaze and touch inputs on a respective portion of the physical environment are concurrently required in order for the computer system to start the scan in the portion of the physical environment and/or display the visual effect in accordance with the result of the scan in the portion of the physical environment. In some embodiments, if the user's gaze is removed from the respective portion of the physical environment, the computer system ceases to display the visual effect and optionally ceases to continue with the scan in the portion of the physical environment, even if the touch of the user's hand remains detected on the respective portion of the physical environment.

In some embodiments, the visual effect 7144 is an animated visual effect that causes animated visual changes in the region to which it is applied. In some embodiments, the animated visual changes include a shimmering light and/or color variations that change over time in an area in the view of the physical environment to which the visual effect is applied. In some embodiments, the area to which the visual effect is applied does not change (e.g., in terms of size, shape, and/or content, etc., displayed in the area) when the animated visual changes are occurring (e.g., the visual effect affects the appearance of the area with one or more filters or modification functions applied to the original content of the area, while visual features (e.g., shape, size, object type, etc.) of the content remain discernable by a viewer). In some embodiments, the area in the three-dimensional environment to which the visual changes are applied expands as the animated visual changes are occurring.

In some embodiments, the computer system applies different visual effects for different portions of the surface that is touched by the user's hand. In some embodiments, the surface that is touched by the user's hand spans an extended area, and the surface characteristics may be different for different portions of the extended area. In some embodiments, when the user touches a peripheral portion of the extended surface, the visual effect shows an animated movement toward the central portion of the representation of the surface, while when the user touches a central portion of the extended surface, the visual effect shows a different animated movement toward the peripheral region of the representation of the surface. In some embodiments, when the different visual effects are applied to the same extended region on the surface, the visual effects would appear to be different, due to the different starting location and propagation direction of the animated movement. In some embodiments, the different visual effects are generated in accordance with the same baseline visual effect (e.g., a gray overlay, a shimmering visual effect, rippling waves, growing mesh wires, etc.), and the difference between the different visual effects include different animations generated in accordance with the same baseline visual effect (e.g., baseline growing gray overlays with different shaped boundary lines, baseline shimmering visual effects modified using different spatial relationships between a virtual light source and an underlying surface, baseline rippling waves modified with different wavelengths and/or origins, baseline mesh wire patterns modified with different starting locations, etc.).

In some embodiments, after the scan is completed and the surfaces in the physical environment have been identified, the surfaces can be highlighted or visually indicated in the view of the physical environment. When the computer system detects a contact between the user's hand and a surface that has already been scanned and characterized based on the scan, the computer system displays an animated visual effect that starts from the position on the representation of the surface that corresponds to the location of the touch, and propagate across the representation of the surface in accordance with the spatial characteristics of the surface determined based on the scan. In some embodiments, the animated visual effect persists as long as the contact is maintained on the surface. In some embodiments, the computer system requires that the location of the contact remains substantially stationary (e.g., having less than a threshold amount of movement in a threshold amount of time, not moving at all, etc.) in order to continue displaying the animated visual effect. In some embodiments, the computer system requires that the location of the contact remains on the same extended surface (e.g., stationary, or moving within the extended surface, etc.) in order to continue displaying the animated visual effect. In some embodiments, the computer system ceases to display the animated visual effect in response to detecting movement of the contact across the surface or movement of the hand away from the surface. In some embodiments, the computer system ceases to display the animated visual effect in response to detecting the movement of the user's hand away from the surface and no longer making contact with the surface. In some embodiments, the computer system stops the animated visual effect and maintains display of a static state of the visual effect in response to detecting movement of the contact across the surface and/or movement of the hand away from the surface. In some embodiments, the computer system stops the animated visual effect and maintains display of a static state of the visual effect in response to detecting the movement of the user's hand away from the surface and no longer making contact with the surface.

In some embodiments, the visual effect that is described herein is displayed during a process that generates a spatial representation of at least a portion the physical environment, and, optionally, after the spatial representation of the portion of the physical environment has been generated, in response to detecting the user's hand touching the portion of the physical environment.

In some embodiments, display of the visual effect as described herein is triggered when the computer system switches from displaying a virtual reality environment to displaying a representation of the physical environment and/or an augmented reality environment. In some embodiments, display of the visual effect as described herein is triggered when the computer system detects that the display generation component is placed into a spatial relationship relative to a user that enables the user to view the physical environment via the display generation component (e.g., when the HMD is placed on the user's head, in front of the user's eyes, held in front of the user's face, when the user walks or sits down in front of a heads-up display, when the user turns on the display generation component to view a pass-through view of the physical environment, etc.). In some embodiments, display of the visual effect as described herein is triggered when the computer system switches from displaying a virtual reality environment to displaying a representation of the physical environment and/or an augmented reality environment, optionally, without requiring the user's touch on a portion of the physical environment (e.g., visual effect is displayed in response to detection of a gaze on the portion of the physical environment, or optionally started at a default location without the user's gaze, etc.). In some embodiments, display of the visual effect as described herein is triggered when the computer system detects that the display generation component is placed into a spatial relationship relative to a user that enables the user to view the physical environment via the display generation component, optionally, without requiring the user's touch on a portion of the physical environment (e.g., visual effect is displayed in response to detection of a gaze on the portion of the physical environment, or optionally started at a default location without the user's gaze, etc.).

FIGS. 7O-7Q are block diagrams that illustrate displaying an interactive user interface object at a position in a three-dimensional environment that corresponds to a first portion of a physical environment (e.g., a location of a physical surface, a location in free space, etc., in a physical environment), and selectively forgoing display of a respective sub-portion of the user interface object in accordance with a location of a portion of the user (e.g., the user's finger, hand, etc.) that moves in the space between the first portion of physical environment and a location that corresponds to a viewpoint of the currently displayed view of the three-dimensional environment, in accordance with some embodiments.

In some embodiments, a computer system displays an interactive user interface object (e.g., user interface object 7152, another user interface object, such as a control panel, a user interface object including selectable options, a unitary control object, etc.) in a three-dimensional environment (e.g., environment 7151, or another environment, etc.). The computer system also displays a representation of a physical environment (e.g., environment 105 in FIG. 7I, another physical environment, etc.) in the three-dimensional environment, where the interactive user interface object has a respective spatial relationship relative to various positions in the three-dimensional environment that correspond to different locations in the physical environment. When the user interacts with the three-dimensional environment with a portion of the user's hand (e.g., hand 7202, a finger of the hand 7202, etc.), such as one or more fingers of the user's hand or the whole hand, through touch inputs and/or gesture inputs, a portion of the user (e.g., including a portion of the user's hand, the whole hand, and possibly the wrist and arm connected to the hand, etc.) may enter a spatial region that is between a location that corresponds to the position of the user interface object (e.g., the location of a physical object or physical surface, a location in free space in the physical environment, etc.) and a location that corresponds to the viewpoint of the currently displayed view of the three-dimensional environment (e.g., the location of the user's eyes, the location of the display generation component, the location of the camera that captures the view of the physical environment shown in the three-dimensional environment, etc.). The computer system, based on the spatial relationships between the location of the user's hand, the location that corresponds to the position of the user interface object, and the location that corresponds to the viewpoint, determines which portion of the user interface object would be visually blocked by the portion of the user and which portion of the user interface object would not be visually blocked by the portion of the user when viewed by a user from the location of the viewpoint. The computer system then ceases to display a respective portion of the user interface object that would be visually blocked by the portion of the user (e.g., as determined by the computer system), and instead allows the representation of the portion of the user to be visible at the position of the respective portion of the user interface object, while maintaining display of another portion of the user interface object that would not be visually blocked by the portion of the user (e.g., as determined by the computer system), as shown in FIG. 7P. In some embodiments, in response to detecting movement of the portion of the user or the movement of the viewpoint (e.g., due to movement of the display generation component, movement of the camera that captures the physical environment, movement of the user's head or torso, etc.), the computer system, based on the new spatial relationships between the portion of the user, the location corresponding to the viewpoint, and the location corresponding to the position of the user interface object, reevaluates which portion of the user interface object would be visually blocked by the portion of the user and which portion of the user interface object would not be visually blocked by the portion of the user when viewed by a user from the location of the viewpoint. The computer system then ceases to display another portion of the user interface object that would be visually blocked by the portion of the user (e.g., as determined by the computer system), and allowing a portion of the user interface object that ceased to be displayed earlier to be restored in the view of the three-dimensional environment, as shown in FIG. 7Q.

In some embodiments, when a user interacts with a user interface object (e.g., user interface object 7152, another user interface object, such as a control panel, a user interface object including selectable options, a unitary control object, etc.) in an augmented reality environment or a virtual reality environment, tactile sensation provided by a physical surface in the physical environment helps the user to better oriented the user's spatial sense in the augmented reality environment or the virtual reality environment, so that the user can provide more accurate inputs when interacting with the user interface object. In some embodiments, a physical surface can include touch sensors that provide more accurate information (e.g., touch location, touch duration, touch intensity, etc.) regarding the user's touch on the physical surface, which enables more varied and/or refined inputs for interacting with the user interface object or portions thereof. In some embodiments, a physical surface may include surface characteristics (e.g., bumps, buttons, textures, etc.) that help the user accurately locate his gesture or touch inputs relative to the surface features, and also get a more realistic experience with interacting with the user interface object that have visual features (e.g., virtual markers, buttons, textures, etc.) corresponding to the surface features on the physical surface.

As described herein, when the user interface object is displayed at a position that corresponds to the location of the physical surface with spatial characteristics corresponding to the spatial characteristics of the physical surface, the user interface object appears to overlay or augment a representation of the physical surface or a virtual surface having the spatial characteristics of the physical surface. In order to provide a more realistic and intuitive experience to the user when they user's interacts with the user interface object through touch inputs on the physical surface, the user interface object is visually segmented into multiple portions, where at least one portion of the multiple portions are visually obscured by a representation of the user's hand, when the user's hand is present in a portion of the physical space lying between the respective portion of the physical surface and the user's eyes. In other words, at least a portion of the user's hand (and optionally, other portions of the user that is connected with the hand) may intersect with the user's line of sight directed toward a respective portion of the user interface object, and blocks the user's view of the respective portion of the user interface object. In some embodiments, as the user's hand moves in the space between the physical surface and the user's eyes, at least a portion of the user's hand (and optionally, other portions of the user that is connected with the hand) may intersect with the user's line of sight directed toward a different portion of the user interface object, and blocks the user's view of said different portion of the user interface object, and a previously blocked portion of the user interface object may be revealed again.

In some embodiments, the physical surfaces includes one or more portions with spatial contours and surface textures that correspond to different types of user interface elements, such as buttons, sliders, ridges, circles, tick marks, switches, etc. In some embodiments, a respective portion of the user interface object that corresponds to a respective user interface element is optionally segmented into multiple sub-portions, and only some of the sub-portions are visually obscured by the representation of the user's hand in the view of the three-dimensional environment, while some of the sub-portions of the user interface element are not visually obscured by the representation of the user's hand in the view of the three-dimensional environment.

In FIGS. 7O-7Q, the display generation component 7100 displays a view of a three-dimensional environment 7151. In some embodiments, the three-dimensional environment 7151 is a virtual three-dimensional environment that includes virtual objects and virtual surfaces at various spatial positions within the three-dimensional environment. In some embodiments, the three-dimensional environment 7151 is an augmented reality environment that includes a representation of the physical environment with representations of physical objects and surfaces located at various positions that correspond to their respective locations in the physical environment, and virtual content that has positions relative to the positions of the representations of the physical objects and surfaces in the three-dimensional environment. In some embodiments, the view of the three-dimensional environment includes at least a first surface (e.g., a virtual surface, or a representation of a physical surface, etc.) at a position that corresponds to a location of a first physical surface, and has spatial characteristics (e.g., orientation, size, shape, surface profile, surface texture, spatial extent, etc.) corresponding to the spatial characteristics (e.g., orientation, size, shape, surface profile, surface texture, spatial extent, surface contour, etc.) of the first physical surface in the physical environment. In some embodiments, the physical surface is a surface of a table top, the surface of a wall, the surface of a display device, a surface of a touchpad, the surface of a user's lap, the surface of palm, a surface of a prototype object with buttons and hardware affordances, etc. In this example, the top surface of the physical object 7014 is used as a non-limiting example of the physical surface that is touched by the user's hand.

In this example, a first user interface object (e.g., a virtual keyboard 7152, a control panel with one or more control affordances, a menu with selectable options, a single unitary control object, etc.) that includes one or more interactive portions corresponding to respective operations is displayed at a position in the three-dimensional environment 7151 that corresponds to the location of the first physical surface (e.g., the top surface of the physical object 7014 represented by the representation 7014', the surface of the physical object at the location that correspond to the position of the virtual object 7014', etc.). The spatial characteristics of the first user interface object (e.g., a virtual keyboard 7152, a control panel with one or more control affordances, a menu including selectable options, a single unitary control object, etc.) correspond to the spatial characteristics of the first physical surface. For example, the first user interface object is planar and displayed parallel to the representation of the first physical surface when the first physical surface is planar. In another example, in some embodiments, the first user interface object has a surface profile that corresponds to the surface profile of the first physical surface and the positions of topological features (e.g., bumps, buttons, textures, etc.) on the first user interface object are aligned with the positions corresponding to the locations of corresponding topological features on the first physical surface. In some embodiments, the first user interface object has topological features that are not present at locations on the first physical surface that correspond to the positions of the topological features on the first user interface object.

As shown in FIG. 7O, the computer system displays a view of the three-dimensional environment 7151 via the display generation component 7100. The view of the three-dimensional environment 7151 includes representations of physical surfaces (e.g., representations 7004' and 7006' of vertical walls 7004 and 7006, representation 7008 of a horizontal floor 7008, representations of surfaces of physical objects, etc.) and objects (e.g., representation 7014' of a physical object 7014, representation of other physical objects, etc.) in a portion of the physical environment from a viewing perspective of a viewpoint that corresponds to the location of the display generation component 7100 in the physical environment (e.g., a location that also corresponds to the user's eyes or head when the display generation component 7100 is an HMD), in accordance with some embodiments. The spatial relationships among the physical surfaces and physical objects in the physical environment 105 are represented in the three-dimensional environment by the spatial relationships among the representations of the physical surfaces and physical objects in the three-dimensional environment 7151, in accordance with some embodiments. When the user moves the display generation component relative to the physical environment, the viewpoint of the currently displayed view is moved in the three-dimensional environment, resulting a different view of the three-dimensional environment 7151 from a different viewing perspective, in some embodiments. In some embodiments, the computer system performs a scan of the environment to identify surfaces and planes and builds a three-dimensional model for the physical environment. The computer system defines positions of virtual objects relative to the three-dimensional model, so that the virtual objects can be positioned in the three-dimensional environment with various spatial relationships to the representations of the physical surfaces and objects in the three-dimensional environment, in accordance with some embodiments. For example, a virtual object is optionally given an upright orientation relative to the three-dimensional environment 7151, and may be displayed at a position and/or with an orientation that simulates a certain spatial relationship (e.g., overlaying, standing on, parallel to, perpendicular to, etc.) with a representation of a physical surface or object (e.g., representation 7014' of the physical object 7014, representation 7008' of floor 7008, etc.).

In FIGS. 7O-7Q, the first user interface object (e.g., a virtual keyboard 7152, in this example) is displayed at a position that corresponds to a location of the first physical surface (e.g., the top surface of the physical object 7014 represented by the representation 7014', or the top surface of the physical object that is located at the location corresponding to the top surface of the virtual object 7014', etc.), with spatial characteristics of the first user interface object corresponding to the spatial characteristics of the first physical surface (e.g., parallel to the first physical surface, conforming to the surface profile of the first physical surface, etc.). In some embodiments, the computer system moves the first user interface object in response to the movement of the first physical surface in the physical environment. For example, in some embodiments, the first user interface object remains displayed with the same spatial relationship with the representation of the first physical surface in the three-dimensional environment during movement of the first physical surface in the physical environment.

In some embodiments, the representation 7014' of the physical object 7014 is provided by a camera view of the physical environment, and the first user interface object replaces display of at least a portion of the representation 7104' of the physical object in the view of the three-dimensional environment (e.g., environment 7151, or another augmented reality environment, etc.) displayed via the display generation component. In some embodiments, the representation 7014' of the physical object is provided by a camera view of the physical environment, and the first user interface object is projected onto the surface of the physical object 7014 and overlays a portion of the surface of the physical object 7014 in the physical environment and is viewed as part of camera view of the physical environment. In some embodiments, the representation 7014' of the physical object 7014 is part of a view of the physical environment that is visible through a transparent or semi-transparent portion of the display generation component, and the first user interface object is displayed by the display generation component at a position that blocks the view of at least a portion of the representation 7014' of the physical object 7014. In some embodiments, the representation 7014' of the physical object 7014 is part of a view of the physical environment that is visible through a transparent or semi-transparent portion of the display generation component, and the first use interface object is projected onto the surface of the physical object 7014 and overlays a portion of the surface of the physical object 7014 in the physical environment and is viewed as part of the physical environment through the transparent or semi-transparent portion of the display generation component. In some embodiments, the first user interface object is an image that is projected onto the user's retina and overlays a portion of the image of the surface of the physical object 7014 on the user's retina (e.g., the image is an image of the camera view of the physical environment provided by the display generation component, or an image of a view of the physical environment through a transparent portion of the display generation component, etc.).

In the example in FIGS. 7O-7Q, before the user interacts with the first user interface object (e.g., the virtual keyboard 7152, in this example), the first user interface object is not visually obscured by the representation 7202' of the user's hand in the view of the three-dimensional environment 7151. In some embodiments, the representation 7202' of the user's hand may be visually obscured by the presence of another user interface object (e.g., text input window 7150, or another user interface object, etc.), depending on the spatial relationship between the position of said other user interface object and the position corresponding to the location of the user's hand 7202 (e.g., the position of the representation 7202' of the user's hand 7202 in the three-dimensional environment). For example, part of the representation 7202' of the hand 7202 is blocked by the text input box 7150 in FIG. 7O, because the virtual position of the representation 7202' of the user's hand 7202 is farther away from the viewpoint of the currently displayed view of the environment 7151 than the text input window 7150 along the user's line of sight in the environment 7151. In some embodiments, the representation 7202' of the user's hand 7202 is part of the camera view of the physical environment. In some embodiments, the representation 7202' of the user's hand 7202 is a view of the hand through a transparent portion of the display generation component. In some embodiments, the representation of the user's hand is a stylistic representation that is created based on the real-time data on the shape and location of the hand in the physical environment.

In FIG. 7P, the user's hand 7202 moves in the physical environment toward the first physical surface (e.g., the top surface of the physical object 7014 represented by representation 7014', in this example). In some embodiments, a portion of the hand 7202, such as one or more fingers of the hand (e.g., index finger, thumb, index finger and middle finger together, etc.), makes contact with the first physical surface at a first location on the first physical surface. In some embodiments, the first location on the first physical surface corresponds to a first position on the first user interface object, and the first position on the first user interface object corresponds to a first operation associated with the first user interface object. In this particular example, the first location on the first physical surface corresponds to the position of a character key "I" (e.g., key 7154, in this example) on the virtual keyboard 7152, and the first operation associated with the first user interface object is entering the textual character "I" (e.g., character 7156, in this example) into the text input window 7150. In some embodiments, the first user interface object is a control panel, and the first location on the first physical surface corresponds to the position of a first control object (e.g., a button, a slider, a switch, a check box, etc.) in the first user interface object, and the first operation associated with the first user interface object is an operation associated with the first control object, such as turning on/off a device or function, adjusting a value of a control function, selecting a parameter of a function or setting, etc. When the contact of the user's hand 7202 is detected at the first location on the first physical surface, the computer system identifies the corresponding control object on the first user interface object and performs the first operation, and optionally updates the appearance of the first control object and/or the environment 7151 to indicate that the first operation is performed.

In some embodiments, the computer system determines characteristics of the contact between the first physical surface and the user's hand (e.g., shape (e.g., circular, elongated, etc.), size (e.g., small, large, etc.), duration (e.g., less than a threshold duration for a tap input, longer than a threshold duration for a long tap input, continue for more than a threshold duration without liftoff for a touch-hold input, etc.), movement direction (e.g., upward, downward, leftward, rightward, clockwise, counterclockwise, etc.), movement distance (e.g., less than a threshold amount of movement within a threshold amount of time, more than a threshold amount of movement within a threshold amount of time, more than a threshold amount of translation, more than a threshold amount of rotation, etc.), movement path (e.g., linear path, curved path, zigzag path, crossing a threshold position/angle, not crossing a threshold position/angle, etc.), contact intensity (e.g., above a threshold intensity, below a threshold intensity, etc.), number of contacts (e.g., a single contact, two contacts, etc.), repetition of the repeated contact (e.g., double tap, triple tap, etc.), etc.) between the first physical surface and the user's hand (e.g., the one or more fingers of the use's hand), and combinations of two or more of the above, etc. Based on the characteristics of the contact, the computer system determines which operation of a plurality of operations that are associated with the first user interface object and/or the first position in the first user interface object is to be performed. In some embodiments, the computer system evaluates the contact against various preset criteria, and in accordance with a determination that the preset criteria corresponding to a respective operation are met by the contact, the computer system performs the respective operation (e.g., irrespective of characteristics of the contact (e.g., starting an experience, turning on/off a function, etc.), in accordance with the characteristics of the contact (e.g., adjusting a value, performing a continuous operation with an adjustable parameter, etc.), etc.).

In some embodiments, as shown in FIG. 7P, while the hand of the user is in a spatial region in the physical environment that is between the location corresponding to the position of the viewpoint (e.g., the location of the display generation component, the location of the user's eyes, the location of the camera that captures the current view of the user's hand and the physical environment shown in the view of the environment 7151, etc.) and the first physical surface, the computer system forgoes displaying or ceases to display a first portion of the first user interface object while maintains display of a second portion of the first user interface object, so that the portion of the user's hand is visible in the view of the three-dimensional environment 7151 at the position of the first portion of the first user interface object. For example, as shown in FIG. 7P, the first portion of the virtual keyboard 7152 (e.g., a portion of the key 7154, portions of the two keys immediately above the key 7154, and portions of the two keys in the top row of keys that are above the key 7154, etc.) that are at positions corresponding to locations behind the user's hand 7020 relative to the location corresponding to the viewpoint (e.g., location of the display generation component, the user's eyes, the cameras of the computer system, etc.) are not displayed in the view of the three-dimensional environment 7151, while other portions of the virtual keyboard 7152 that are not behind the locations of the user's hand 7020 continue to be displayed in the view of the three-dimensional environment 7151. In some embodiments, a portion of the user's hand that is not in contact with the first physical surface may enter a spatial region in the physical environment that is between the location corresponding to the position of the viewpoint (e.g., the location of the display generation component, the location of the user's eyes, the location of the camera that captures the current view of the user's hand and the physical environment shown in the view of the environment 7151, etc.) and the first physical surface, the computer system forgoes displaying or ceases to display a portion of the first user interface object that is at a position that corresponding to a location that would be visually blocked by the portion of the user's hand when viewed from a location corresponding to the current viewpoint of the three-dimensional environment. For example, a portion of a key at a position in the virtual keyboard 7152 that is behind the location of the user's the thumb relative to the location of the viewpoint is not displayed either. In FIG. 7P, the position of the text input window 7150 has a position that is in front of the position that corresponds to the location of the user's hand 7202, so the text input window 7150 is displayed in the view of the three-dimensional environment 7151, blocking the view of a portion of the representation 7202' of the user's hand 7202 (or replacing display of the portion of the representation 7202' of the hand).

FIG. 7Q shows that, while displaying the view of the three-dimensional environment 7151, the computer system detects movement of the user's hand in the physical environment. For example, the movement includes lifting off from the first location on the first physical surface of the physical object, and moved to another location on the first physical surface of the physical object. In some embodiments, a portion of the hand 7202, such as one or more fingers of the hand (e.g., index finger, thumb, index finger and middle finger together, etc.), makes contact with the first physical surface at a second location on the first physical surface. In some embodiments, the second location on the first physical surface corresponds to a second position on the first user interface object, and the second position on the first user interface object corresponds to a second operation associated with the first user interface object. In this particular example, the second location on the first physical surface corresponds to the position of a character key "p" (e.g., key 7160, in this example) on the virtual keyboard 7152, and the second operation associated with the first user interface object is entering the textual character "p" (e.g., character 7158, in this example) into the text input window 7150. In some embodiments, the first user interface object is a control panel, and the second location on the first physical surface corresponds to the position of a second control object (e.g., a button, a slider, a switch, a check box, etc.) in the first user interface object, and the second operation associated with the first user interface object is an operation associated with the second control object, such as turning on/off a device or function, adjusting a value of a control function, selecting a parameter of a function or setting, etc. When the contact of the user's hand is detected at the second location, the computer system identifies the corresponding control object on the first user interface object and performs the second operation, and optionally updates the appearance of the second control object and/or the environment 7151 to indicate that the second operation is performed. In some embodiments, the computer system determines characteristics of the contact between the first physical surface and the user's hand (e.g., shape (e.g., circular, elongated, etc.), size (e.g., small, large, etc.), duration (e.g., less than a threshold duration for a tap input, longer than a threshold duration for a long tap input, continue for more than a threshold duration without liftoff for a touch-hold input, etc.), movement direction (e.g., upward, downward, leftward, rightward, clockwise, counterclockwise, etc.), movement distance (e.g., less than a threshold amount of movement within a threshold amount of time, more than a threshold amount of movement within a threshold amount of time, more than a threshold amount of translation, more than a threshold amount of rotation, etc.), movement path (e.g., linear path, curved path, zigzag path, crossing a threshold position/angle, not crossing a threshold position/angle, etc.), contact intensity (e.g., above a threshold intensity, below a threshold intensity, etc.), number of contacts (e.g., a single contact, two contacts, etc.), repetition of the repeated contact (e.g., double tap, triple tap, etc.), etc.) between the first physical surface and the user's hand (e.g., the one or more fingers of the use's hand), and combinations of two or more of the above, etc. Based on the characteristics of the contact, the computer system determines which operation of a plurality of operations that are associated with the first user interface object and/or the second position of the first user interface object is to be performed. In some embodiments, the computer system evaluates the contact against various preset criteria, and in accordance with a determination that the preset criteria corresponding to a respective operation are met by the contact, the computer system performs the respective operation (e.g., irrespective of the characteristics of the contact, in accordance with the characteristics of the contact, etc.).

In some embodiments, as shown in FIG. 7Q, while the hand 7202 of the user is in a spatial region in the physical environment that is between the location corresponding to the position of the viewpoint (e.g., the location of the display generation component, the location of the user's eyes, the location of the camera that captures the current view of the user's hand and the physical environment shown in the view of the environment 7151, etc.) and the first physical surface, the computer system forgoes displaying or ceases to display a third portion of the first user interface object while maintains display of a fourth portion of the first user interface object, so that the portion of the user's hand is visible in the view of the three-dimensional environment 7151 at the position of the third portion of the first user interface object. For example, as shown in FIG. 7Q, the third portion of the virtual keyboard 7152 (e.g., a portion of the key 7160, portions of the two keys immediately above the key 7160, and portions of the two keys in the top row of keys that are above the key 7160, etc.) that are at positions corresponding to locations behind the user's hand 7202 relative to the location corresponding to the viewpoint (e.g., location of the display generation component, the user's eyes, the cameras of the computer system, etc.) are not displayed in the view of the three-dimensional environment 7151, while other portions of the virtual keyboard 7152 that are not behind the locations of the user's hand 7020 continue to be displayed in the view of the three-dimensional environment 7151. In FIG. 7Q, the position that corresponds to the location of the user's hand 7202 is no longer behind the position of the text input window 7150, so the text input window 7150 displayed in the view of the three-dimensional environment 7151 no longer blocks the view of the representation 7202' of the user's hand (or replace display of the portion of the representation 7202' of the hand). As shown in FIG. 7Q, the first portion of the virtual keyboard 7152 (e.g., key 7154, the two keys above the key 7154, etc.) that was previously obscured by the presence of the representation 7202' of the hand 7202 is no longer obscured and are displayed again in the view of the three-dimensional environment 7151.

In some embodiments, the first user interface object is a unitary user interface object, e.g., a single button, a single checkbox, a single selectable option, etc., and a preset user input detected at the first location, the second location, or the third location on the first physical surface causes the computer system to perform the same operation associated with the first user interface object, where the first, second, and third locations respectively correspond to a first portion, a second portion, and a third portion of the unitary user interface object. In some embodiments, depending on the location of the user's hand in the physical environment, the computer system selectively ceases to display a respective one of the first portion, the second portion, or the third portion of the unitary user interface object based on a determination that the user's hand is between the location of the viewpoint and the location of the user's hand in the physical environment.

In some embodiments, there are multiple user interface objects displayed at positions in the three-dimensional environment 7151 that correspond to different locations in the physical environment, and the presence of the user's hand in the spatial portion of the physical environment between the location of the viewpoint and the locations corresponding to the positions of the different user interface objects causes the computer system to segment the multiple user interface objects, and selectively ceases to display respective portions of the multiple user interface objects that have positions that correspond to locations that would have been blocked by the presence of the user's hand when viewed from the location corresponding to the current viewpoint of the three-dimensional environment 7151. In some embodiments, the user's hand interacts with a first user interface object does not activate a second user interface object in the same view of the three-dimensional environment, even if the representation of the user's hand concurrently causes portions of both the first user interface object and the second user interface object to be removed from the view of the three-dimensional environment. For example, in FIGS. 7P and 7Q, even though the computer system cease to display portions of multiple keys on the virtual keyboard, only the key at a position that corresponds to the location of the user's touch or the location of a particular portion of the user's hand (e.g., tip of index finger, tip of thumb, etc.) is activated.

In some embodiments, the computer system determines a shape and position of a simulated shadow for the representation of the user's hand 7202 in the view of the three-dimensional environment 7151, e.g., based on a shape and location of the user's hand, and a position of a virtual light source in the three-dimensional environment. The computer system displays the simulated shadow at the position on a surface of the first user interface object, optionally by altering the appearance of the portion of the first user interface object at that position, or replacing display of the portion of the first user interface object at that position.

In some embodiments, input gestures used in the various examples and embodiments described herein (e.g., with respect to FIGS. 7A-7Q, and FIGS. 8-11) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand moves as a whole while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7Q are provided below in references to methods 8000, 9000, 10000, and 11000 described with respect to FIGS. 8-11 below.

Figure 8:
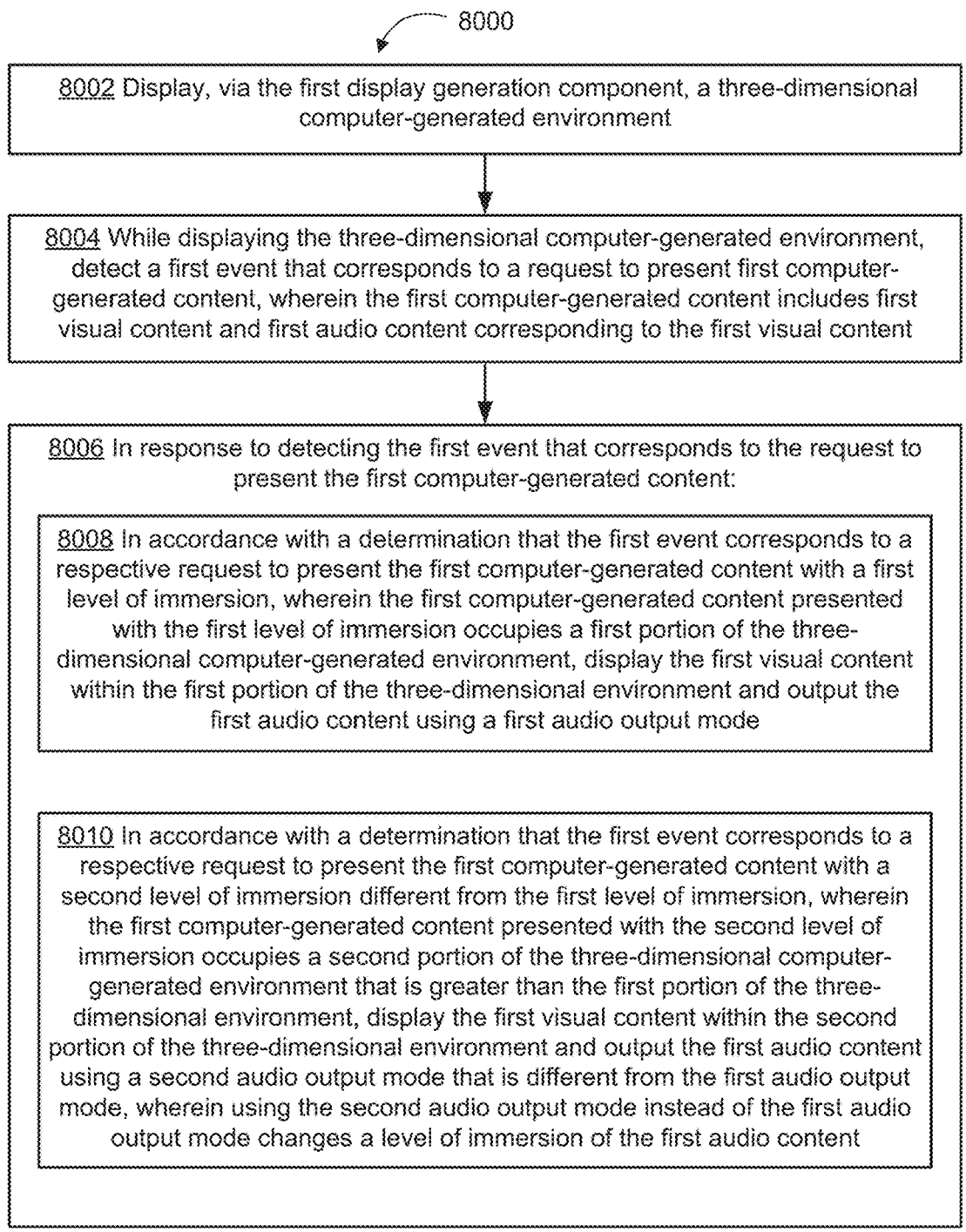
FIG. 8 is a flowchart of a method of selecting different audio output modes in accordance with the level of immersion by which computer-generated content is presented, in accordance with some embodiments.

FIG. 8 is a flowchart of a method 8000 of selecting different audio output modes in accordance with the level of immersion by which computer-generated content is presented, in accordance with some embodiments.

In some embodiments, the method 8000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In some embodiments, the method 8000 is performed at a computer system (e.g., computer system 101 in FIG. 1) that is in communication with a first display generation component (e.g., display generation component 120 in FIGS. 1, 3, and 4, display generation component 7100, etc.) (e.g., a heads-up display, an HMD, a display, a touchscreen, a projector, etc.), one or more audio output devices (e.g., earphones, speakers located in the physical environment, speakers within the same housing or attached to the same support structure as the first display generation component (e.g., built-in speakers of an HMD, etc.)), and one or more input devices (e.g., cameras, controllers, touch-sensitive surfaces, joysticks, buttons, gloves, watches, motion sensors, orientation sensors, etc.). In some embodiments, the first display generation component is a display component facing the user and provides a CGR experience to the user. In some embodiments, the computer system is an integrated device with one or more processors and memory enclosed in the same housing as the first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from one or more of the display generation components (e.g., a heads-up display, a touch-screen, a stand-alone display, etc.), the one or more output devices (e.g., earphones, external speakers, etc.) and the one or more input devices. In some embodiments, the display generation components and the one or more audio output devices are integrated and enclosed in the same housing.

In the method 8000, the computer system displays (8002), via the first display generation component, a three-dimensional computer-generated environment (e.g., environment 7102 in FIGS. 7A-7B, or another three-dimensional environment, etc.) (e.g., displaying the three-dimensional computer-generated environment includes displaying a three-dimensional virtual environment, a three-dimensional augmented reality environment, a pass-through view of the physical environment that has a corresponding computer-generated three-dimensional model that corresponds to the spatial characteristics of the physical environment, etc.). While displaying the three-dimensional computer-generated environment, the computer system detects (8004) a first event that corresponds to a request to present first computer-generated content (e.g., detecting a user input that selects and/or activates an icon corresponding to the first computer-generated content, detecting a trigger condition for starting the first computer-generated content being met by the action of the user or by other internal events of the computer system, etc.), wherein the first computer-generated content includes first visual content (e.g., video content, game content, animation, user interface, movie, etc.) and first audio content (e.g., sound effects, sound tracks, audio recording, movie sound tracks, game sound tracks, etc.) corresponding to the first visual content (e.g., video content and associated audio data, with timing data associating different portions of the video content to different portions of the audio data (e.g., the video playback timeline and the audio playback timeline are temporally correlated by the timing data)). For example, the first computer-generated content includes first visual content 7106 in FIGS. 7A-7B. In response to detecting (8006) the first event that corresponds to the request to present the first computer-generated content: in accordance with a determination that the first event corresponds to a respective request to present the first computer-generated content with a first level of immersion (e.g., an intermediate level of immersion among several available levels of immersion, a lowest level of immersion among two or more available levels of immersion, a lesser level of immersion among two or more available levels of immersion, etc.), wherein the first computer-generated content presented with the first level of immersion occupies a first portion of the three-dimensional computer-generated environment (e.g., playing back the video content in a window that occupies a portion of the user's field of view for the three-dimensional computer-generated environment; playing back the video content with a field of view that spans less than a preset threshold angle within the three-dimensional computer-generated environment from a viewpoint corresponding to a current view of the three-dimensional computer-generated environment, while the three-dimensional computer-generated environment spans more than the preset threshold angle from the viewpoint), the computer system displays (8008) the first visual content within the first portion of the three-dimensional environment (e.g., optionally, concurrently with other virtual content and/or representation of the physical environment occupying other portions of the three-dimensional computer-generated environment, etc.) and the computer system outputs the first audio content using a first audio output mode (e.g., stereo audio mode, surround sound mode, etc.) (e.g., a least immersive audio output mode among several available audio output modes for the first audio content, an audio mode with an intermediate level immersion among several available audio output modes for the first audio content, a lesser immersive audio output mode among several available audio output modes for the first audio content, etc.). In response to detecting (8006) the first event that corresponds to the request to present the first computer-generated content: in accordance with a determination that the first event corresponds to a respective request to present the first computer-generated content with a second level of immersion different from the first level of immersion, wherein the first computer-generated content presented with the second level of immersion occupies a second portion of the three-dimensional computer-generated environment that is greater than the first portion of the three-dimensional environment (e.g., instead of occupying a two-dimensional window within the three-dimensional environment, the display of the content occupies a larger span of three-dimensional space than the window; instead of spanning a portion the three-dimensional environment, the visual content spans the entire three-dimensional environment, etc.), the computer system displays (8010) the first visual content within the second portion of the three-dimensional environment (e.g., optionally, concurrently with other virtual content and/or representation of the physical environment occupying other portions of the three-dimensional environment, etc.) and the computer system outputs the first audio content using a second audio output mode (e.g., surround sound mode, spatial audio mode with sound localization based on locations of virtual sound sources within the first computer-generated content, etc.) (e.g., a more immersive audio output mode among several available audio output modes for the first audio content, an audio mode with an highest level immersion among several available audio output modes for the first audio content, a most immersive audio output mode among several available audio output modes for the first audio content, etc.) that is different from the first audio output mode, wherein using the second audio output mode instead of the first audio output mode changes (e.g., automatically, without requiring user input, increases) a level of immersion of the first audio content (e.g., making the first audio content more or less immersive, more or less spatially expansive, having more or less complex spatial variations, more or less directionally adjustable based on corresponding visual content, etc.). This is illustrated in FIGS. 7A-7B, where FIG. 7A illustrates display of the computer-generated content 7106 using a first level of immersion, FIG. 7B illustrates display of the computer-generated content 7106 using a second level of immersion, where the computer-generated content displayed with the first level of immersion has a lesser spatial extent than the computer-generated content displayed with the second level of immersion, and the computer system chooses different audio output modes for outputting the audio content of the computer-generated content based on the level of immersion with which the computer-generated content is displayed by the display generation component.

In some embodiments, outputting the first audio content using the first audio output mode includes outputting the first audio content using a first set of sound sources respectively located at a first set of locations in a physical environment (e.g., two sources of sound output located on the two sides of the HMD, a single sound source that is located in front of the user, etc.), and outputting the first audio content using the second audio output mode includes outputting the first audio content using a second set of sound sources respectively located at a second set of locations in the physical environment, wherein the second set of sound sources is different from the first set of sound sources. In some embodiments, the first set of sound sources and the second set of sound sources are enclosed in the same housing (e.g., the housing of the HMD, the housing of the same speaker or sound bar, etc.). In some embodiments, the first set of sound sources and the second set of sound sources are respectively enclosed in different housings (e.g., the first set of sound sources are enclosed in the HMD or earphones, and the second set of sound sources are enclosed in a set of external speakers placed at various positions in the physical environment surrounding the user; the first set of sound sources are enclosed in a pair of speakers placed in the physical environment surrounding the user, and the second set of sound sources are enclosed in a set of three or more speakers placed in the physical environment surrounding the user, etc.). In some embodiments, a sound source in the first set of sound sources and the second set of sound sources refers to an element of physical vibration that generates and propagates sound waves away from the location of the element of vibration. In some embodiments, the characteristic (e.g., shape of the wavefront, phase, amplitude, frequency, etc.) of the physical vibration of a respective sound source is controlled by the computer system in accordance with the audio content that is to be output by the output devices. In some embodiments, individual ones or individual subsets of sound sources within the first set of sound sources and/or the second set of sound sources have the same characteristics, and different locations. In some embodiments, individual ones or individual subsets of sound sources within the first set of sound sources and/or the second set of sound sources have different characteristics and the same locations. In some embodiments, individual ones or individual subsets of sound sources within the first set of sound sources and/or the second set of sound sources have different characteristics and different locations. In some embodiments, the different characteristics of the individual sound sources or different subsets of sound sources in the first set of sound sources and the second set of sound sources are individually controlled by the computer system based on the currently displayed portion of the first visual content and corresponding audio content. In some embodiments, the sound sources in the first set of sound sources are not individually controlled (e.g., the sound sources have the same phase, same amplitude, same wavefront shape, etc.). In some embodiments, the sound sources in the second set of sound sources are individually controlled based on the spatial relationships between objects and actions of virtual objects within the currently displayed portion of the first visual content (e.g., have different relative phases, different propagation directions, different amplitudes, different frequencies, etc.) such that the resulting sound at different locations in the physical environment are dynamically adjusted based on the changes in the currently displayed portion of the first visual content (e.g., changing spatial relationships between objects in the currently displayed portion of the first visual content, different user interactions with different virtual objects or different portions of a virtual object in the currently displayed portion of the first visual content, different types of events occurring in the currently displayed portion of the first visual content, etc.).

Outputting the first audio content using a first set of sound sources respectively located at a first set of locations in a physical environment, and outputting the second audio content using a second set of sound sources, different from the first set of sound sources, respectively located at a second set of locations in the physical environment, provides improved audio feedback to the user (e.g., improved audio feedback regarding the current level of immersion). Providing improved feedback enhances the operability of the device, which, additionally, reduces power usage and improves battery life of the device by enabling the user to use the device more quickly and efficiently.

In some embodiments, the second set of sound sources includes the first set of sound sources and one or more additional sound sources not included in the first set of sound sources. In some embodiments, when the first visual content is displayed with a lower level of immersion and/or is displayed with a smaller spatial extent (e.g., within a window or fixed frame), a smaller subset of sound sources (e.g., one, or two sound sources, one or two sets of sound sources located at one or two locations, sound sources used to produce single channel, or stereo sounds, etc.) in the audio output device(s) associated with the computer system are employed to output the first audio content; and when the first visual content is displayed with a higher level of immersion and/or displayed with a greater spatial extent (e.g., without a fixed window or fixed frame, spanning three-dimensional space surrounding the user, etc.), a larger subset or all of the available sound sources (e.g., three or more sound sources to generate surround sound, and/or spatially located sound, etc.) in the audio output device(s) associated with the computer system are employed to output the first audio content. Outputting the first audio content using a first set of sound sources respectively located at a first set of locations in a physical environment, and outputting the second audio content using a second set of sound sources that includes the first set of sounds sources and one or more additional sound sources not included in the first set of sound sources, respectively located at a second set of locations in the physical environment, provides improved audio feedback to the user (e.g., improved audio feedback regarding the current level of immersion). Providing improved feedback enhances the operability of the device, which, additionally, reduces power usage and improves battery life of the device by enabling the user to use the device more quickly and efficiently.

In some embodiments, the second set of locations span a wider area than the first set of locations in the physical environment. In some embodiments, the first set of locations are located on the left and right side of the user, or in front of the user; and the second set of locations are located in three or more locations around the user (e.g., in front of, on the left, on the right, behind, above, below, and/or optionally, at other angles relative to the forward facing direction of the user in three-dimensional space). Outputting the first audio content using a first set of sound sources respectively located at a first set of locations in a physical environment, and outputting the second audio content using a second set of sound sources, different from the first set of sound sources, respectively located at a second set of locations in the physical environment that span a wider area than the first set of locations in the physical environment, provides improved audio feedback to the user (e.g., improved audio feedback regarding the current level of immersion). Providing improved feedback enhances the operability of the device, which, additionally, reduces power usage and improves battery life of the device by enabling the user to use the device more quickly and efficiently.

In some embodiments, outputting the first audio content using the first audio output mode includes outputting the first audio content in accordance with preset correspondence (e.g., temporal correspondence between the audio and video playback timelines, pre-stablished content-based correspondence (e.g., sound effect associated with a respective object, alert associated with a respective user interface event, etc.), etc.) between the first audio content and the first visual content, wherein the preset correspondence is independent of respective spatial locations of virtual objects within a currently displayed view of the first visual content (e.g., the spatial locations of virtual objects within a currently displayed view of the first visual content optionally change in accordance with movement of the virtual objects within an environment depicted in the first visual content and/or in accordance with a changed viewpoint in the environment depicted by the three-dimensional environment, etc.), and outputting the first audio content using the second audio output mode includes outputting the first audio content in accordance with the preset correspondence (e.g., temporal correspondence between the audio and video playback timelines, pre-stablished content-based correspondence (e.g., sound effect associated with a respective object, alert associated with a respective user interface event, etc.), etc.) between the first audio content and the first visual content and in accordance with respective spatial locations of the virtual objects within the currently displayed view of the first visual content. For example, in some embodiments, when the first audio output mode is used to output the first audio content, the sound produced by the audio output device(s) is independent of the spatial relationship between the viewpoint of the user corresponding to the currently displayed view of the first visual content. In some embodiments, when the first audio output mode is used to output the first audio content, the sound produced by the audio output device(s) is independent of the spatial relationship between the virtual objects in the currently displayed view of the first visual content. In some embodiments, when the first audio output mode is used to output the first audio content, the sound produced by the audio output device(s) is independent of the changes in spatial relationship between the virtual objects in the currently displayed view of the first visual content that are caused by user inputs (e.g., when a virtual object that is a perceived producer of the sound in the first visual content is moved by the user (e.g., in a user interface, in a game, in a virtual environment, etc.)). In some embodiments, when the first audio output mode is used to output the first audio content, the sound produced by the audio output device(s) is head-locked to the user's head (e.g., when the user is wearing an HMD that includes the audio output device(s)), irrespective of the user's viewpoint or spatial relationship relative to the virtual content shown in the computer-generated environment. In some embodiments, when the first audio output mode is used to output the first audio content, the sound produced by the audio output device(s) is head-locked to the user's head (e.g., when the user is wearing an HMD that includes the audio output device(s)), and is independent of the user's movement in the physical environment.

Outputting the first audio content in accordance with preset correspondence between the first audio content and the first visual content, wherein the preset correspondence is independent of respective spatial locations of virtual objects within a currently displayed view of the first visual content, and outputting the second audio content in accordance with the preset correspondence between the first audio content and the first visual content and in accordance with respective spatial locations of the virtual objects within the currently displayed view of the first visual content, provides improved audio feedback to the user (e.g., improved audio feedback regarding the current level of immersion). Providing improved feedback enhances the operability of the device, which, additionally, reduces power usage and improves battery life of the device by enabling the user to use the device more quickly and efficiently.

In some embodiments, outputting the first audio content using the second audio output mode includes: in accordance with a determination that a first virtual object in the currently displayed view of the first visual content has a first spatial relationship to a viewpoint corresponding to the currently displayed view of the first visual content, outputting a first portion of the first audio content that corresponds to the currently displayed view of the first visual content with audio localization corresponding to the first spatial relationship; and in accordance with a determination that the first virtual object in the currently displayed view of the first visual content has a second spatial relationship to the viewpoint corresponding to the currently displayed view of the first visual content, outputting the first portion of the first audio content that corresponds to the currently displayed view of the first visual content with audio localization corresponding to the second spatial relationship, where the first spatial relationship is different from the second spatial relationship, and the audio localization corresponding to the first spatial relationship is different from the audio localization corresponding to the second spatial relationship. For example, when the first visual content includes a chirping bird and the corresponding first audio content includes the chirping sound of the bird, the sound output in accordance with the second audio output mode is adjusted such that not only the volume of the sound changes based on the perceived distance of the bird relative to the viewpoint of the currently displayed view, the perceived origin of the sound also changes in accordance with the location of the bird relative to the viewpoint of the currently displayed view. In some embodiments, the perceived origin of the sound is adjusted by changing the relative amplitude, phase, and/or other characteristics of the sound sources used to generated the audio output in the second audio output mode in accordance with the location of the bird in the first visual content relative to the viewpoint of the currently displayed view of the first visual content.

In some embodiments, the first visual content is optionally displayed with different zoom levels or different viewing perspectives with the second level of immersion (e.g., the first visual content is a three-dimensional content that can be viewed from different angles with both the first level of immersion and the second level of immersion, or with the second level of immersion only, etc.), and the sound generated in the second audio output mode is adjusted depending on the current viewing angle or viewing perspective of the first visual content. For example, the sound accompanying a model train running on a track are output differently in the second audio output mode when the track is turned in response to user inputs such that the model train is shown moving away from the user, moving in front of the user to the left, or moving toward the user. In some embodiments, outputting the audio content using the second audio output mode includes outputting the audio content using a spatial audio output mode.

In some embodiments, the spatial audio output mode is a mode that allows audio that is output from the earbuds or headphones to sound as though the audio is coming from one or more locations (e.g., one or more sources of sound) in a frame of reference, such as a physical environment (e.g., a surround sound effect), where the positioning of the one or more simulated or perceived sources of sound is independent of movement of earbuds or headphones relative to the frame of reference. Typically, the one or more perceived sound sources, when fixed, are fixed relative to the frame of reference, and, when moving, move relative to the frame of reference. For example, where the frame of reference is a physical environment, the one or more perceived sound sources have respective spatial locations in the physical environment. As earbuds or headphones move about the physical environment, the audio output from earbuds or headphones is adjusted so that the audio continues to sound as though it is coming from the one or more perceived sound sources at the respective spatial locations in the physical environment. Where the one or more perceived sound sources are moving sources that move through a sequence of spatial locations about the physical environment, the audio output from earbuds or headphones is adjusted so that the audio continues to sound as though it is coming from the one or more perceived sound sources at the sequence of spatial locations in the physical environment. Such adjustment for moving sound sources also takes into account any movement of earbuds or headphone relative to the physical environment (e.g., if earbuds or headphones move relative to the physical environment along an analogous path as the moving source of sound so as to maintain a constant spatial relationship with the source of sound, the audio would be output so that the sound does not appear to move relative to earbuds or headphones). In some embodiments, the frame of reference for the spatial audio effect is fixed to an electronic device, such as the display generation component or HMD worn by the user, that optionally moves relative to the audio output device that outputs the audio of the computer-generated content. For example, locations of the simulated sources of the audio in a physical environment move corresponding to movement of display generation component in the physical environment. This feature may be useful when the user is traveling in a vehicle or other mode of transportation, or walking, or the like and the device is moving along with the user, so the audio moves along with the device and the user in the vehicle, or in situations where the device is moving relative to the audio output device(s) and is associated with visual content playing on the device, so that the simulated sources of sound are located at virtual locations that correspond to the location of the device as it moves around the physical environment. When the follow device feature is not enabled, the audio output does not follow the movement of audio output device. For example, spatial audio is positioned relative to a frame of reference that is not fixed to audio output device (e.g., such that the spatial audio is not moved based on movement of audio output device even as the audio output device moves relative to the frame of reference), and non-spatial stereo or mono audio is positioned relative to the position of the earbuds, and is not moved based on display generation component being moved.

In some embodiments, for the spatial audio output mode, audio signal processing is performed to compute and adjust audio signals for output so that a user (e.g., an average user) will perceive the sound of the audio output to be coming from one or more simulated locations in the frame of reference (e.g., not limited to a location within the user's head). In some embodiments, the audio signal processing of the audio signals is performed by the electronic device, by the one or more wearable audio output devices, or by a combination of the electronic device and the one or more wearable audio output devices (e.g., in part by the electronic device and in part by the one or more wearable audio output devices). In some embodiments, a non-spatial audio output mode is an audio output mode where audio of the set of one or more wearable audio output devices is not adjusted as the set of one or more wearable audio output devices is moved relative to the frame of reference (e.g., relative to a physical environment or relative to a displayed user interface corresponding to the one or more sources of sound, such as the display of a device or a projected user interface) (e.g., resulting in not maintaining the one or more sources of sound in a substantially fixed position relative to the frame of reference). In some embodiments, a non-spatial audio mode includes a stereo audio output mode (e.g., in which audio that is output via a set of one or more wearable audio output devices is not adjusted as the set of one or more wearable audio output devices moves relative to a frame of reference, or in which audio is output to sound as though the audio is coming from one or more locations with one or more respective predefined spatial relationships to a set of one or more wearable audio output devices, where the relative spatial relationship(s) between the one or more locations and the set of one or more wearable audio output devices are maintained as the set of one or more wearable audio output devices moves). In some embodiments, a non-spatial audio mode is a mono audio mode (e.g., in which audio that is output via a set of one or more wearable audio output devices is not adjusted as the set of one or more wearable audio output devices moves relative to a frame of reference, and is output to sound as though the audio is coming from a single location and/or without any difference between the audio output from a first wearable audio output component and a second wearable audio output component of the set of one or more wearable audio output devices). In some embodiments, audio that is output using a mono audio output mode differs from audio that is output using spatial or stereo audio output modes in that audio output using the spatial or stereo audio output modes can have different spatial relationships with different components of the set of one or more wearable audio output devices (e.g., different earbuds or earcups of headphones worn in, on, or over different ears), whereas audio output using the mono audio output mode does not.

Outputting a first portion of the first audio content that corresponds to the currently displayed view of the first visual content with audio localization corresponding to a first spatial relationship, in accordance with a determination that a first virtual object in the currently displayed view of the first virtual content has the first spatial relationship to a viewpoint corresponding to the currently displayed view of the first visual content, and outputting the first portion of the first audio content that corresponds to the currently displayed view of the first visual content with audio localization corresponding to a second spatial relationship that is different from the audio localization corresponding to the first spatial relationship, in accordance with a determination that the first virtual object in the currently displayed view of the first visual content has the second spatial relationship, different from the first spatial relationship, to the viewpoint corresponding to the currently displayed view of the first visual content, provides improved audio feedback to the user (e.g., improved audio feedback regarding whether the computer system has determined the first virtual object to have the first or second spatial relationship to the viewpoint corresponding to the currently displayed view of the first visual content). Providing improved feedback enhances the operability of the device, which, additionally, reduces power usage and improves battery life of the device by enabling the user to use the device more quickly and efficiently.

In some embodiments, outputting the first audio content using the second audio output mode includes: in accordance with a determination that the currently displayed view of the first visual content corresponds to a first viewpoint in a three-dimensional environment depicted in the first visual content, outputting a first portion of the first audio content that corresponds to the currently displayed view of the first visual content with audio localization corresponding to the first viewpoint; and in accordance with a determination that the currently displayed view of the first visual content corresponds to a second viewpoint in the three-dimensional environment depicted in the first visual content, outputting the first portion of the first audio content that corresponds to the currently displayed view of the first visual content with audio localization corresponding to the second viewpoint, wherein the first viewpoint is different from the second viewpoint, and the audio localization corresponding to the first viewpoint is different from the audio localization corresponding to the second viewpoint. For example, in some embodiments, as the user is moving in the physical environment which causes a change in the viewpoint corresponding to the currently displayed view of the first visual content (e.g., a virtual three-dimensional game world, a virtual three-dimensional environment, an augmented reality environment based on the user's surrounding physical environment, etc.), the sound output in the second audio output mode changes based on the current viewpoint corresponding to the currently displayed view of the first visual content. For example, in some embodiments, the quality of the sound output in the second audio output mode changes based on the acoustic properties of the surrounding virtual walls, floors, and/or windows (e.g., virtual carpeted floors or virtual grass replacing actual floor of the room, nature scene or virtual window replacing the actual walls and/or windows of the room, etc.) in the augmented reality environment or virtual environment displayed by the display generation component when the user walks around its physical environment (e.g., a park, a room, a hall, etc.).

Outputting a first portion of the first audio content that corresponds to the currently displayed view of the first visual content with audio localization corresponding to a first viewpoint in accordance with a determination that the currently displayed view of the first visual content corresponds to the first viewpoint in a three-dimensional environment depicted in the first visual content, and outputting the first portion of the first audio content that corresponds to the currently displayed view of the first visual content with audio localization corresponding to a second viewpoint, different from the audio localization corresponding to the first viewpoint, in accordance with a determination that the currently displayed view of the first visual content corresponds to the second viewpoint, different from the first viewpoint, in the three-dimensional environment depicted in the first visual content, provides improved audio feedback to the user (e.g., improved audio feedback regarding whether the computer system has determined the first virtual object to have the first or second spatial relationship to the viewpoint corresponding to the currently displayed view of the first visual content). Providing improved feedback enhances the operability of the device, which, additionally, reduces power usage and improves battery life of the device by enabling the user to use the device more quickly and efficiently.

In some embodiments, while presenting the first computer-generated content with the first level of immersion (e.g., an intermediate level of immersion among several available levels of immersion, a lowest level of immersion among two or more available levels of immersion, a lesser level of immersion among two or more available levels of immersion, etc.), the computer system detects a second event (e.g., user taking her hands off of the HMD, user sitting back into a couch, user activating a control to start the more immersive playback mode of the first computer-generated content, user providing a gesture to activate the more immersive mode, etc.) that corresponds to a request to present the first computer-generated content with the second level of immersion (e.g., a more immersive level as compared to the first level of immersion). In response to detecting the second event that corresponds to the request to present the first computer-generated content with the second level of immersion, the computer system expands a spatial extent (e.g., expanding an angular extent, expanding viewable portion of a three-dimensional environment, switching from a flat two-dimension representation to a three-dimensional representation of an environment, etc.) of the first visual content that is being displayed in the three-dimensional environment (e.g., optionally, while maintaining continued playback of the first visual content) (e.g., revealing additional portions of a three-dimensional environment that was not previously displayed when the first visual content was displayed with the first level of immersion, switching from a two-dimensional view to a three-dimensional view of the virtual objects in the first computer-generated content, etc.), and the computer system switches from outputting the first audio content using the first audio output mode to the second audio output mode (e.g., optionally, while maintaining continued playback of the first audio content).

Expanding a spatial extent of the first visual content that is being displayed in the three-dimensional environment, and switching from outputting the first audio content using the first audio output mode to the second audio output mode, in response to detecting the second event that corresponds to the request to present the first computer-generated content with the second level of immersion, provides improved visual and audio feedback to the user (e.g., improved visual and audio feedback that the computer system has detected the second event that corresponds to the request to present the first computer-generated content with the second level of immersion). Providing improved feedback enhances the operability of the device, which, additionally, reduces power usage and improves battery life of the device by enabling the user to use the device more quickly and efficiently.

In some embodiments, the computer system presents the first computer-generated content with the second level of immersion (e.g., an intermediate level of immersion among several available levels of immersion, a highest level of immersion among two or more available levels of immersion, a greater level of immersion among two or more available levels of immersion, etc.), and the computer system detects a third event (e.g., user standing up and/or putting her hands on the HMD, user pausing the content, user activating a control to start the less immersive playback mode of the first computer-generated content, user providing a gesture to activate the less immersive mode, etc.) that corresponds to a request to present the first computer-generated content with the first level of immersion (e.g., the less immersive mode). In response to detecting the third event that corresponds to the request to present the first computer-generated content with the first level of immersion, the computer system reduces a spatial extent (e.g., reducing an angular extent, reducing viewable portion of a three-dimensional environment, switching from a three-dimensional representation of an environment to a flat two-dimension representation, etc.) of the first visual content that is being displayed in the three-dimensional environment (e.g., optionally, while maintaining continued playback of the first visual content) (e.g., hiding portions of a three-dimensional environment that was previously displayed when the first visual content was displayed with the second level of immersion, switching from a three-dimensional view to a two-dimensional view of the virtual objects in the first computer-generated content, etc.), and the computer system switches from outputting the first audio content using the second audio output mode to the first audio output mode (e.g., optionally, while maintaining continued playback of the first audio content). In some embodiments, switching from outputting the first audio content using the second audio output mode to the first audio output mode includes switching from outputting the audio content with spatial audio output mode to outputting the stereo audio output mode. In some embodiments, switching from outputting the first audio content using the second audio output mode to the first audio output mode includes switching from outputting the audio content with stereo audio output mode to outputting the spatial audio output mode.

Reducing a spatial extent of the first visual content that is being displayed in the three-dimensional environment, and switching from outputting the first audio content using the second audio output mode to the first audio output mode, in response to detecting the third event that corresponds to the request to present the first computer-generated content with the first level of immersion, provides improved visual and audio feedback to the user (e.g., improved visual and audio feedback that the computer system has detected the third event that corresponds to the request to present the first computer-generated content with the first level of immersion). Providing improved feedback enhances the operability of the device, which, additionally, reduces power usage and improves battery life of the device by enabling the user to use the device more quickly and efficiently.

In some embodiments, the first visual content depicts a virtual environment. In some embodiments, the virtual environment is a virtual game environment. In some embodiments, the virtual environment is a virtual desktop or command center environment that includes application icons for launching computer-generated experiences and device controls for controlling device settings of the computer system. In some embodiments, the virtual environment is a movie or video. In some embodiments, the virtual environment is an application user interface that includes user interface objects that correspond to different application operations that are performed in response to user inputs meeting various criteria. Displaying the first visual content that depicts a virtual environment provides improved visual feedback to the user (e.g., improved visual feedback that the computer system is presenting computer-generated content, improved visual feedback regarding the level of immersion for the computer-generated content, etc.). Providing improved feedback enhances the operability of the device, which, additionally, reduces power usage and improves battery life of the device by enabling the user to use the device more quickly and efficiently.

In some embodiments, the first visual content depicts one or more virtual objects that have respective spatial locations in a three-dimensional environment that correspond to physical locations in a physical environment that is concurrently displayed with the first visual content via the display generation component. In some embodiments, the first computer-generated environment includes the one or more virtual objects that are displayed overlaying or replacing display of respective portions of a representation of the physical environment (e.g., a camera view of the physical environment, a point cloud corresponding to the physical environment, etc.). In some embodiments, the first computer-generated environment includes one or more virtual objects that block the view of respective portions of the physical environment through a transparent portion of the first display generation component. In some embodiments, the first visual content, when displayed with the first level of immersion, is displayed in a frame or display area that is located in the three-dimensional computer-generated environment at a location that corresponds to a physical surface in the physical environment (e.g., the virtual content overlays a wall, a real window, a table top, etc.) or floats in the air; and when displayed with the second level of immersion, is displayed in the three-dimensional computer-generated environment at locations that correspond to multiple physical surfaces in the physical environment (e.g., the virtual content overlays multiple walls, windows, etc.) or occupy three-dimensional space within the user's physical environment.

Displaying the first virtual content that depicts one or more virtual objects that have respective spatial locations in a three-dimensional environment that correspond to physical locations in a physical environment that is concurrently displayed with the first visual content via the display generation component provides improved visual feedback to the user (e.g., improved visual feedback that the computer system is presenting computer-generated content, improved visual feedback regarding the level of immersion for the computer-generated content, etc.). Providing improved feedback enhances the operability of the device, which, additionally, reduces power usage and improves battery life of the device by enabling the user to use the device more quickly and efficiently.

In some embodiments, displaying the first visual content within the first portion of the three-dimensional environment includes displaying the first visual content in a bounded display area (e.g., a window, a frame, a preset content display area with boundary lines, an area corresponding to a single wall or desk surface, etc.) in the first portion of the three-dimensional environment, and outputting the first audio content using a first audio output mode includes outputting the first audio content as stereo audio (e.g., with a left sound channel and a right sound channel, that has head-locked sound, etc.). Displaying the first visual content in a bounded display area in the first portion of the three-dimensional environment and outputting the first audio content as stereo audio provides improved visual and audio feedback to the user (e.g., improved visual and audio feedback that the computer system is presenting the first computer-generated content with the first level of immersion). Providing improved feedback enhances the operability of the device, which, additionally, reduces power usage and improves battery life of the device by enabling the user to use the device more quickly and efficiently.

In some embodiments, displaying the first visual content within the second portion of the three-dimensional environment includes displaying the first visual content in the second portion of the three-dimensional environment without using a bounded display area in the second portion of the three-dimensional environment (e.g., virtual content occupy three-dimensional space, occupying surfaces corresponding to multiple physical surfaces (e.g., multiple walls and windows, etc.)), and outputting the first audio content using a second audio output mode includes outputting the first audio content as spatial audio (e.g., sound coming from more than two directions, sound that has varying spatial locality based on the virtual content that is being displayed, sound that varying spatial locality based on the physical location and/or movement of the user in the physical environment, sound corresponding to different acoustics based on the amount and/or types of virtual content that is currently displayed, etc.). In some embodiments, outputting the audio content using the second audio output mode includes outputting the audio content using a spatial audio output mode. In some embodiments, the spatial audio output mode is a mode that allows audio that is output from the earbuds or headphones to sound as though the audio is coming from one or more locations (e.g., one or more sources of sound) in a frame of reference, such as a physical environment (e.g., a surround sound effect), where the positioning of the one or more simulated or perceived sources of sound is independent of movement of earbuds or headphones relative to the frame of reference. Typically, the one or more perceived sound sources, when fixed, are fixed relative to the frame of reference, and, when moving, move relative to the frame of reference. For example, where the frame of reference is a physical environment, the one or more perceived sound sources have respective spatial locations in the physical environment. As earbuds or headphones move about the physical environment, the audio output from earbuds or headphones is adjusted so that the audio continues to sound as though it is coming from the one or more perceived sound sources at the respective spatial locations in the physical environment. Where the one or more perceived sound sources are moving sources that move through a sequence of spatial locations about the physical environment, the audio output from earbuds or headphones is adjusted so that the audio continues to sound as though it is coming from the one or more perceived sound sources at the sequence of spatial locations in the physical environment. Such adjustment for moving sound sources also takes into account any movement of earbuds or headphone relative to the physical environment (e.g., if earbuds or headphones move relative to the physical environment along an analogous path as the moving source of sound so as to maintain a constant spatial relationship with the source of sound, the audio would be output so that the sound does not appear to move relative to earbuds or headphones).

In some embodiments, the frame of reference for the spatial audio effect is fixed to an electronic device that is outputting audio via an audio output device (e.g., the sound follows the device). For example, locations of the simulated sources of the audio in a physical environment move corresponding to movement of device in the physical environment. This feature may be useful when the user is traveling in a vehicle or other mode of transportation, or walking, or the like and the device is moving along with the user, so the audio moves along with the device and the user in the vehicle, or in situations where the device is moving relative to the audio output device(s) and is associated with visual content playing on the device, so that the simulated sources of sound are located at virtual locations that correspond to the location of the device as it moves around the physical environment. When the follow device feature is not enabled, the audio output does not follow the movement of device. For example, spatial audio is positioned relative to a frame of reference that is not fixed to the device (e.g., such that the spatial audio is not moved based on movement of the device even as the device moves relative to the frame of reference), and non-spatial stereo or mono audio is positioned relative to the position of the earbuds, and is not moved based on the device being moved.

In some embodiments, for the spatial audio output mode, audio signal processing is performed to compute and adjust audio signals for output so that a user (e.g., an average user) will perceive the sound of the audio output to be coming from one or more simulated locations in the frame of reference (e.g., not limited to a location within the user's head). In some embodiments, the audio signal processing of the audio signals is performed by the electronic device, by the one or more wearable audio output devices, or by a combination of the electronic device and the one or more wearable audio output devices (e.g., in part by the electronic device and in part by the one or more wearable audio output devices).

In some embodiments, a non-spatial audio output mode is an audio output mode where audio of the set of one or more wearable audio output devices is not adjusted as the set of one or more wearable audio output devices is moved relative to the frame of reference (e.g., relative to a physical environment or relative to a displayed user interface corresponding to the one or more sources of sound, such as the display of a device or a projected user interface) (e.g., resulting in not maintaining the one or more sources of sound in a substantially fixed position relative to the frame of reference). In some embodiments, a non-spatial audio mode includes a stereo audio output mode (e.g., in which audio that is output via a set of one or more wearable audio output devices is not adjusted as the set of one or more wearable audio output devices moves relative to a frame of reference, or in which audio is output to sound as though the audio is coming from one or more locations with one or more respective predefined spatial relationships to a set of one or more wearable audio output devices, where the relative spatial relationship(s) between the one or more locations and the set of one or more wearable audio output devices are maintained as the set of one or more wearable audio output devices moves). In some embodiments, a non-spatial audio mode is a mono audio mode (e.g., in which audio that is output via a set of one or more wearable audio output devices is not adjusted as the set of one or more wearable audio output devices moves relative to a frame of reference, and is output to sound as though the audio is coming from a single location and/or without any difference between the audio output from a first wearable audio output component and a second wearable audio output component of the set of one or more wearable audio output devices). In some embodiments, audio that is output using a mono audio output mode differs from audio that is output using spatial or stereo audio output modes in that audio output using the spatial or stereo audio output modes can have different spatial relationships with different components of the set of one or more wearable audio output devices (e.g., different earbuds or earcups of headphones worn in, on, or over different ears), whereas audio output using the mono audio output mode does not.

Displaying the first visual content without using a bounded display area in the second portion of the three-dimensional environment and outputting the first audio content as spatial radio provides improved visual and audio feedback to the user (e.g., improved visual and audio feedback that the computer system is presenting the first computer-generated content with the second level of immersion). Providing improved feedback enhances the operability of the device, which, additionally, reduces power usage and improves battery life of the device by enabling the user to use the device more quickly and efficiently.

In some embodiments, while presenting the first computer-generated content with one of the first and second levels of immersion, the computer system detects a fourth event that corresponds to a request to present the first computer-generated content with a different one of the first and second levels of immersion. In response to detecting the fourth event that corresponds to the request to present the first computer-generated content with the different one of the first and second levels of immersion: the computer system displays an animated transition that changes (e.g., increases, decreases, etc.) an amount of virtual content that obscures (e.g., overlaying, replacing display of, blocking the view of, etc.) a representation of a physical environment displayed via the display generation component (e.g., displaying an animated transition showing walls and/or windows in the physical environment being replaced gradually with virtual content (e.g., virtual scenery spreads out along the surface of the walls and windows, etc.) when increasing the level of immersion; displaying an animated transition showing walls and/or windows in the physical environment being revealed gradually when virtual content fades away (e.g., virtual scenery shrinks along or fades on the surface of the walls and windows, etc.) when decreasing the level of immersion; etc.), and in conjunction with (e.g., concurrently with, within a threshold time window of, etc.) displaying the animated transition, the computer system switches from playing back the first audio content using one of the first and second audio output modes to playing back the audio content using a different one of the first and second audio output modes (e.g., switching from the first audio output mode to the second audio output mode when increasing the level of immersion; switching from the second audio output mode to the first audio output mode when decreasing the level of immersion, etc.).

Displaying an animated transition that changes an amount of virtual content that obscures a representation of a physical environment displayed via the display generation component, in conjunction with switching from playing back the first audio content using one of the first and second audio output modes to playing back the audio content using a different one of the first and second audio output modes, in response to detecting the fourth event that corresponds to the request to present the first computer-generated content with the different one of the first and second levels of immersion, provides improved visual and audio feedback to the user (e.g., improved visual and audio feedback that the computer system is changing from the first level of immersion to the second level of immersion, or vice versa). Providing improved feedback enhances the operability of the device, which, additionally, reduces power usage and improves battery life of the device by enabling the user to use the device more quickly and efficiently.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, and 11000) are also applicable in an analogous manner to method 8000 described above with respect to FIG. 8. For example, the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described above with reference to method 8000 optionally have one or more of the characteristics of the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described herein with reference to other methods described herein (e.g., methods 9000, 10000, and 11000). For brevity, these details are not repeated here.

Figure 9:
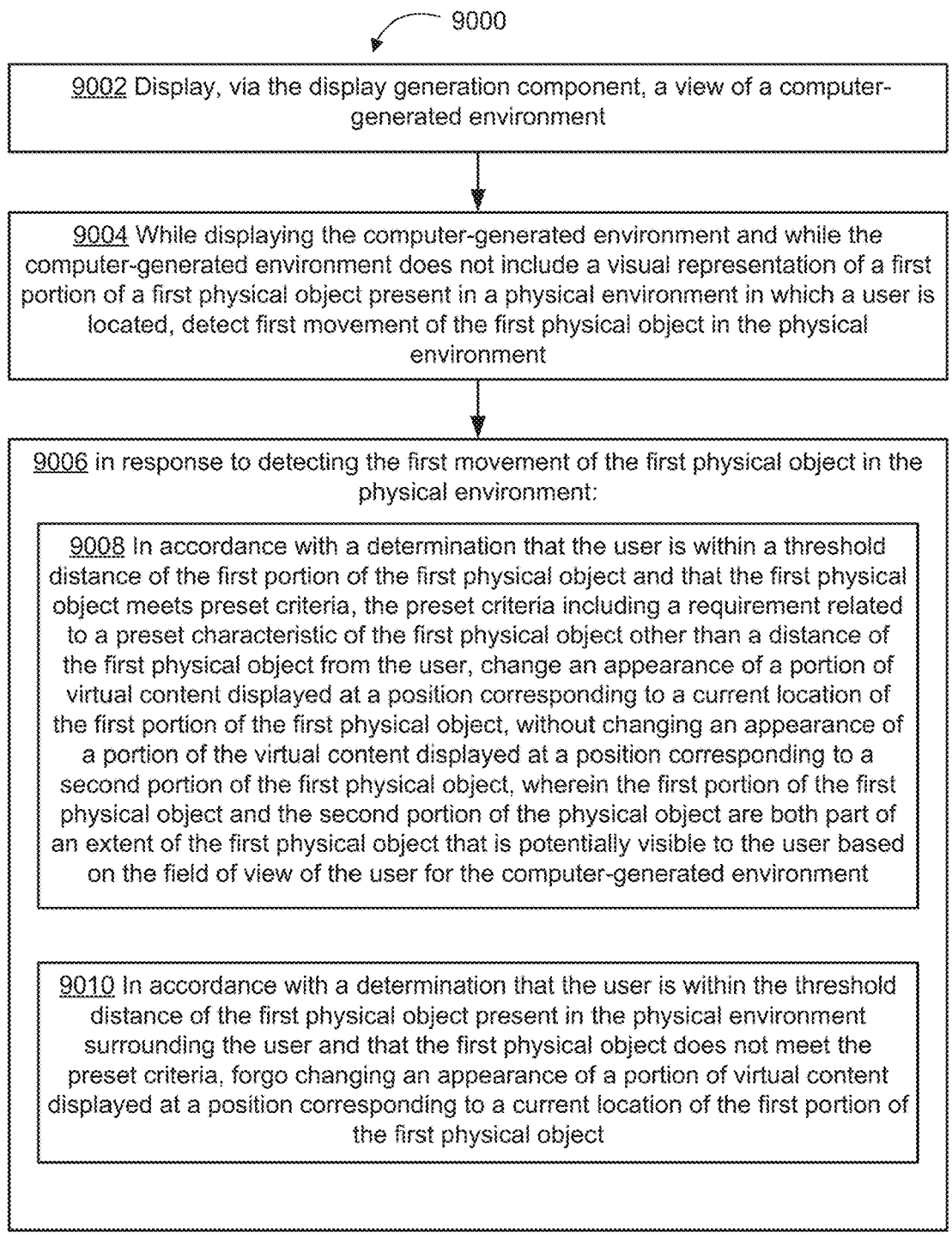
FIG. 9 is a flowchart of a method of altering an appearance of a portion of the virtual content when a physical object of significance approaches a location of the display generation component or the user, in accordance with some embodiments.

FIG. 9 is a flowchart of a method 9000 of altering an appearance of a portion of the virtual content when a physical object of significance approaches a location of the display generation component or the user, in accordance with some embodiments.

In some embodiments, the method 9000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In some embodiments, the method 9000 is performed at a computer system (e.g., computer system 101 in FIG. 1) that is in communication with a display generation component (e.g., display generation component 120 in FIGS. 1, 3, and 4, display generation component 7100, etc.) (e.g., a heads-up display, an HMD, a display, a touchscreen, a projector, etc.). In some embodiments, the computer system is further in communication with one or more audio output devices (e.g., earphones, speakers located in the physical environment, speakers within the same housing or attached to the same support structure as the display generation component (e.g., built-in speakers of an HMD, etc.)), and one or more input devices (e.g., cameras, controllers, touch-sensitive surfaces, joysticks, buttons, gloves, watches, motion sensors, orientation sensors, etc.). In some embodiments, the display generation component is a display component facing the user and provides a CGR experience to the user. In some embodiments, the computer system is an integrated device with one or more processors and memory enclosed in the same housing as the display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from one or more of the display generation components (e.g., a heads-up display, a touchscreen, a standalone display, etc.), the one or more output devices (e.g., earphones, external speakers, etc.) and the one or more input devices. In some embodiments, the display generation components and the one or more audio output devices are integrated and enclosed in the same housing.

In the method 9000, the computer system displays (9002), via the display generation component, a view of a computer-generated environment (e.g., environment 7126 in FIG. 7D, another computer-generated environment, etc.). In some embodiments, the view of the computer-generated environment is a three-dimensional virtual environment, a three-dimensional movie, a virtual office, a virtual desktop, etc., or an augmented reality environment that includes virtual content concurrently displayed with a representation of a physical environment surrounding the display generation component (and/or the user), etc. While displaying the computer-generated environment and while the computer-generated environment does not include a visual representation of a first portion of a first physical object (e.g., physical object 7122 in FIGS. 7C-7H, physical object 7120 in FIG. 7C, another physical object, etc.) (e.g., a pet, another person, a chair, a table, etc.) present in a physical environment in which a user is located (e.g., the user that has a spatial relationship with the display generation component that enables the user to view the content displayed via the display generation component), the computer system detects (9004) first movement of the first physical object in the physical environment (e.g., movement of another person toward the user, movement of a pet toward the user, movement of a rolling ball toward the user, movement of a curtain blowing in the wind, etc.). In response to detecting (9006) the first movement of the first physical object in the physical environment (e.g., movement of the physical object 7120, movement of the physical object 7122, etc. shown in FIGS. 7C, 7E, and 7G) and in accordance with a determination that the user is within a threshold distance of the first portion of the first physical object (e.g., within the spatial region 7124 in FIGS. 7C, 7E, and 7G, within a threshold distance of the characteristic location of the user, etc.) and that the first physical object meets preset criteria (e.g., in the example of FIGS. 7C-7H, physical object 7122 meets the preset criteria), the preset criteria including a requirement related to a preset characteristic (e.g., importance, identity, movement speed, presence of preset action, movement pattern, type of physical object (e.g., person and pet vs. inanimate object), presence of identifier object on the first physical object, etc.) of the first physical object other than a distance of the first physical object from the user, the computer system changes (9008) an appearance of a portion of virtual content displayed at a position corresponding to a current location of the first portion of the first physical object, without changing an appearance of a portion of the virtual content displayed at a position corresponding to a second portion of the first physical object, wherein the first portion of the first physical object (e.g., the head portion of the physical object 7122) and the second portion of the physical object (e.g., the body portion of the physical object 7122) are both part of an extent of the first physical object that is potentially visible to the user based on the field of view of the user for the computer-generated environment (e.g., the first portion and second portion of the first physical object that both would have entered the user's field of view but for the presence of the display generation component (e.g., HMD, heads-up display, etc.)). In some embodiments, the first physical object meets the preset criteria because the first physical object is previously marked by the user as important, the first physical object is moving toward the user with more than a threshold speed, the first physical object is a person as opposed to an inanimate object or animal, the first physical object is a person that is speaking as he/she is approaching the user, the first physical object is a person or pet as opposed to an inanimate object or other types of animal or insects, and/or the first physical object is wearing a preset identifier object (e.g., a collar with a radio-transmitted ID, an RFID tag, a color coded tag, etc.), etc. In some embodiments, when the spatial relationship between the first portion of the first physical object and the second portion of the first physical object is such that their corresponding positions in the computer-generated environment are both visible to the user based on the user's field of view of the computer-generated environment and the position corresponding to the second portion of the first physical object is not blocked by the position corresponding to the first portion of the first physical object from the viewing perspective of the user, the computer system only modifies the appearance of the portion of virtual content displayed at the position corresponding to the first portion of the first physical object but does not modify the appearance of the portion of virtual content displayed at the position corresponding to the second portion of the first physical object, if only the first portion of the first physical object is within the threshold distance of the user and the second portion of the first physical object is not within the threshold distance of the user. In response to detecting the first movement of the first physical object in the physical environment and in accordance with a determination that the user is within the threshold distance of the first physical object present in the physical environment surrounding the user and that the first physical object does not meet the preset criteria (e.g., physical object 7120 does not meet the preset criteria in the example shown in FIGS. 7C-7G), the computer system forgoes (9010) changing an appearance of a portion of virtual content displayed at a position corresponding to a current location of the first portion of the first physical object (and maintaining the virtual content without changing the appearance of the virtual content on account of the presence of the first portion of the first physical object being within the threshold distance of the user and being potentially visible to the user but for the presence of the display generation component blocking the user's view of the physical environment). This is illustrated in FIGS. 7E-7G, where the virtual content at the position that corresponds to the location of the physical object 7120 remain displayed even after the physical object has entered within the spatial region 7124 surrounding the user. In some embodiments, the first physical object does not meet the preset criteria because the first physical object is not previously marked by the user as important, the first physical object is not moving toward the user with more than the threshold speed, the first physical object is not a person, but an inanimate object or animal, the first physical object is a person but is not speaking as he/she is approaching the user, the first physical object is not a person or pet, the first physical object is not wearing a preset identifier object (e.g., a collar with a radio-transmitted ID, an RFID tag, a color coded tag, etc.), etc. In some embodiments, when a portion of the first physical object comes within the threshold distance of the user, its corresponding position in the computer-generated environment is visible to the user based on the user's field of view of the computer-generated environment, and the position corresponding to the first portion of the first physical object is not blocked by a position corresponding to another physical object or another portion of the first physical object from the viewing perspective of the user, the computer system still does not modify the appearance of the portion of virtual content displayed at the position corresponding to the first portion of the first physical object if the first physical object does not meet the preset criteria. For example, a ball does not meet the preset criteria that require the first physical object to be a person or pet; and when the ball rolls close to the user, the computer system does not change the appearance of the virtual content displayed at the position in the computer-generated environment that corresponds to the location of the ball relative to the user. In contrast, if a pet comes close to the user, the computer system changes the appearance of the virtual content displayed at positions corresponding to the portion of the pet that enters the preset distance of the user, without changing the appearance of the virtual content displayed at positions that correspond to another portion of the pet that has not entered the preset distance of the user, even though the positions that correspond to said other portion of the pet are also within the user's current field of view.

In some embodiments, the first portion of the first physical object and the second portion of the first physical object are continuous (or contiguous or adjacent) portions of the first physical object (e.g., the central front portion of the head portion of the physical object 7122 and the peripheral back portion of the head portion of the physical object 7122 are continuous (or contiguous or adjacent) portions of the physical object 7122, the front portion of the body portion of the physical object 7122 and the back portion of the body portion of the physical object 7122 are continuous (or contiguous or adjacent) portions of the physical object 7122, in FIGS. 7F and 7H). For example, in some embodiments, there are no clear structural or visual divisions between the first portion of the first physical object and the second portion of the first physical object that provide the basis for the different treatment applied to the first and second portions of the first physical object; instead, the difference is based on the fact that the first portion of the first physical object is within the threshold distance of the user while the second portion of the first physical object is not within the threshold distance of the user. For example, the first physical object is a pet, and the first portion of the first physical object includes a first portion of the pet's head (e.g., nose, whiskers, part of the face, etc.), and the second portion of the first physical object includes additional portions of the pet's head (e.g., remainder of the face and ears, etc.) and torso connected to the head.

Changing an appearance of a portion of the virtual content displayed at a position corresponding to a current location of the first portion of the first physical object, without changing an appearance of a portion of the virtual content displayed at a position corresponding to a second portion of the first physical object, wherein the first portion of the first physical object and the second portion of the first physical object are continuous (or contiguous or adjacent) portions of the first physical object and are both part of an extent of the first physical object that is potentially visible to the user based on the field of view of the user for the computer-generated environment, in accordance with a determination that the user is within a threshold distance of the first portion of the first physical object and that the first physical object meets preset criteria, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the portion of the virtual content displayed at the position corresponding to the first portion of the first physical object and the portion of the virtual content displayed at the position corresponding to the second portion of the first physical object include respective portions of the same virtual object (e.g., a user interface object, a continuous virtual surface, a movie scene, etc.). For example, in some embodiments, the virtual content is modified in appearance at positions that correspond to portion(s) of a physical object that are within the threshold distance of the user, optionally, irrespective of existence or absence of visual boundaries on the virtual content at the boundaries of those positions. Changing an appearance of a portion of the virtual content displayed at a position corresponding to a current location of the first portion of the first physical object, without changing an appearance of a portion of the virtual content displayed at a position corresponding to a second portion of the first physical object, wherein the first portion of the first physical object and the second portion of the first physical object are continuous (or contiguous or adjacent) portions of the first physical object, in accordance with a determination that the user is within a threshold distance of the first portion of the first physical object and that the first physical object meets preset criteria, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, changing the appearance of the portion of virtual content displayed at the position corresponding to the current location of the first portion of the first physical object, without changing the appearance of the portion of the virtual content displayed at the position corresponding to the second portion of the first physical object includes, while maintaining display of the virtual content (e.g., according to preset progress and changes of the virtual content (e.g., according to preset playback sequence for currently played media, according to preset responses for user interaction performed using user's hand or a controller, etc.)), applying a first visual effect (e.g., increasing transparency level, reducing color saturation, applying animation to the pixels (e.g., producing a shimmering effect), changing a simulated refractive index (e.g., offsetting the pixel positions, etc.), etc.) to the portion of virtual content displayed at the position corresponding to the current location of the first portion of the first physical object, without applying the first visual effect to the portion of the virtual content displayed at the position corresponding to the second portion of the first physical object. In some embodiment, applying the visual effect includes changing various sub-portions of the portion of the virtual content displayed at the position corresponding to the current location of the first portion of the first physical object respectively based on the different visual properties of various sub-portions of the first portion of the first physical object (e.g., internal structure, color, shape, etc. of the first portion of the first physical object). The first visual effect thus is reflective of the appearance of the various sub-portions of the first portion of the first physical object (e.g., shows a ghost image or shadow of the first portion of the first physical object, shown an outline of the first portion of the first physical object, etc.). In some embodiments, changing the appearance of the portion of the virtual content at the position corresponding to the location of the first portion of the first physical object includes replacing display of the portion of the virtual content with a visual representation of the first portion of the first physical object (e.g., a camera view or stylized representation of the first portion of the first physical object). In some embodiments, changing the appearance of the portion of the virtual content at positions corresponding to the location of the first portion of the first physical object includes increasing a transparency of the portion of the virtual content to let the first portion of the first physical object be visible through the semi-transparent display generation component.

Applying a first visual effect to the portion of the virtual content displayed at the position corresponding to the current location of the first portion of the first physical object without applying the first visual effect to the portion of the virtual content displayed at the position corresponding to the second portion of the first physical object, in accordance with a determination that the user is within a threshold distance of the first portion of the first physical object and that the first physical object meets preset criteria, provides improved visual feedback to the user (e.g., improved visual feedback that the user is within the threshold distance of the first portion of the physical object and that the first physical object meets the preset criteria, improved visual feedback regarding the first portion and second portion of the first physical object, etc.). Providing improved feedback enhances the operability of the device, which, additionally, reduces power usage and improves battery life of the device by enabling the user to use the device more quickly and efficiently.

In some embodiments, the preset characteristic of the first physical object includes a first characteristic that distinguishes between a person and non-person physical objects, and determining that the first physical object meets the preset criteria includes detecting (e.g., using one or more cameras coupled to the computer system, etc.) presence of the first characteristic (e.g., a preset facial structure (e.g., presence and/or movement of eyes, relative locations of eyes, nose, and mouth, etc.), proportions and relative positions of body parts (e.g., head, body, and limbs, etc.),) on the first physical object, detecting of human speech other than the user's speech that accompanies the movement of the first physical object, detecting movement pattern associated with human walking or running (e.g., swing of arms, gait, etc.) etc.) on the first physical object. For example, in some embodiments, in response to detecting that the first physical object has at least the first portion of the first physical object within the preset distance of the user and in accordance with a determination that the first physical object has the first characteristic that is indicative of the first physical object being a person as opposed to an inanimate object or an non-human animal, the computer system determines that the first physical object meets the preset criteria for triggering a change in the appearance of the virtual content displayed in the computer-generated environment. In some embodiments, in response to detecting that the first physical object has at least the first portion of the first physical object within the preset distance of the user and in accordance with a determination that the first physical object does not have the first characteristic that is indicative of the first physical object being a person as opposed to an inanimate object or an non-human animal, the computer system determines that the first physical object does not meet the preset criteria for triggering a change in the appearance of the virtual content displayed in the computer-generated environment, and forgoes trigging the change in appearance of the virtual content displayed in the computer-generated environment.

Changing an appearance of a portion of the virtual content displayed at a position corresponding to a current location of the first portion of the first physical object, without changing an appearance of a portion of the virtual content displayed at a position corresponding to a second portion of the first physical object, in accordance with a determination that the user is within a threshold distance of the first portion of the first physical object and that the first physical object meets preset criteria that includes a requirement related to a first characteristic that distinguishes between a person and non-person physical objects, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the preset characteristic of the first physical object includes a second characteristic that is indicative of human speech coming from the first physical object as the first physical object is moving toward the user, and determining that the first physical object meets the preset criteria includes detecting (e.g., using one or more microphones coupled to the computer system, etc.) the second characteristic (e.g., a preset vocal characteristics (e.g., presence a voiceprint, speech patterns of a human language, etc.) of sound originating from a location of the first physical object, characteristics of human speech other than the user's speech that accompanies the movement of the first physical object, utterance of one or more preset words (e.g., "Hi!" "Hey!" "Hello!", "[user's name]", etc.) etc.) at the location of the first physical object. For example, in response to detecting that the first physical object has at least the first portion of the first physical object within the preset distance of the user and in accordance with a determination that the second characteristic that is indicative of human speech is detected at the location of the first physical object, the computer system determines that the first physical object meets the preset criteria for triggering a change in the appearance of the virtual content displayed in the computer-generated environment. In some embodiments, in response to detecting that the first physical object has at least the first portion of the first physical object within the preset distance of the user and in accordance with a determination that the second characteristic that is indicative of human speech is not detected at the location of the first physical object, the computer system determines that the first physical object does not meet the preset criteria for triggering a change in the appearance of the virtual content displayed in the computer-generated environment, and forgoes trigging the change in appearance of the virtual content displayed in the computer-generated environment.

Changing an appearance of a portion of the virtual content displayed at a position corresponding to a current location of the first portion of the first physical object, without changing an appearance of a portion of the virtual content displayed at a position corresponding to a second portion of the first physical object, in accordance with a determination that the user is within a threshold distance of the first portion of the first physical object and that the first physical object meets preset criteria that includes a requirement related to a second characteristic that is indicative of human speech coming from the first physical object as the first physical object is moving toward the user, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the preset characteristic of the first physical object includes a third characteristic (e.g., as detected by the computer system) that distinguishes an animal from a person and non-person physical objects, and determining that the first physical object meets the preset criteria includes detecting (e.g., using one or more cameras coupled to the computer system, etc.) presence of the third characteristic (e.g., a preset head structure (e.g., presence and/or movement of eyes, relative locations of eyes, nose, ears, whiskers, and mouth, etc.), proportions and relative positions of body parts (e.g., head, body, tail, and limbs, etc.), presence of fur, coat color and pattern, etc.) on the first physical object, detecting of animal calls vs. human speech that accompanies the movement of the first physical object, detecting movement pattern associated with animal walking or running (e.g., four legs on the ground, flapping of wings, gait, etc.) etc.) on the first physical object. For example, in response to detecting that the first physical object has at least the first portion of the first physical object within the preset distance of the user and in accordance with a determination that the first physical object has the third characteristic that is indicative of the first physical object being an animal (e.g., a pet, a wild animal, etc.) as opposed to an inanimate object or a person, the computer system determines that the first physical object meets the preset criteria for triggering a change in the appearance of the virtual content displayed in the computer-generated environment. In some embodiments, in response to detecting that the first physical object has at least the first portion of the first physical object within the preset distance of the user and in accordance with a determination that the first physical object does not have the first characteristic that is indicative of the first physical object being an animal as opposed to an inanimate object or a person, the computer system determines that the first physical object does not meet the preset criteria for triggering a change in the appearance of the virtual content displayed in the computer-generated environment, and forgoes trigging the change in appearance of the virtual content displayed in the computer-generated environment.

Changing an appearance of a portion of the virtual content displayed at a position corresponding to a current location of the first portion of the first physical object, without changing an appearance of a portion of the virtual content displayed at a position corresponding to a second portion of the first physical object, in accordance with a determination that the user is within a threshold distance of the first portion of the first physical object and that the first physical object meets preset criteria that includes a requirement related to a third characteristic that distinguishes an animal from a person and non-person physical objects, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the preset characteristic of the first physical object includes a fourth characteristic (e.g., as detected by the computer system) that is based on a movement speed of the first physical object (e.g., movement speed of at least a portion of the first physical object relative to another portion of the first physical object or the physical environment (e.g., waving hand of a person, popping cork shooting off a bottle, etc.), or movement speed of at least a portion of the first physical object toward the user, etc.) (e.g., irrespective of whether the first physical object is a person, an animal or an inanimate object; when the first physical object is an animal; when the first physical object is a person, etc.), and determining that the first physical object meets the preset criteria includes detecting (e.g., using one or more cameras coupled to the computer system, etc.) a characteristic value of the fourth characteristic (e.g., movement speed, a movement acceleration, etc.) of the first physical object exceeds a preset threshold value (e.g., a threshold speed, a threshold movement acceleration, etc.). For example, in some embodiments, in response to detecting that the first physical object has at least the first portion of the first physical object within the preset distance of the user and in accordance with a determination that the first physical object has a movement speed and/or a movement acceleration greater than a preset threshold speed or acceleration in the direction of the user, the computer system determines that the first physical object meets the preset criteria for triggering a change in the appearance of the virtual content displayed in the computer-generated environment. In some embodiments, in response to detecting that the first physical object has at least the first portion of the first physical object within the preset distance of the user and in accordance with a determination that the first physical object does not have a movement speed and/or a movement acceleration greater than the preset threshold speed or acceleration in the direction of the user, the computer system determines that the first physical object does not meet the preset criteria for triggering a change in the appearance of the virtual content displayed in the computer-generated environment, and forgoes trigging the change in appearance of the virtual content displayed in the computer-generated environment. For example, in some embodiments, when a person or a pet is sitting close to the user without movement, the appearance of the virtual content is not changed by the presence of the person or pet; however, when the person or pet suddenly moves with a speed or acceleration greater than the threshold speed or acceleration, the computer system changes the appearance of the virtual content at position(s) corresponding to the location(s) of the portion(s) of the person or pet that are moving and/or that are within the threshold distance of the user. In some embodiments, when a person or pet moves slowly toward the user, the computer system does not change the appearance of the virtual content at positions corresponding to the locations of the portions of the person or pet even when the portions of the person or pet are within the threshold distance of the user; however, when the person or pet or a portion thereof moves quickly toward the user (e.g., waving an arm at the user, throws something toward the user, etc.), the computer system changes the appearance of the virtual content at positions corresponding to the locations of the portions of the person or pet when the portions of the person or pet are within the threshold distance of the user.

Changing an appearance of a portion of the virtual content displayed at a position corresponding to a current location of the first portion of the first physical object, without changing an appearance of a portion of the virtual content displayed at a position corresponding to a second portion of the first physical object, in accordance with a determination that the user is within a threshold distance of the first portion of the first physical object and that the first physical object meets preset criteria that includes a requirement related to a fourth characteristic that is based on a movement speed of the first physical object, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the preset characteristic of the first physical object includes a fifth characteristic that is indicative of occurrence of an event that requires the user's immediate attention (e.g., an emergency, danger, etc.), and determining that the first physical object meets the preset criteria includes detecting (e.g., using one or more cameras, sensors, microphone, etc. coupled to the computer system, etc.) presence of the fifth characteristic (e.g., flashing lights, movement pattern (e.g., door or window opening, closing, etc., a person waving, etc.), vibration (e.g., shaking of a sign, curtain, falling objects, etc.), shouting, siren, etc.) on the first physical object (e.g., a monitor, a flag, a swinging curtain, a door, a person, a vehicle, etc.). For example, in response to detecting that the first physical object has at least the first portion of the first physical object within the preset distance of the user and in accordance with a determination that the first physical object has the fifth characteristic that is indicative of occurrence of an event that requires the user's immediate attention, the computer system determines that the first physical object meets the preset criteria for triggering a change in the appearance of the virtual content displayed in the computer-generated environment. In some embodiments, in response to detecting that the first physical object has at least the first portion of the first physical object within the preset distance of the user and in accordance with a determination that the first physical object does not have the fifth characteristic that is indicative of occurrence of an event that requires the user's immediate attention, the computer system determines that the first physical object does not meet the preset criteria for triggering a change in the appearance of the virtual content displayed in the computer-generated environment, and forgoes triggering the change in appearance of the virtual content displayed in the computer-generated environment.

Changing an appearance of a portion of the virtual content displayed at a position corresponding to a current location of the first portion of the first physical object, without changing an appearance of a portion of the virtual content displayed at a position corresponding to a second portion of the first physical object, in accordance with a determination that the user is within a threshold distance of the first portion of the first physical object and that the first physical object meets preset criteria that includes a requirement related to a fifth characteristic that is indicative of occurrence of an event that requires the user's immediate attention, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the preset characteristic of the first physical object includes a sixth characteristic (e.g., sensor reading, detector signal, image processing results, etc.) that is indicative of presence of an identifier object (e.g., RFID, badge, ultrasonic tag, serial number, logo, name, etc.) on the first physical object, and determining that the first physical object meets the preset criteria includes detecting (e.g., using one or more cameras, sensors, microphone, etc. coupled to the computer system, etc.) presence of the sixth characteristic at a location corresponding to the first physical object. For example, in some embodiments, in response to detecting that the first physical object has at least the first portion of the first physical object within the preset distance of the user and in accordance with a determination that the first physical object has the sixth characteristic that is indicative of an identifier object on the first physical object (e.g., based on output from one or more detectors of the identifier object, image analysis result, etc.), the computer system determines that the first physical object meets the preset criteria for triggering a change in the appearance of the virtual content displayed in the computer-generated environment. In some embodiments, in response to detecting that the first physical object has at least the first portion of the first physical object within the preset distance of the user and in accordance with a determination that the first physical object does not have the sixth characteristic that is indicative of an identifier object on the first physical object (e.g., based on output from one or more detectors of the identifier object, image analysis result, etc.), the computer system determines that the first physical object does not meet the preset criteria for triggering a change in the appearance of the virtual content displayed in the computer-generated environment, and forgoes triggering the change in appearance of the virtual content displayed in the computer-generated environment. For example, a special collar on a pet dog can be used as the identifier object, and when the dog gets close to the user, the change in appearance in the virtual content is triggered due to the presence of the special collar; while when another pet that does not have the special collar (e.g., a fish, a bird, etc.) gets close to the user, the change in appearance in the virtual content is not triggered (e.g., because the collar is not present on the pet).

Changing an appearance of a portion of the virtual content displayed at a position corresponding to a current location of the first portion of the first physical object, without changing an appearance of a portion of the virtual content displayed at a position corresponding to a second portion of the first physical object, in accordance with a determination that the user is within a threshold distance of the first portion of the first physical object and that the first physical object meets preset criteria that includes a requirement related to a sixth characteristic that is indicative of presence of an identifier object on the first physical object, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the preset characteristic of the first physical object includes a seventh characteristic that is based on a movement pattern of the first physical object (e.g., movement pattern of at least a portion of the first physical object relative to another portion of the first physical object or the physical environment, or movement pattern of at least a portion of the first physical object relative to the user, etc.) (e.g., irrespective of whether the first physical object is a person, an animal or an inanimate object; when the first physical object is an animal, when the first physical object is a person, when the first physical object is a preset inanimate object, etc.), and determining that the first physical object meets the preset criteria includes detecting (e.g., using one or more cameras coupled to the computer system, etc.) the seventh characteristic based on the movement pattern of the first physical object meets preset criteria (e.g., criteria for distinguishing passing by or moving toward the user, criteria for distinguishing intent for getting user's attention vs not wishing to interacting with the user, etc.). For example, in response to detecting that the first physical object has at least the first portion of the first physical object within the preset distance of the user and in accordance with a determination that the first physical object has a movement pattern that meets the preset criteria (e.g., indicative of not merely passing by, indicative of a desire for attention of the user, etc.), the computer system determines that the first physical object meets the preset criteria for triggering a change in the appearance of the virtual content displayed in the computer-generated environment.

In some embodiments, in response to detecting that the first physical object has at least the first portion of the first physical object within the preset distance of the user and in accordance with a determination that the first physical object does not have a movement pattern that meets the preset criteria (e.g., indicative of not merely passing by, indicative of a desire for attention of the user, etc.), the computer system determines that the first physical object does not meet the preset criteria for triggering a change in the appearance of the virtual content displayed in the computer-generated environment, and forgoes triggering the change in appearance of the virtual content displayed in the computer-generated environment. For example, in some embodiments, when a pet or another person is passing in front of the user rather than coming toward the user, the appearance of the virtual content is not changed by the presence of the person or pet; however, when the person or pet moves toward the user, the computer system changes the appearance of the virtual content at position(s) corresponding to the location(s) of the portion(s) of the person or pet that are moving and/or that are within the threshold distance of the user. In some embodiments, when a person or pet moves toward the user without any other gestures, the computer system does not change the appearance of the virtual content at positions corresponding to the locations of the portions of the person or pet even when the portions of the person or pet are within the threshold distance of the user; however, when the person or pet moves toward the user while waving at the user (or wagging its tail at the user in the case of a pet), the computer system changes the appearance of the virtual content at positions corresponding to the locations of the portions of the person or pet when the portions of the person or pet are within the threshold distance of the user.

Changing an appearance of a portion of the virtual content displayed at a position corresponding to a current location of the first portion of the first physical object, without changing an appearance of a portion of the virtual content displayed at a position corresponding to a second portion of the first physical object, in accordance with a determination that the user is within a threshold distance of the first portion of the first physical object and that the first physical object meets preset criteria that includes a requirement related to a seventh characteristic that is based on a movement pattern of the first physical object, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the preset characteristic of the first physical object includes an eighth characteristic that is based on a match (e.g., a match or correspondence above a threshold confidence value as determined by a computer algorithm or artificial intelligence based on detected sensor data, image data, etc.) between a recognized identity (e.g., spouse, favorite pet, boss, children, police, conductor on train, etc.) of the first physical object (e.g., facial recognition, voice recognition, speech recognition, etc.) and a first preset identity (e.g., identifies previously established as "important", "needing attention", etc.), and determining that the first physical object meets the preset criteria includes detecting (e.g., using one or more cameras coupled to the computer system, etc.) the eighth characteristic meeting preset criteria (e.g., confidence of a match exceeds a preset matching threshold, probability of match exceeds a threshold value, etc.). For example, in some embodiments, in response to detecting that the first physical object has at least the first portion of the first physical object within the preset distance of the user and in accordance with a determination that the first physical object has been recognized as having one of the preset identities, the computer system determines that the first physical object meets the preset criteria for triggering a change in the appearance of the virtual content displayed in the computer-generated environment.

In some embodiments, in response to detecting that the first physical object has at least the first portion of the first physical object within the preset distance of the user and in accordance with a determination that the first physical object has not been recognized as having one of the preset identities, the computer system determines that the first physical object does not meet the preset criteria for triggering a change in the appearance of the virtual content displayed in the computer-generated environment, and forgoes triggering the change in appearance of the virtual content displayed in the computer-generated environment. For example, in some embodiments, in a meeting room, people who are not recognized as one of the preset identities will not trigger changes in the appearance of the virtual content even if they get close to the user; and a person that is recognized as having one of the preset identities will cause a change in the appearance of the virtual content. In some embodiments, to establish the preset identities, the computer system establishes one or more recognition or matching computational models based on training data associated with objects and people of importance to the user and/or needing attention from the user; and optionally, training data associated with other objects and people that should not trigger changes in the appearance of the virtual content as negative training material.

Changing an appearance of a portion of the virtual content displayed at a position corresponding to a current location of the first portion of the first physical object, without changing an appearance of a portion of the virtual content displayed at a position corresponding to a second portion of the first physical object, in accordance with a determination that the user is within a threshold distance of the first portion of the first physical object and that the first physical object meets preset criteria that includes a requirement related to an eighth characteristic that is based on a match between a recognized identity of the first physical object and a first preset identity, changes an appearance of a portion of the virtual content when a set of conditions has been met without requiring further user input (e.g., further user input to change an appearance of an appropriate portion of the virtual content). Performing an operation when a set of conditions has been met without requiring further user input enhances the operability of the device, which, additionally, reduces power usage and improves battery life of the device by enabling the user to use the device more quickly and efficiently.

In some embodiments, the computer-generated environment includes a virtual environment without concurrently including a representation of a physical environment surrounding the user. In some embodiments, the virtual environment is an application user interface. In some embodiments, the virtual environment is a virtual desktop. In some embodiments, the virtual environment is a three-dimensional virtual environment. In some embodiments, the virtual environment includes playback of media content (e.g., a movie, a game, a video, etc.). In some embodiments, the virtual environment includes a three-dimensional game environment. In some embodiments, the virtual environment includes a three-dimensional video with spatial audio content. In some embodiments, the virtual environment includes a simulated physical environment that is different from the physical environment surrounding the user. Displaying a view of a computer-generated environment that includes a virtual environment without concurrently including a representation of a physical environment surrounding the user enables use of many of the other features described herein in a virtual reality setting, thereby providing such features in a broad range of applications.

In some embodiments, the computer-generated environment includes an augmented reality environment that includes a representation of the physical environment concurrently displayed with the virtual content, and the change in appearance in the virtual content is displayed concurrently with a portion of the representation of the physical environment that is displayed via the display generation component (e.g., displayed by and/or visible through a transparent portion thereof, etc.) in regions adjacent to the virtual content. For example, in some embodiments, the virtual content is displayed overlaying, blocking, or replacing display of at least a portion of the representation of the physical environment (e.g., in a camera view or a pass-through view), and when the first portion of the first physical object moves within the threshold distance of the user and the first physical object meets the preset criteria, the portion of the virtual content that is displayed at a position that corresponds to the location of the first portion of the first physical object (e.g., the first portion of the first physical object is now occupying a portion of the physical environment that was previously overlaid, blocked, and/or replaced by said portion of the virtual content) is altered in appearance in accordance with the appearance of the first portion of the first physical object. In some embodiments, other portions of the first physical object may be visible as part of the physical environment that is not blocked, replaced by, or overlaid by virtual content.

Displaying a view of a computer-generated environment that includes an augmented reality environment that includes a representation of the physical environment concurrently displayed with the virtual content, and displaying the change in appearance of the virtual content is displayed concurrently with a portion of the representation of the physical environment that is displayed via the display generation component in regions adjacent to the virtual content, provides improved visual feedback to the user (e.g., improved visual feedback that the view of the computer-generated environment is an augmented reality environment). Providing improved feedback enhances the operability of the device, which, additionally, reduces power usage and improves battery life of the device by enabling the user to use the device more quickly and efficiently.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, and 11000) are also applicable in an analogous manner to method 9000 described above with respect to FIG. 9. For example, the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described above with reference to method 9000 optionally have one or more of the characteristics of the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described herein with reference to other methods described herein (e.g., methods 8000, 10000, and 11000). For brevity, these details are not repeated here.

Figure 10:
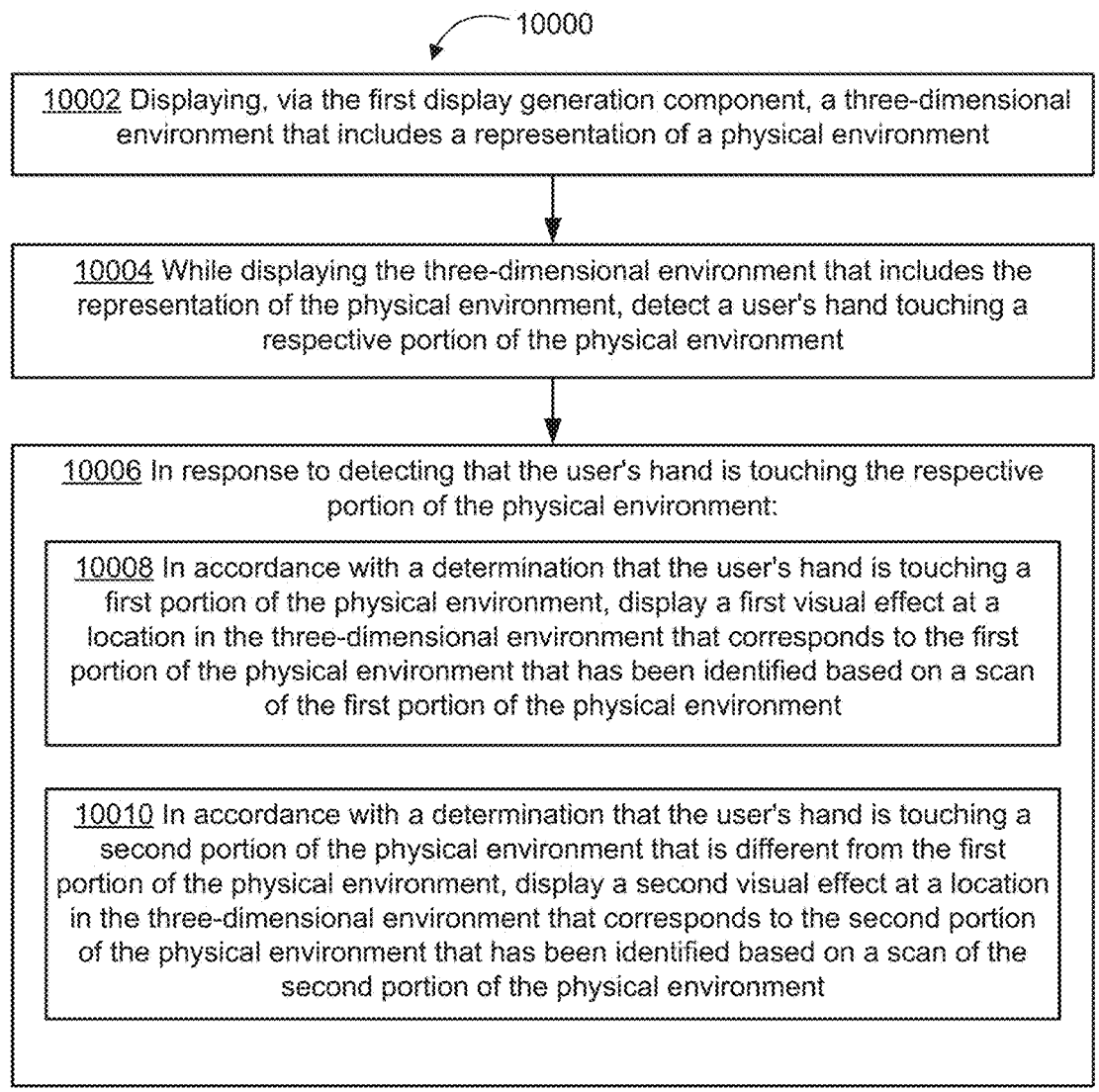
FIG. 10 is a flowchart of a method of applying a visual effect to a region in a three-dimensional environment that corresponds to a portion of the physical environment that has been identified based on a scan of the portion of the physical environment, in accordance with some embodiments.

FIG. 10 is a flowchart of a method 10000 of applying a visual effect to a region in a three-dimensional environment that corresponds to a portion of the physical environment that has been identified based on a scan of the portion of the physical environment, in accordance with some embodiments.

In some embodiments, the method 10000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 10000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In some embodiments, the method 10000 is performed at a computer system (e.g., computer system 101 in FIG. 1) that is in communication with a first display generation component (e.g., display generation component 120 in FIGS. 1, 3, and 4, display generation component 7100, etc.) (e.g., a heads-up display, an HMD, a display, a touchscreen, a projector, etc.), and one or more input devices (e.g., cameras, controllers, touch-sensitive surfaces, joysticks, buttons, gloves, watches, motion sensors, orientation sensors, etc.). In some embodiments, the first display generation component is a display component facing the user and provides a CGR experience to the user. In some embodiments, the computer system is an integrated device with one or more processors and memory enclosed in the same housing as the first display generation components, one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from one or more of the display generation components (e.g., a heads-up display, a touch-screen, a standalone display, etc.), the one or more output devices (e.g., earphones, external speakers, etc.) and/or the one or more input devices that are in communication with the computer system. In some embodiments, the display generation components and the one or more input devices are integrated and enclosed in the same housing.

In the method 10000, the computer system displays (10002), via the first display generation component, a three-dimensional environment that includes a representation of a physical environment (e.g., a three-dimensional augmented reality environment, a pass-through view of the physical environment, etc.) (e.g., as shown in FIG. 7J). While displaying the three-dimensional environment that includes the representation of the physical environment, the computer system detects (10004) a user's hand touching (e.g., coming into contact with, resting on, coming within a threshold distance of, etc.) a respective portion of the physical environment (e.g., as shown in FIG. 7K, where the user's hand 7202 touches a top surface of a physical object represented by representation 7014' in the three-dimensional environment). In some embodiments, the computer system detects (e.g., using one or more cameras or touch sensors, etc.), that a location of a user's hand or finger and the respective portion of the physical environment (e.g., a first portion of a table top, a second portion of the table top, a first portion of a wall surface, a second portion of the wall surface, a first physical object, a second physical object, etc.) are within a threshold distance of each other (e.g., zero or negligible distances). In response to detecting (10006) that the user's hand is touching the respective portion of the physical environment (and optionally, after the touching has persisted for at least a threshold amount of time with less than a threshold amount of movement from the respective portion of the physical environment (e.g., the touch is substantially stationary at the respective portion of the physical environment after touching down on the respective portion of the physical environment)) and in accordance with a determination that the user's hand is touching (e.g., coming into contact with, resting on, etc.) a first portion of the physical environment, the computer system displays (10008) a first visual effect (e.g., visual effect 7144 in FIGS. 7K and 7L) (e.g., shimmering visual effect, a growing overlay, a growing wire mesh, etc.) at a location in the three-dimensional environment that corresponds to the first portion of the physical environment that has been identified based on a scan of the first portion of the physical environment. In some embodiments, the first portion of the physical environment is identified based on a surface scan (e.g., detection of a plane, construction of a mesh, etc.) or construction of a three-dimensional model, etc., that has characteristics of the surface of one or more physical objects in the first portion of the physical environment, and/or that is started in response to detecting the user's hand touching the first portion of the physical environment or at an earlier time, etc. In some embodiments, the first visual effect has spatial characteristics (e.g., surface orientation, size, shape, propagation direction, etc.) that correspond to the spatial characteristics (e.g., surface orientation, size, shape, location, etc.) of the first portion of the physical environment). In response to detecting that the user's hand is touching the respective portion of the physical environment and in accordance with a determination that the user's hand is touching (e.g., coming into contact with, resting on, etc.) a second portion of the physical environment that is different from the first portion of the physical environment, the computer system displays (10010) a second visual effect (e.g., shimmering visual effect, a growing overlay, a growing mesh, etc.) (e.g., the first visual effect, or a visual effect that is different from the first visual effect and that is selected based on the scan result (e.g., type of surface, type of object identified, etc.), etc.) at a location in the three-dimensional environment that corresponds to the second portion of the physical environment that has been identified based on a scan of the second portion of the physical environment. In some embodiments, the second portion of the physical environment is identified based on a surface scan (e.g., detection of a plane, construction of a mesh, etc.) and/or construction of a three-dimensional model, etc., that has characteristics of the surface of one or more physical objects in the second portion of the physical environment, and/or that is started in response to detecting the user's hand touching the second portion of the physical environment or at an earlier time, etc. In some embodiments, the second visual effect has spatial characteristics (e.g., surface orientation, size, shape, propagation direction, etc.) that correspond to the spatial characteristics (e.g., surface orientation, size, shape, location, etc.) of the second portion of the physical environment.

In some embodiments, a gaze input (e.g., gaze 7140 in FIGS. 7K and 7L) directed to the respective portion of the physical environment (e.g., detecting a gaze that meets preset stability (e.g., with less than a threshold amount of movement within a threshold amount of time, substantially stationary, etc.) and/or duration requirement(s) at a position in the three-dimensional environment that corresponds to the location of the respective portion of the physical environment (e.g., at a representation of the respective portion of the physical environment in the representation of the physical environment)) is detected in conjunction with (e.g., concurrently with, within a threshold time of (e.g., before, after, during, etc.), etc.) detecting the user's hand touching (e.g., coming into contact with, resting on, coming within a threshold distance of, etc.) the respective portion (e.g., the first portion, the second portion, etc.) of the physical environment. In some embodiments, the respective portion of the physical environment includes a physical surface, a physical object, etc. In some embodiments, detecting the user's hand touching the respective portion of the physical environment includes detecting the user's hand coming into contact with, resting on, coming within a threshold distance of, etc. the respective portion of the physical environment in conjunction with detecting a gaze input directed to the respective portion of the physical environment. In some embodiments, the computer system requires that the touching has persisted for at least a threshold amount of time with less than a threshold amount of movement from the respective portion of the physical environment (e.g., the touch is substantially stationary at the respective portion of the physical environment after touching down on the respective portion of the physical environment) at the location of the gaze input in order to trigger the display of the visual effect at the location in the three-dimensional environment that corresponds to the respective portion of the physical environment. The first visual effect is displayed in accordance with a determination that the user's hand is touching (e.g., coming into contact with, resting on, coming within a threshold distance of, etc.) the first portion of the physical environment (e.g., a first portion of a physical surface, a first physical object, etc.) in conjunction with (e.g., concurrently with, within a threshold time of (e.g., before, after, during, etc.), etc.) the gaze input being directed to the first portion of the physical environment (e.g., gaze being detected on a representation of the first portion of the physical surface, a representation of the first physical object, etc. in the three-dimensional environment), and the second visual effect is displayed in accordance with a determination that the user's hand is touching (e.g., coming into contact with, resting on, coming into contact with, etc.) the second portion of the physical environment (e.g., a second portion of the physical surface, a second physical object, etc.) in conjunction with (e.g., concurrently with, within a threshold time of (e.g., before, after, during, etc.), etc.) the gaze input being directed to the second portion of the physical environment (e.g., gaze being detected on a representation of the second portion of the physical surface, a representation of the second physical object, etc. in the three-dimensional environment).

In some embodiments, in accordance with a determination that the user's hand is touching the respective portion of the physical environment without the gaze input being directed to the respective portion of the physical environment concurrently or within a threshold time window, the computer system does not display the corresponding visual effect (e.g., the animated and/or growing visual effect that is generated based on the scan of the respective portion of the physical environment) at the location in the view of the three-dimensional environment that corresponds to the respective portion of the physical environment. In some embodiments, after the respective visual effect is displayed (e.g., started at the location that corresponds to respective portion of the physical environment that is being touched by the user) in response to detecting the user's hand touching the respective portion of the physical environment in conjunction with the gaze input being directed to the respective portion of the physical environment, the respective visual effect continues to grow and expand from the location that corresponds to the respective portion of the physical environment based on a scan of the regions of the physical environment adjacent to the respective portion of the physical environment, optionally, even after the hand is no longer touching the respective portion of the physical environment and/or the gaze has moved away from the respective portion of the physical environment.

Displaying the first visual effect in accordance with a determination that the user's hand is touching the first portion of the physical environment in conjunction with the gaze input being directed to the first portion of the physical environment, and displaying the second visual effect in accordance with a determination that the user's hand is touching the second portion of the physical environment in conjunction with the gaze input being directed to the second portion of the physical environment, provides additional control options without cluttering the user interface with additional displayed controls (e.g., additional displayed controls for determining whether to display the first or second visual effect). Providing additional control options without cluttering the user interface with additional displayed controls enhances the operability of the device, which, additionally, reduces power usage and improves battery life of the device by enabling the user to use the device more quickly and efficiently.

In some embodiments, in response to detecting that the user's hand is touching the respective portion of the physical environment and in accordance with a determination that the user's hand is touching (e.g., coming into contact with, resting on, coming within a threshold distance of, etc.) the first portion of the physical environment (e.g., after displaying the first visual effect at the location in the three-dimensional environment that corresponds to the first portion of the physical environment that has been identified based on the scan of the first portion of the physical environment), the computer system expands an area to which the first visual effect is applied from the location in the three-dimensional environment that corresponds to the first portion of the physical environment that is touched by the user's hand (e.g., as shown in FIGS. 7K-7L, the visual effect 7144 expands from the position that corresponds to the location of the touch by the hand 7202). In some embodiments, the first visual effect is later expanded (e.g., automatically expanded without additional user input, or expanded as long as the user's hand remains touching the first portion of the physical environment) into from the location that corresponds to the first portion of the physical environment to an area corresponding to a second portion of the physical environment that is not touched by the user's hand. In response to detecting that the user's hand is touching the respective portion of the physical environment and in accordance with a determination that the user's hand is touching (e.g., coming into contact with, resting on, coming within a threshold distance of, etc.) the second portion of the physical environment (e.g., after displaying the second visual effect at the location in the three-dimensional environment that corresponds to the second portion of the physical environment that has been identified based on the scan of the second portion of the physical environment), the computer system expands an area to which the second visual effect is applied from the location in the three-dimensional environment that corresponds to the second portion of the physical environment that is touched by the user's hand.

In some embodiments, the first visual effect is later expanded (e.g., automatically expanded without additional user input, or expanded as long as the user's hand remains touching the first portion of the physical environment) into from the location that corresponds to the second portion of the physical environment to an area corresponding to the first portion of the physical environment that is not touched by the user's hand. In some embodiments, the respective portion of the physical environment is, optionally, the contact area between the user's hand and the physical environment, a portion of a physical surface that is larger than and encompasses the contact area between the user's hand and the physical surface, and/or a portion of a physical surface or physical object that is within a threshold height difference of the contact area between the user's hand and the physical environment, etc. In some embodiments, the visual effect is displayed at and expands outward from the location within the three-dimensional environment that corresponds to the touch-down location of the hand on the respective portion of the physical environment (e.g., a physical surface in the physical environment), and the expansion of the visual effect conforms to the physical surface that has been identified in and around the respective portion of the physical environment. In some embodiments, the visual effect is displayed at and expands outward from the location of the gaze input that is detected in conjunction with the touch-down of the user's hand on the respective portion of the physical environment (e.g., in accordance with a determination that the gaze input is directed to the center of a table top while the hand touches down on a portion of the table top offset from the center of the table top, the visual effect is, optionally, displayed at and expands from a location that corresponds to the center of the table top, as opposed to a location that corresponds to the touch-down location of the user's hand). In some embodiments, the visual effect is displayed at and expands outward from the touch-down location of the user's hand when a gaze input is detected in conjunction with the touch-down of the user's hand on the respective portion of the physical environment but offset from the touch-down location of the user's hand (e.g., in accordance with a determination that the gaze input is directed to the center of a table top while the hand touches down on a portion of the table top offset from the center of the table top, the visual effect is, optionally, displayed at and expands from a location that corresponds to the touch-down location of the user's hand as opposed to a location that corresponds to the center of the table top).

Expanding an area to which the first visual effect is applied from the location in the three-dimensional environment that corresponds to the first portion of the physical environment that is touched by the user's hand, in accordance with a determination that the user's hand is touching the first portion of the physical environment, and expanding an area to which the second visual effect is applied from the location in the three-dimensional environment that corresponds to the second portion of the physical environment that is touched by the user's hand, in accordance with a determination that the user's hand is touching the second portion of the physical environment, provides improved visual feedback to the user (e.g., improved visual feedback regarding the location that the user's hand is touching). Providing improved feedback enhances the operability of the device, which, additionally, reduces power usage and improves battery life of the device by enabling the user to use the device more quickly and efficiently.

In some embodiments, the first visual effect includes first animated visual changes in an area to which the first visual effect is applied and the second visual effect includes second animated visual changes in an area to which the second visual effect is applied. In some embodiments, the animated visual changes include a shimmering light and/or color variations that changes over time in an area in the three-dimensional environment to which the visual effect is applied. In some embodiments, the area to which the visual effect is applied does not change (e.g., in terms of size, shape, and/or content, etc., displayed in the area) when the animated visual changes are occurring (e.g., the visual effect affects the appearance of the area with one or more filter or modification function applied to the original content of the area, while visual features (e.g., shape, size, object type, etc.) of the content remain discernable by a viewer). In some embodiments, the area in the three-dimensional environment to which the visual changes are applied expands as the animated visual changes are occurring. Displaying a first visual effect including first animated visual changes at a location in the three-dimensional environment that corresponds to the first portion of the physical environment that has been identified based on a scan of the first portion of the physical environment, in accordance with a determination that the user's hand is touching a first portion of the physical environment, and displaying a second visual effect including second animated visual changes at a location in the three-dimensional environment that corresponds to the second portion of the physical environment that has been identified based on a scan of the second portion of the physical environment, in accordance with a determination that the user's hand is touching a second portion of the physical environment that is different from the first portion of the physical environment, provides improved visual feedback to the user (e.g., improved visual feedback by drawing the user's attention to the location the user's hand is touching). Providing improved feedback enhances the operability of the device, which, additionally, reduces power usage and improves battery life of the device by enabling the user to use the device more quickly and efficiently.

In some embodiments, the first portion of the physical environment and the second portion of the physical environment correspond to different portions of an extended (e.g., continuous, substantially flat, without discontinuity (e.g., gap, crack, abrupt change in surface height, etc.), etc.) physical surface (e.g., a wall, a table top, the seat of a sofa, a floor, etc.), and the first visual effect is different from the second visual effect. In some embodiments, the first visual effect and the second visual effect, when respectively applied, are applied to at least one common area (e.g., the areas occupied by the first visual effect and the second visual effect partially overlap in said common area) in the three-dimensional environment, but change the appearance of the area differently in the at least one common area (e.g., because the starting locations of the first and second visual effects are different, the timing of the application of the visual effects at the at least one common area are different, the directions of propagation across the common area are different, etc.). In some embodiments, the first visual effect and the second visual effect, when respectively applied, are applied to different areas of the same extended physical object or surface, and the first visual effect and the second visual effect applied to the different areas change the appearances of the different areas differently (e.g., because the starting locations of the first and second visual effects are different, the local physical characteristics (e.g., texture, orientation, color, pattern, height variance, etc.) of the different areas are different, the propagation directions of the visual effect across the different areas are different, etc.).

Displaying a first visual effect at a location in the three-dimensional environment that corresponds to the first portion of the physical environment that has been identified based on a scan of the first portion of the physical environment, in accordance with a determination that the user's hand is touching a first portion of the physical environment, and displaying a second visual effect, different from the first visual effect, at a location in the three-dimensional environment that corresponds to the second portion of the physical environment that has been identified based on a scan of the second portion of the physical environment, in accordance with a determination that the user's hand is touching a second portion of the physical environment that is different from the first portion of the physical environment, wherein the first portion of the physical environment and the second portion of the physical environment correspond to different portions of an extended physical surface, provides improved visual feedback to the user (e.g., provides visual feedback even if the first portion of the physical environment is part of the same surface as the second portion of the physical environment). Providing improved feedback enhances the operability of the device, which, additionally, reduces power usage and improves battery life of the device by enabling the user to use the device more quickly and efficiently.

In some embodiments, the first visual effect and the second visual effect are generated in accordance with a first baseline visual effect (e.g., a gray overlay, a shimmering visual effect, rippling waves, growing mesh wires, etc.), and the first visual effect and the second visual effect include different animations generated in accordance with the first baseline visual effect (e.g., baseline growing gray overlays with different shaped boundary lines, baseline shimmering visual effects modified using different spatial relationships between a virtual light source and an underlying surface, baseline rippling waves modified with different wavelengths and/or origins, baseline mesh wire patterns modified with different starting locations, etc.). Generating the first visual effect in accordance with a first baseline visual effect, and generating the second visual effect that includes different animations from the first visual effect, in accordance with the first baseline visual effect, provides improved visual feedback to the user (e.g., improved visual feedback regarding whether the computer system detects the user's hand is touching the first portion of the physical environment or the second portion of the physical environment). Providing improved feedback enhances the operability of the device, which, additionally, reduces power usage and improves battery life of the device by enabling the user to use the device more quickly and efficiently.

In some embodiments, the first visual effect (e.g., a first static visual effect, first animated visual changes, etc.) is displayed (e.g. initially displayed or started at, and, optionally, expanding from a respective area corresponding to the touch-down location of the user's hand on a physical surface; initially displayed or started at, and optionally, expanding from a respective area corresponding to a gaze location on a physical surface when touch-down of the user's hand on the physical surface is detected; etc.) in response to detecting touch-down (e.g., initial contact, initial contact that has sustained without substantial movement for at least a threshold amount of time, etc.) of the user's hand on a physical surface in the first portion of the physical environment, and the second visual effect (e.g., a second static visual effect, second visual changes, etc.) is displayed (e.g., initially displayed or started at, and, optionally, expanding from a respective area corresponding to the touch-down location of the user's hand on a physical surface; initially displayed or started at, and optionally, expanding from a respective area corresponding to a gaze location on a physical surface when touch-down of the user's hand on the physical surface is detected, etc.) in response to detecting touch down (e.g., initial contact, initial contact that has sustained without substantial movement for at least a threshold amount of time, etc.) of the user's hand on a physical surface in the second portion of the physical environment.

Displaying the first visual effect in response to detecting touch-down of the user's hand on a physical surface in the first portion of the physical environment, and displaying the second visual effect in response to detecting touch down of the user's hand on a physical surface in the second portion of the physical environment, provides improved visual feedback to the user (e.g., improved visual feedback regarding the location that the user's hand is touching, improved visual feedback that the computer system has detected touch down of the user's hand on a physical surface, etc.). Providing improved feedback enhances the operability of the device, which, additionally, reduces power usage and improves battery life of the device by enabling the user to use the device more quickly and efficiently.

In some embodiments, the computer system maintains display of the first visual effect while the user's hand maintains contact with the first portion of the physical environment (e.g., as shown in FIG. 7M). In some embodiments, the visual effect is maintained with the same shape, size, and/or appearance (e.g., optionally after reaching a steady state (e.g., expanded to the edges of the touched surface, physical object, etc.)) as long as the user's hand maintains contact with the first portion of the physical environment (e.g., without substantial movement from the initial touch-down location of the hand, optionally, with movement but without breaking contact from the surface containing the touch-down location, etc.). In some embodiments, the visual effect continues to grow and expand (e.g., with changing shape, size, and/or appearance) across surfaces and/or space in the representation of the physical environment, as long as the user's hand maintains contact with the first portion of the physical environment (e.g., without substantial movement from the initial touch-down location of the hand, optionally, with movement but without breaking contact from the surface containing the touch-down location, etc.). Maintaining display of the first visual effect while the user's hand maintains contact with the first portion of the physical environment provides improved visual feedback to the user (e.g., improved visual feedback that the computer system is still detecting the user's hand in contact with the first portion of the physical environment). Providing improved feedback enhances the operability of the device, which, additionally, reduces power usage and improves battery life of the device by enabling the user to use the device more quickly and efficiently.

In some embodiments, the computer system ceases display of the first visual effect in response to detecting the user's hand ceasing contact with the first portion of the physical environment (e.g., as shown in FIG. 7N). In some embodiments, the visual effect ceases to be displayed (e.g., the appearance of the representation of the physical environment is restored) when the user's hand breaks contact with the first portion of the physical environment (e.g., or, optionally, breaking contact with the surface containing the touch-down location, if movement of the contact has occurred after touching down). In some embodiments, the visual effect ceases to be displayed (e.g., the appearance of the representation of the physical environment is restored) when the user's hand moves from the initial touch-down location in the first portion of the physical environment. In some embodiments, the visual effect continues to be displayed in regions to which the visual effect is already applied, but ceases to grow and expand across surfaces and/or space in the representation of the physical environment when the user's hand breaks contact with the first portion of the physical environment or moves away from the touch-down location. In some embodiments, the computer system maintains display of the second visual effect while the user's hand maintains contact with the second portion of the physical environment, and ceases display of the second visual effect in response to detecting the user's hand ceasing contact with the second portion of the physical environment. Ceasing display of the first visual effect in response to detecting the user's hand ceasing contact with the first portion of the physical environment provides improved visual feedback to the user (e.g., improved visual feedback that the computer system no longer detects the user's hand in contact with the first portion of the physical environment). Providing improved feedback enhances the operability of the device, which, additionally, reduces power usage and improves battery life of the device by enabling the user to use the device more quickly and efficiently.

In some embodiments, the first visual effect includes first animated visual changes. The computer system ceases display of the first animated changes in response to detecting the user's hand ceasing contact with the first portion of the physical environment, and the computer system displays a first static representation of the first animated changes after ceasing display of the first animated changes. In some embodiments, the second visual effect includes second animated visual changes (e.g., same as the first animated changes, different from the first animated changes in one or more respects, unrelated to the first animated changes, etc.), and the computer system ceases display of the second animated changes in response to detecting the user's hand ceasing contact with the second portion of the physical environment, and the computer system displays of a second static representation of the second animated changes after ceasing display of the second animated changes. Ceasing display of the first animated changes in response to detecting the user's hand ceasing contact with the first portion of the physical environment, and displaying a first static representation of the first animated changes after ceasing display of the first animated changes, provides improved visual feedback to the user (e.g., improved visual feedback that the computer system no longer detects the user's hand in contact with the first portion of the physical environment and that the computer system previously displayed the first animated changes). Providing improved feedback enhances the operability of the device, which, additionally, reduces power usage and improves battery life of the device by enabling the user to use the device more quickly and efficiently.

In some embodiments, the first visual effect and the second visual effect include an animated representation of a process that generates a spatial representation of at least the respective portion of the physical environment. For example, in some embodiments, the first visual effect and the second visual effect are animated visual representations of the identification of planes, surfaces, physical structures, and/or sizes, and/or shapes of physical objects present in the physical environment and/or construction of virtual data representations of the physical environment (e.g., planes, mesh surfaces, three-dimensional models, etc.) based on sensor data (e.g., image data, depth data, ultrasound data, echolocation data, etc. that are captured in real-time, stored, and/or streamed, etc.). Displaying the first visual effect and the second visual effect, including an animated representation of a process that generates a spatial representation of at least the respective portion of the physical environment, provides improved visual feedback to the user (e.g., improved visual feedback that the computer system is generating a spatial representation of a respective portion of the physical environment). Providing improved feedback enhances the operability of the device, which, additionally, reduces power usage and improves battery life of the device by enabling the user to use the device more quickly and efficiently.

In some embodiments, the first visual effect starts from the location in the three-dimensional environment that corresponds to the first portion of the physical environment (e.g., the first portion of the physical environment corresponds to a first physical object and does not correspond to other physical object that is not the first physical object, the first portion of the physical environment corresponds to an extended physical surface and does not correspond to surfaces that are disconnected or that are not smoothly joined to the extended physical surface, etc.) and expands to an area in the three-dimensional environment that does not correspond to the first portion of the physical environment. In some embodiments, first visual effect expands to an area that corresponds to a different physical object or physical surface from the physical surface or object that is touched by the user. In some embodiments, expansion optionally continues even after the user's hand is no longer touching the first portion of the physical environment; expansion stops when the user's hand is no longer touching the first portion of the physical environment, etc. In some embodiments, the second visual effect starts from within the second portion of the physical environment (e.g., the second portion of the physical environment corresponds to a second physical object and does not correspond to other physical object that is not the second physical object, the second portion of the physical environment corresponds to an extended physical surface and does not correspond to surfaces that are disconnected or that are not smoothly joined to the extended physical surface, etc.) and expands to an area in the three-dimensional environment that does not correspond to the second portion of the physical environment (e.g., second visual effect expands to an area that corresponds to a different physical object or physical surface from the physical surface or object that is touched by the user). In some embodiments, the first portion of the physical environment and the second portion of the physical environment correspond to two different physical objects that are optionally not in contact with each other. In some embodiments, the first portion of the physical environment and the second portion of the physical environment correspond to two different portions of the same physical object or the same extended physical surface. In some embodiments, the first visual effect may optionally expand into an area that corresponds to the second portion of the physical environment, and the second visual effect may optionally expand into an area that corresponds to the first portion of the physical environment (e.g., when the animated changes continues while the user's hand maintains contact with the respective portion of the physical environment from which the animated changes are started, or, optionally, when the animated changes continues after the user's hand is no longer touching the respective portion of the physical environment from which the animated changes are started, etc.).

Displaying the first visual effect that starts from the location in the three-dimensional environment that corresponds to the first portion of the physical environment and expands to an area in the three-dimensional environment that does not correspond to the first portion of the physical environment provides improved visual feedback to the user (e.g., improved visual feedback regarding the location in the three-dimensional environment that corresponds to the first portion of the physical environment). Providing improved feedback enhances the operability of the device, which, additionally, reduces power usage and improves battery life of the device by enabling the user to use the device more quickly and efficiently.

In some embodiments, displaying the first visual effect at the location in the three-dimensional environment that corresponds to the first portion of the physical environment that has been identified based on the scan of the first portion of the physical environment includes moving virtual illumination across a virtual surface corresponding to a first surface (e.g., a wave front of the virtual light propagating from one location or another location on a virtual surface corresponding to the first surface, a localized increase in brightness moves from one location to another location on a virtual surface corresponding to the first surface, etc.) identified in the first portion of the physical environment. In some embodiments, the virtual illumination moves further beyond the virtual surface corresponding to the first surface onto virtual surfaces corresponding to other surfaces that are identified in the physical environment. In some embodiments, displaying the second visual effect at the location in the three-dimensional environment that corresponds to the second portion of the physical environment that has been identified based on the scan of the second portion of the physical environment includes moving virtual illumination across a virtual surface that corresponds to a second surface identified in the second portion of the physical environment. In some embodiments, the first surface and the second surface are different portions of the same extended physical surface in the physical environment. In some embodiments, the first surface and the second surface are different surfaces corresponding to different portions of the same physical objects or to different physical objects. In some embodiments, the virtual illumination moves further beyond the virtual surface corresponding to the second surface onto other virtual surfaces corresponding to other surfaces that are identified in the physical environment. Moving virtual illumination across a virtual surface corresponding to a first surface identified in the first portion of the physical environment provides improved visual feedback to the user (e.g., improved visual feedback regarding the first surface identified in the first portion of the physical environment). Providing improved feedback enhances the operability of the device, which, additionally, reduces power usage and improves battery life of the device by enabling the user to use the device more quickly and efficiently.

In some embodiments, the first visual effect or the second visual effect is displayed in accordance with a determination that the user's hand is touching the respective portion of the physical environment within a threshold time of initial display of the three-dimensional environment via the first display generation component (e.g., a threshold time of a transition from displaying a virtual environment to displaying the three-dimensional environment, a threshold time of turning on the first display generation component, a threshold time of the user putting the first display generation component on her head or in front of her eyes to view the physical environment through the first display generation component, etc.). For example, in some embodiments, the user's hand touching the respective portion of the physical environment will not trigger display of the first and/or second visual effect if the touching occurs after the threshold time has expired after the three-dimensional environment is initially displayed (e.g., a threshold time of a transition from displaying a virtual environment to displaying the three-dimensional environment, a threshold time of turning on the first display generation component, a threshold time of the user putting the first display generation component on her head or in front of her eyes to view the physical environment through the first display generation component, etc.).

Displaying the first visual effect or the second visual effect in accordance with a determination that the user's hand is touching the respective portion of the physical environment within a threshold time of initial display of the three-dimensional environment via the first display generation component provides additional control options without cluttering the user interface with additional displayed controls (e.g., additional displayed controls for enabling or disabling display of the first visual effect and/or the second visual effect). Providing additional control options without cluttering the user interface with additional displayed controls enhances the operability of the device, which, additionally, reduces power usage and improves battery life of the device by enabling the user to use the device more quickly and efficiently.

In some embodiments, the computer system detects the transition from displaying a virtual environment by the first display generation component to displaying the three-dimensional environment via the first display generation component, and in response to detecting the transition from displaying the virtual environment to displaying the three-dimensional environment, the computer system displays a third visual effect (e.g., shimmering visual effect, a growing overlay, a growing wire mesh, etc.) at a location in the three-dimensional environment that corresponds to a third portion of the physical environment that has been identified based on a scan of the third portion of the physical environment. In some embodiments, the scan of the third portion of the physical environment is a surface scan (e.g., detection of a plane, construction of a mesh, etc.) or construction of a three-dimensional model, etc., that has characteristics of the surface of one or more physical objects in the third portion of the physical environment. In some embodiments, the third visual effect has spatial characteristics (e.g., surface orientation, size, shape, etc.) that correspond to the spatial characteristics (e.g., surface orientation, size, shape, etc.) of the third portion of the physical environment. Displaying a third visual effect at a location in the three-dimensional environment that corresponds to a third position of the physical environment that has been identified based on a scan of the third portion of the physical environment, in response to detecting the transition from displaying the virtual environment to displaying the three-dimensional environment, displays the third visual effect when a set of conditions has been met without requiring further user input (e.g., further user input to touch the third portion of the physical environment). Performing an operation when a set of conditions has been met without requiring further user input enhances the operability of the device, which, additionally, reduces power usage and improves battery life of the device by enabling the user to use the device more quickly and efficiently.

In some embodiments, the computer system detects a movement that causes the first display generation component to be placed into a first preset spatial relationship with the user (e.g., placed in front of the user with the display side facing the user, placed on the user's head, etc.), and in response to detecting the movement that causes the first display generation component to be placed into the first preset spatial relationship with the user, the computer system displays, via the first display generation component, a fourth visual effect (e.g., shimmering visual effect, a growing overlay, a growing wire mesh, etc.) at a location in the three-dimensional environment (e.g., when displaying a pass-through view of the physical environment, a camera view of the physical environment, etc.) that corresponds to a fourth portion of the physical environment that has been identified based on a scan of the fourth portion of the physical environment. In some embodiments, the scan of the fourth portion of the physical environment is a surface scan (e.g., detection of a plane, construction of a mesh, etc.) or construction of a three-dimensional model, etc., that has characteristics of the surface of one or more physical objects in the fourth portion of the physical environment. In some embodiments, the fourth visual effect has spatial characteristics (e.g., surface orientation, size, shape, etc.) that correspond to the spatial characteristics (e.g., surface orientation, size, shape, etc.) of the fourth portion of the physical environment. Displaying a fourth visual effect at a location in the three-dimensional environment that corresponds to a fourth portion of the physical environment that has been identified based on a scan of the fourth portion of the physical environment, in response to detecting the movement that causes the first display generation component to be placed into the first preset spatial relationship with the user, displays the fourth visual effect when a set of conditions has been met without requiring further user input (e.g., further user input to touch the fourth portion of the physical environment). Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, and 11000) are also applicable in an analogous manner to method 10000 described above with respect to FIG. 10. For example, the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described above with reference to method 10000 optionally have one or more of the characteristics of the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described herein with reference to other methods described herein (e.g., methods 8000, 9000, and 11000). For brevity, these details are not repeated here.

Figure 11:
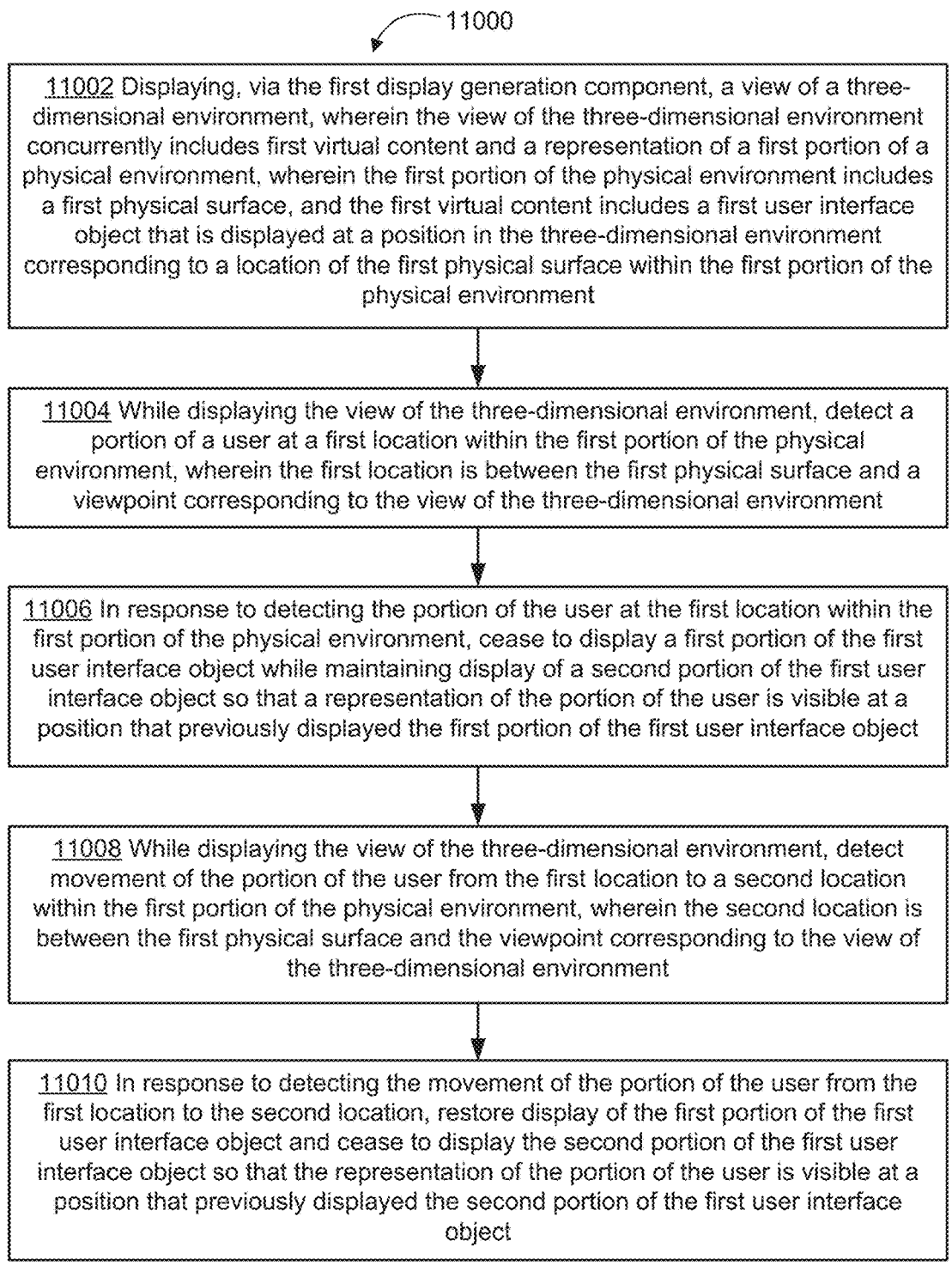
FIG. 11 is a flowchart of a method of displaying an interactive user interface object at a position in a three-dimensional environment that corresponds to a first portion of a physical environment, and selectively forgoing display of a respective sub-portion of the user interface object in accordance with a location of a portion of the user that moves in the space between the first portion of physical environment and a location that corresponds to a viewpoint of the currently displayed view of the three-dimensional environment, in accordance with some embodiments.

FIG. 11 is a flowchart of a method 11000 of displaying an interactive user interface object at a position in a three-dimensional environment that corresponds to a first portion of a physical environment, and selectively forgoing display of a respective sub-portion of the user interface object in accordance with a location of a portion of the user that moves in the space between the first portion of physical environment and a location that corresponds to a viewpoint of the currently displayed view of the three-dimensional environment, in accordance with some embodiments.

In some embodiments, the method 11000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In some embodiments, the method 11000 is performed at a computer system (e.g., computer system 101 in FIG. 1) that is in communication with a first display generation component (e.g., display generation component 120 in FIGS. 1, 3, and 4, display generation component 7100, etc.) (e.g., a heads-up display, an HMD, a display, a touchscreen, a projector, etc.) and one or more input devices (e.g., cameras, controllers, touch-sensitive surfaces, joysticks, buttons, gloves, watches, motion sensors, orientation sensors, etc.). In some embodiments, the first display generation component is a display component facing the user and provides a CGR experience to the user. In some embodiments, the computer system is an integrated device with one or more processors and memory enclosed in the same housing as the first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, etc.) that includes one or more processors and memory that is separate from one or more of the display generation components (e.g., a heads-up display, a touch-screen, a standalone display, etc.), the one or more output devices (e.g., earphones, external speakers, etc.) and the one or more input devices. In some embodiments, the display generation components and the one or more audio output devices are integrated and enclosed in the same housing.

In the method 11000, the computer system displays (11002), via the first display generation component, a view of a three-dimensional environment (e.g., a virtual reality environment, a three-dimensional augmented reality environment, etc.), wherein the view of the three-dimensional environment concurrently includes first virtual content (e.g., virtual reality content, virtual portion of augmented reality content, etc.) and a representation of a first portion of a physical environment (e.g., a portion of the physical environment that is within the user's estimated field of view without the HMD, a portion of the physical environment represented in a pass-through view without any virtual content, a portion of the physical environment that has a spatial relationship to the user in the physical environment that would have been visible to the user if the user's view were not obscured by the presence of the display generation component and/or by the virtual content presented by the display generation component, etc.), the first portion of the physical environment includes a first physical surface (e.g., a horizontal surface such as a surface of a table or countertop, a vertical surface such as a surface of a wall or window, a planar surface such as a surface of a ramp or a slide, a curved surface such as a surface of a user's lap or a surface of the user's palm, etc.), and the first virtual content includes a first user interface object (e.g., a user interface that includes one or more selectable and/or activatable user interface objects, a virtual keyboard, a virtual game board, a map, a control panel with one or more controls (e.g., media playback controls, home environment controls, etc.), etc.) that is displayed at a position in the three-dimensional environment corresponding to a location of the first physical surface within the first portion of the physical environment. In some embodiments, the first user interface object blocks the view of at least a portion of the first physical surface (e.g., in a case where the portion of the first physical surface would be visible to the user through a transparent or semi-transparent display if the first user interface object were not displayed at the position that corresponds to the location of the portion of the first physical surface, and/or if the display generation component were not blocking the user's view of the physical environment, etc.) or replaces display of at least a portion of the representation of the first physical surface (e.g., in a case where the portion of the first physical surface was part of a camera view presented by the display generation component prior to display of the first user interface object at the position that corresponds to the location of the portion of the first physical surface, etc.). While displaying the view of the three-dimensional environment (e.g., environment 7151 in FIGS. 7O-7Q, or another environment, etc.), the computer system detects (11004) a portion of a user (e.g., the user's hand 7202, other parts of the user's body, etc.) at a first location within the first portion of the physical environment, wherein the first location is between the first physical surface (e.g., the top surface of the physical object represented by representation 7014' in FIGS. 7O-7Q) and a viewpoint (e.g., the location of the user's face or eyes) corresponding to the view of the three-dimensional environment. In some embodiments, the spatial relationship between the user's eyes, the portion of the user that is at the first location, and the first physical surface is such that the portion of the user would block the user's view of a first portion of the first physical surface if the first display generation component and/or the first virtual content were not blocking the user's view. In response to detecting the portion of the user at the first location within the first portion of the physical environment, the computer system ceases (11006) to display a first portion of the first user interface object (e.g., portions of the key 7154, and other keys above the key 7154, etc. in FIG. 7P) while maintaining display of a second portion of the first user interface object (e.g., other keys in the virtual keyboard 7152 in FIG. 7P) so that a representation of the portion of the user (e.g., representation 7202' of the user's hand 7202) is visible at a position that previously displayed the first portion of the first user interface object. In some embodiments, the view through the display generation component shows that the representation of the portion of the user has blocked or replaced display of the first portion of the first user interface object while the second portion of the first user interface object is not blocked or replaced by the presence of the representation of the portion of the user. While displaying the view of the three-dimensional environment, the computer system detects (11008) movement of the portion of the user (e.g., the user's hand, other parts of the user's body, etc.) from the first location to a second location within the first portion of the physical environment (e.g., as shown in FIG. 7Q following FIG. 7P), wherein the second location is between the first physical surface and the viewpoint corresponding to the view of the three-dimensional environment. In some embodiments, the spatial relationship between the user's eyes, the portion of the user that is at the second location, and the first physical surface is such that the portion of the user would block the user's view of a second portion of the first physical surface if the display generation component and/or the first virtual content were not blocking the user's view. In response to detecting the movement of the portion of the user from the first location to the second location (e.g., a location that corresponds to the second portion of the first user interface object), the computer system restores (11010) display of the first portion of the first user interface object and the computer system ceases to display the second portion of the first user interface object so that the representation of the portion of the user is visible at a position that previously displayed the second portion of the first user interface object (e.g., portions of the key 7154 and other keys above the key 7154 are restored in FIG. 7Q) while key 7160 in the virtual keyboard 7152 ceases to be displayed in FIG. 7Q). In some embodiments, the view through the display generation component shows that the representation of the portion of the user has blocked or replaced display of the second portion of the first user interface object while the first portion of the first user interface object is no longer blocked or replaced by the presence of the representation of the portion of the user.

In some embodiments, while detecting the portion of the user (e.g., the user's hand, other parts of the user's body, etc.) at the first location within the first portion of the physical environment and maintaining display of the second portion of the first user interface object without displaying the first portion of the first user interface object (e.g., the view through the display generation component shows that the representation of the portion of the user has blocked or replaced display of the first portion of the first user interface object while the second portion of the first user interface object is not blocked or replaced by the presence of the representation of the portion of the user), the computer system detects a first input by the portion of the user that corresponds to a request to select the first user interface object (e.g., first input meets preset selection criteria corresponding to the first user interface object, criteria for detecting an in-air tap gesture directed to the first user interface object, criteria for detecting a tap gesture or swipe gesture on the first portion of the first physical surface, etc.). In response to detecting the first input by the portion of the user, the computer system performs a first operation corresponding to the first user interface object (e.g., activating the first user interface object to enter a textual symbol, activating a device function, etc.). While detecting the portion of the user (e.g., the user's hand, other parts of the user's body, etc.) at the second location within the first portion of the physical environment and maintaining display of the first portion of the first user interface object without displaying the second portion of the first user interface object (e.g., the view through the display generation component shows that the representation of the portion of the user has blocked or replaced display of the second portion of the first user interface object while the first portion of the first user interface object is not blocked or replaced by the presence of the representation of the portion of the user), the computer system detects a second input by the portion of the user that corresponds to the request to select the first user interface object (e.g., the second input meets the preset selection criteria corresponding to the first user interface object, the criteria for detecting an in-air tap gesture directed to the first user interface object, the criteria for detecting a tap gesture or swipe gesture on the second portion of the first physical surface, etc.). In response to detecting the second input by the portion of the user, the computer system performs a second operation (e.g., the same operation as the first operation, a different operation from the first operation, etc.) corresponding to the first user interface object. For example, in some embodiments, the first user interface object is a unitary control (e.g., a first toggle control, a first check box, a first slider, a play/pause button, a first menu item, a first selectable option, etc.), and the presence of the user's finger at a respective location in the physical environment (e.g., on a respective portion of the first physical surface) causes the computer system to cease display of a respective portion of the control that was displayed overlaying, replacing display of, or blocking the view of the respective portion of the first physical surface while maintaining display of other portion(s) of the control that was displayed overlaying, replacing display of, or blocking the view of other portion(s) of the first physical surface.

In some embodiments, irrespective of which portion of the first user interface object is obscured by the presence of the portion of the user when the input that meets the criteria for selecting the first user interface object is provided by the portion of the user, the computer system performs the operation that corresponds to selection of the first user interface object. In some embodiments, the first user interface object has different states, and selection of the first user interface object causes different operations to be performed depending on the current state of the first user interface object at the time when the selection occurred. In some embodiments, the first user interface object corresponds to a single operation for a respective type of input, irrespective of which portion of the first user interface was obscured by the portion of the user that performed the respective type of input. For example, in some embodiments, tapping on a first portion of the first physical surface that corresponds to a first portion of a selectable option displayed by the display generation component and tapping on a second portion of the first physical surface that corresponds to a second portion of the same selectable option displayed by the display generation component cause the same operation to be performed. In some embodiments, tapping on a first portion of the first physical surface that corresponds to a first portion of a play/pause button (e.g., first portion of the play/pause button is obscured while other portions of the play/pause button remain displayed) causes currently selected media to start playing if the current state of the play/pause button is in the "paused" state at the time that the first portion of the first physical surface is tapped; and tapping on a second portion of the first physical surface that corresponds to a second portion of the play/pause button (e.g., second portion of the play/pause button is obscured while other portions of the play/pause button remain displayed) causes currently selected media to stop playing if the current state of the play/pause button is in the "playing" state at the time that the second portion of the first physical surface is tapped. Performing a first operation corresponding to the first user interface object while detecting the portion of the user at the first location within the first portion of the physical environment and while maintaining display of the second portion of the first user interface object without displaying the first portion of the first user interface object, and performing a second operation corresponding to the first user interface object while detecting the portion of the user at the second location within the first portion of the physical environment and while maintaining display of the first portion of the first user interface object without displaying the second portion of the first user interface object, provides improved visual feedback to the user (e.g., improved visual feedback regarding which portions of the first user interface object are available for selection, and thus which of the first or second operations are available). Providing improved feedback enhances the operability of the device, which, additionally, reduces power usage and improves battery life of the device by enabling the user to use the device more quickly and efficiently.

In some embodiments, while detecting the portion of the user (e.g., the user's hand, other parts of the user's body, etc.) at the first location within the first portion of the physical environment and maintaining display of the second portion of the first user interface object without displaying the first portion of the first user interface object (e.g., the view through the display generation component shows that the representation of the portion of the user has blocked or replaced display of the first portion of the first user interface object while the second portion of the first user interface object is not blocked or replaced by the presence of the representation of the portion of the user), the computer system detects a first input by the portion of the user that corresponds to a request to select the first portion of the first user interface object. For example, the first input corresponds to the request to select the first portion of the first user interface object because the first input meets preset selection criteria corresponding to the first portion of the first user interface object, criteria for detecting an in-air tap gesture directed to the first portion of the first user interface object, or criteria for detecting a tap gesture or swipe gesture on the first portion of the first physical surface, etc. In response to detecting the first input by the portion of the user, the computer system performs a first operation corresponding to the first portion of the first user interface object.

While detecting the portion of the user (e.g., the user's hand, other parts of the user's body, etc.) at the second location within the first portion of the physical environment and maintaining display of the first portion of the first user interface object without displaying the second portion of the first user interface object (e.g., the view through the display generation component shows that the representation of the portion of the user has blocked or replaced display of the second portion of the first user interface object while the first portion of the first user interface object is not blocked or replaced by the presence of the representation of the portion of the user), the computer system detects a second input by the portion of the user that corresponds to the request to select the second portion of the first user interface object. For example, the second input corresponds to the request to select the second portion of the first user interface object because the second input meets the preset selection criteria corresponding to the second portion of the first user interface object, the criteria for detecting an in-air tap gesture directed to the second portion of the first user interface object, or the criteria for detecting a tap gesture or swipe gesture on the second portion of the first physical surface, etc. In response to detecting the second input by the portion of the user, the computer system performs a second operation corresponding to the second portion of the first user interface object, wherein the second operation is different from the first operation. For example, in some embodiments, the first user interface object includes different sub-portions that corresponds to different controls (e.g., different keys, different selectable options, different user interface objects corresponding to different control functions or control types, etc.), and the presence of the user's finger at a respective location in the physical environment (e.g., on a respective portion of the first physical surface) causes the computer system to cease display of at least a portion of a respective one of the different controls that was displayed overlaying, replacing display of, or blocking the view of the respective portion of the first physical surface while maintaining display of other controls that were displayed overlaying, replacing display of, or blocking the view of other portion(s) of the first physical surface.

In some embodiments, depending on which sub-portion of the first user interface object is obscured by the presence of the portion of the user when the input that meets the criteria for selecting the sub-portion of the first user interface object is provided by the portion of the user, the computer system performs the operation that corresponds to respective sub-portion of the first user interface object that is selected. For example, in some embodiments, tapping on a first portion of the first physical surface that corresponds to a first sub-portion of a virtual keyboard displayed by the display generation component and tapping on a second portion of the first physical surface that corresponds to a second sub-portion of the virtual keyboard cause different keys of the virtual keyboard to be activated. In some embodiments, tapping on a first portion of the first physical surface that corresponds to a play/pause button (e.g., the play/pause button is obscured while other playback controls remain displayed) causes currently selected media to start playing if the current state of the play/pause button is in the "paused" state at the time that the first portion of the first physical surface is tapped; and tapping on a second portion of the first physical surface that corresponds to a fast-forward button (e.g., fast-forward button is obscured while other playback controls remain displayed) causes currently selected media to fast-forward.

Performing a first operation corresponding to the first user interface object while detecting the portion of the user at the first location within the first portion of the physical environment and while maintaining display of the second portion of the first user interface object without displaying the first portion of the first user interface object, and performing a second operation, different from the first operation, corresponding to the first user interface object while detecting the portion of the user at the second location within the first portion of the physical environment and while maintaining display of the first portion of the first user interface object without displaying the second portion of the first user interface object, provides improved visual feedback to the user (e.g., improved visual feedback regarding which portions of the first user interface object are available for selection, and thus which of the first or second operations are available). Providing improved feedback enhances the operability of the device, which, additionally, reduces power usage and improves battery life of the device by enabling the user to use the device more quickly and efficiently.

In some embodiments, the first virtual content includes a second user interface object (e.g., a user interface that includes one or more selectable and/or activatable user interface objects, a virtual keyboard, a virtual game board, a map, a control panel with one or more controls (e.g., media playback controls, home environment controls, etc.), etc.) that is displayed at a position in the three-dimensional environment corresponding to the location of the first physical surface within the first portion of the physical environment (e.g., the second user interface object blocks the view of at least a portion of the first physical surface or replaces display of at least a portion of the representation of the first physical surface) (e.g., the second user interface object is displayed adjacent to the first user interface object, separated from the first user interface object by another user interface object, etc., in the view of the three-dimensional environment). In response to detecting the portion of the user at the first location within the first portion of the physical environment, the computer system ceases to display a first portion of the second user interface object while maintaining display of a second portion of the second user interface object so that the representation of the portion of the user is visible at a position that previously displayed the first portion of the second user interface object. In some embodiments, the view through the display generation component shows that the representation of the portion of the user has blocked or replaced display of the first portion of the first user interface object and the first portion of the second user interface object while the second portion of the first user interface object and the second portion of the second user interface object are not blocked or replaced by the presence of the representation of the portion of the user. In some embodiments, the representation of the user's hand occupies areas that previously displayed portions of multiple user interface objects (e.g., a portion of a first key and a portion of a second key on a virtual keyboard that is displayed at a position corresponding to a physical surface that is touched or hovered over by the user's hand).

Ceasing to display a first portion of the second user interface object while maintaining display of a second portion of the second user interface object so that the representation of the portion of the user is visible at a position that previously displayed the first portion of the second user interface object, in response to detecting the portion of the user at the first location within the first portion of the physical environment, reduces the number of inputs needed to display the appropriate portions of the first and second user interface objects (e.g., the user does not need to perform separate inputs to cease or maintain display of portions of the first user interface object and separate inputs to cease or maintain display portions of the second user interface object). Reducing the number of inputs needed to perform an operation enhances the operability of the device, which, additionally, reduces power usage and improves battery life of the device by enabling the user to use the device more quickly and efficiently.

In some embodiments, while detecting the portion of the user (e.g., the user's hand, other parts of the user's body, etc.) at the first location within the first portion of the physical environment and maintaining display of the second portions of the first user interface object and the second user interface object without displaying the first portions of the first user interface object and the second user interface object (e.g., the view through the display generation component shows that the representation of the portion of the user has blocked or replaced display of the first portions of the first and second user interface objects while the second portions of the first and second user interface objects are not blocked or replaced by the presence of the representation of the portion of the user), the computer system detects a third input by the portion of the user that corresponds to a request to select the first user interface object (e.g., first input meets preset selection criteria corresponding to the first user interface object, criteria for detecting an in-air tap gesture directed to the first user interface object, criteria for detecting a tap gesture or swipe gesture on the first portion of the first physical surface, etc.) (e.g., the first input does not correspond to a request for selecting the second user interface object). In response to detecting the third input by the portion of the user, the computer system performs a third operation corresponding to the first user interface object, without performing a fourth operation corresponding to the second user interface object. In some embodiments, not all user interface objects obscured by the portion of the user are selected by the input, and only the user interface object at the position that corresponds to the location of a preset portion (e.g., tip portion, top portion, index finger, etc.) of the portion of the user (e.g., user's hand, user's finger, etc.) is selected by the input performed by the portion of the user.

Performing a third operation corresponding to the first user interface object, without performing a fourth operation corresponding to the second user interface object, in response to detecting the third input by the portion of the user that corresponds to a request to select the first user interface object, provides additional control options without cluttering the user interface with additional displayed controls (e.g., additional displayed controls for selecting the first or second user interface object, additional displayed controls to perform the third or fourth operation, etc.). Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the movement of the portion of the user from the first location to the second location (e.g., a location that corresponds to the second portion of the first user interface object), the computer system restores display of the first portion of the second user interface object and ceases to display the second portion of the second user interface object so that the representation of the portion of the user is visible at a position that previously displayed the second portion of the second user interface object. In some embodiments, the view through the display generation component shows that the representation of the portion of the user has blocked or replaced display of the second portions of the first and second user interface objects while the first portions of the first and second user interface objects are no longer blocked or replaced by the presence of the representation of the portion of the user.

Restoring display of the first portion of the second user interface object and ceasing to display the second portion of the second user interface object so that the representation of the portion of the user is visible at a position that previously displayed the second portion of the second user interface object, in response to detecting the movement of the portion of the user from the first location to the second location, displays the appropriate portions of the second user interface object when a set of conditions has been met without requiring further user input (e.g., further user input to restore display of the first portion of the second user interface object if the first portion of the second user interface is no longer obscured after movement of the portion of the user, further user input to cease display of the second portion of the second user interface object if the second portion of the user interface object becomes obscured by the movement of the portion of the user, etc.). Performing an operation when a set of conditions has been met without requiring further user input enhances the operability of the device, which, additionally, reduces power usage and improves battery life of the device by enabling the user to use the device more quickly and efficiently.

In some embodiments, in response to detecting the movement of the portion of the user from the first location to the second location (e.g., a location that corresponds to the second portion of the first user interface object), the computer system maintains display of the second portion of the second user interface object without restoring display of the first portion of the second user interface object so that the representation of the portion of the user is visible at the position that previously displayed the first portion of the second user interface object. In some embodiments, the view through the display generation component shows that the representation of the portion of the user has blocked or replaced display of the second portion of the first user interface object and the first portion of the second user interface object while the first portion of the first user interface object and the second portion of the second user interface objects are not blocked or replaced by the presence of the representation of the portion of the user. For example, in some embodiments, movement of the portion of the user may cease to block a first portion of a first virtual control that was previously blocked by the portion of the user while continue to block the same portion of a second virtual control that was previously blocked by the portion of the user. Maintaining display of the second portion of the second user interface object without restoring display of the first portion of the second user interface object so that the representation of the portion of the user is visible at the position that previously displayed the first portion of the second user interface object, in response to detecting the movement of the portion of the user from the first location to the second location, displays the appropriate portions of the second user interface object when a set of conditions has been met without requiring further user input (e.g., further user input to maintain display of the second portion of the second user interface object if the second portion of the second user interface object is not obscured by the portion of the user at the first location or second location (or during movement of the portion of the user from the first location to the second location), further user input to prevent restoration of display of the first portion of the second user interface object if the first portion of the second user interface object remains obscured despite the movement of the portion of the user from the first location to the second location, etc.). Performing an operation when a set of conditions has been met without requiring further user input enhances the operability of the device, which, additionally, reduces power usage and improves battery life of the device by enabling the user to use the device more quickly and efficiently.

In some embodiments, in response to detecting the portion of the user at the first location within the first portion of the physical environment, the computer system displays a simulated shadow of the portion of the user at a third position in the view of the three-dimensional environment that is offset (e.g., offset by a distance and/or in a direction that is based on a location of a virtual light source) from the position that previously displayed the first portion of the first user interface object (e.g., the view through the first display generation component shows that the representation of the portion of the user has blocked or replaced display of the first portion of the first user interface object while the second portion of the first user interface object is not blocked or replaced by the presence of the representation of the portion of the user, and while a third portion of the first user interface object (e.g., including the second portion of the first user interface object or a part thereof, and/or a third portion of the first user interface object, etc.) is darkened and/or blurred as a result of a simulated shadow of the portion of the user). In response to detecting the movement of the portion of the user from the first location to the second location (e.g., a location that corresponds to the second portion of the first user interface object), the computer system displays the simulated shadow of the portion of the user at a fourth position in the view of the three-dimensional environment that is offset (e.g., offset by a distance and/or in a direction that is based on the location of the virtual light source) from the position that previously displayed the second portion of the first user interface object.

In some embodiments, the view through the display generation component shows that the representation of the portion of the user has blocked or replaced display of the second portion of the first user interface object while the first portion of the first user interface object is not blocked or replaced by the presence of the representation of the portion of the user, and while a fourth portion of the first user interface object (e.g., including the first portion of the first user interface object or a part thereof, and/or a fifth portion of the first user interface object, etc.) is darkened as a result of the simulated shadow of the portion of the user. For example, in some embodiments, the representation of the portion of the user that visually obscures the portion(s) of the user interface objects that are displayed overlaying, replacing display of, and/or blocking the representation of the first physical surface is displayed with a simulated shadow that moves in the view of the three-dimensional environment in accordance with the movement of the portion of the user in the physical environment, and the simulated shadow changes the appearance of respective portions (e.g., darken, making less clear, dimming, etc.) of the user interface objects that are offset from the portions of the user interface objects that are visually obscured by the representation of the portion of the user. In some embodiments, the simulated shadow has different appearance properties depending on the location of the user's hand relative to the physical environment, e.g., darker, less blurry, and/or more well defined, etc., when the hand is closer to a location that corresponds to the position of the first user interface object, and lighter, blurrier, and/or less well defined, etc., when the hand is further away from the location that corresponds to the position of the first user interface object.

Displaying a simulated shadow of the portion of the user at a third position in the view of the three-dimensional environment that is offset from the position that previously displayed the first portion of the first user interface object in response to detecting the portion of the user at the first location within the first portion of the physical environment, and displaying the simulated shadow of the portion of the user at a fourth position in the view of the three-dimensional environment that is offset from the position that previously displayed the second portion of the first user interface object in response to detecting the movement of the portion of the user from the first location to the second location, provides improved visual feedback to the user (e.g., uses the simulated shadow to provide improved visual feedback regarding the detected location of the portion of the user). Providing improved feedback enhances the operability of the device, which, additionally, reduces power usage and improves battery life of the device by enabling the user to use the device more quickly and efficiently.

In some embodiments, the first user interface object is a virtual keyboard that includes at least a first key (e.g., a key for entering a first textual symbol, a key for activating a first device or application function, etc.) and a second key (e.g., a key for entering a second textual symbol, a key for activating a second device or application function, etc.) different from the first key, and the first portion of the first user interface object corresponds to the first key (e.g., the first portion of the first user interface object displays the first key and not the second key) and the second portion of the first user interface object corresponds to the second key (e.g., the second portion of the first user interface object displays the second key and not the first key). In some embodiments, selection of the first portion of the first user interface object while the representation of the user's finger visually obscures the first portion of the first user interface object (and optionally a third portion of the first user interface object that corresponds to a third key) causes a character or function associated with the first key to be selected (e.g., entered into a text input region, performed, etc.). In some embodiments, selection of the second portion of the first user interface object while the representation of the user's finger visually obscures the second portion of the first user interface object (and optionally the third portion of the first user interface object that corresponds to the third key) causes the character or function associated with the second key to be selected (e.g., entered into a text input region, performed, etc.).

Ceasing to display a first portion of the first user interface object while maintaining display of a second portion of the first user interface object so that a representation of the portion of the user is visible at a position that previously displayed the first portion of the first user interface object, in response to detecting the portion of the user at the first location within the first portion of the physical environment, and restoring display of the first portion of the first user interface object and ceasing to display the second portion of the first user interface object so that the representation of the portion of the user is visible at a position that previously displayed the second portion of the first user interface object, in response to detecting the movement of the portion of the user from the first location to the second location, wherein the first user interface object is a virtual keyboard that includes at least a first key and a second key different from the first key, and the first portion of the first user interface object corresponds to the first key and the second portion of the first user interface object corresponds to the second key, displays the appropriate keys of the virtual keyboard when a set of conditions has been met without requiring further user input (e.g., further user input to display, restore display of, or cease to display, specific keys of the virtual keyboard as the portion of the user moves). Performing an operation when a set of conditions has been met without requiring further user input enhances the operability of the device, which, additionally, reduces power usage and improves battery life of the device by enabling the user to use the device more quickly and efficiently.

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, and 10000) are also applicable in an analogous manner to method 11000 described above with respect to FIG. 11. For example, the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described above with reference to method 11000 optionally have one or more of the characteristics of the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described herein with reference to other methods described herein (e.g., methods 8000, 9000, and 10000). For brevity, these details are not repeated here.

The operations described above with reference to FIGS. 8, 9, 10, and 11 are, optionally, implemented by components depicted in FIGS. 1-6. In some embodiments, aspects/operations of methods 8000, 9000, 10000, and 11000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
 at a computer system that is in communication with a display generation component:
  displaying, via the display generation component, a view of a computer-generated environment;
  while displaying the computer-generated environment and while the computer-generated environment does not include a visual representation of a first portion and a second portion of a first physical object present in a physical environment in which a user is located, detecting first movement of the first physical object in the physical environment;
  in response to detecting the first movement of the first physical object in the physical environment:
   in accordance with a determination that the user is within a threshold distance of the first portion of the first physical object and outside the threshold distance of the second portion of the first physical object and that the first physical object meets preset criteria, the preset criteria including a requirement related to a preset characteristic of the first physical object other than a distance of the first physical object from the user, changing an appearance of a portion of virtual content displayed at a position corresponding to a current location of the first portion of the first physical object, without changing an appearance of a portion of the virtual content displayed at a position corresponding to the second portion of the first physical object, wherein the first portion of the first physical object and the second portion of the physical object are both part of an extent of the first physical object that is potentially visible to the user based on a field of view of the user for the computer-generated environment; and in accordance with a determination that the user is within the threshold distance of the first physical object present in the physical environment surrounding the user and that the first physical object does not meet the preset criteria, forgoing changing an appearance of a portion of virtual content displayed at a position corresponding to a current location of the first portion of the first physical object.

2. The method of claim 1, wherein the first portion of the first physical object and the second portion of the first physical object are continuous portions of the first physical object.

3. The method of claim 1, wherein the portion of the virtual content displayed at the position corresponding to the first portion of the first physical object and the portion of the virtual content displayed at the position corresponding to the second portion of the first physical object include respective portions of the same virtual object.

4. The method of claim 1, wherein changing the appearance of the portion of virtual content displayed at the position corresponding to the current location of the first portion of the first physical object, without changing the appearance of the portion of the virtual content displayed at the position corresponding to the second portion of the first physical object includes:

while maintaining display of the virtual content, applying a first visual effect to the portion of virtual content displayed at the position corresponding to the current location of the first portion of the first physical object, without applying the first visual effect to the portion of the virtual content displayed at the position corresponding to the second portion of the first physical object.

5. The method of claim 1, wherein the preset characteristic of the first physical object includes a first characteristic that distinguishes between a person and non-person physical objects, and determining that the first physical object meets the preset criteria includes detecting presence of the first characteristic on the first physical object.

6. The method of claim 1, wherein the preset characteristic of the first physical object includes a second characteristic that is indicative of human speech coming from the first physical object as the first physical object is moving toward the user, and determining that the first physical object meets the preset criteria includes detecting the second characteristic at the location of the first physical object.

7. The method of claim 1, wherein the preset characteristic of the first physical object includes a third characteristic that distinguishes an animal from a person and non-person physical objects, and determining that the first physical object meets the preset criteria includes detecting presence of the third characteristic on the first physical object.

8. The method of claim 1, wherein the preset characteristic of the first physical object includes a fourth characteristic that is based on a movement speed of the first physical object, and determining that the first physical object meets the preset criteria includes detecting a characteristic value of the fourth characteristic of the first physical object exceeds a preset threshold value.

9. The method of claim 1, wherein the preset characteristic of the first physical object includes a fifth characteristic that is indicative of occurrence of an event that requires the user's immediate attention, and determining that the first physical object meets the preset criteria includes detecting presence of the fifth characteristic on the first physical object.

10. The method of claim 1, wherein the preset characteristic of the first physical object includes a sixth characteristic that is indicative of presence of an identifier object on the first physical object, and determining that the first physical object meets the preset criteria includes detecting presence of the sixth characteristic at a location corresponding to the first physical object.

11. The method of claim 1, wherein the preset characteristic of the first physical object includes a seventh characteristic that is based on a movement pattern of the first physical object, and determining that the first physical object meets the preset criteria includes detecting the seventh characteristic based on the movement pattern of the first physical object meets preset criteria.

12. The method of claim 1, wherein the preset characteristic of the first physical object includes an eighth characteristic that is based on a match between a recognized identity of the first physical object and a first preset identity, and determining that the first physical object meets the preset criteria includes detecting the eighth characteristic meeting preset criteria.

13. The method of claim 1, wherein the computer-generated environment includes a virtual environment without concurrently including a representation of a physical environment surrounding the user.

14. The method of claim 1, wherein the computer-generated environment includes an augmented reality environment that includes a representation of the physical environment concurrently displayed with the virtual content, and wherein the change in appearance in the virtual content is displayed concurrently with a portion of the representation of the physical environment that is displayed via the display generation component in regions adjacent to the virtual content.

15. The method of claim 1, including:

after changing the appearance of the portion of virtual content displayed at the position corresponding to the current location of the first portion of the first physical object without changing the appearance of the portion of the virtual content displayed at the position corresponding to the second portion of the first physical object, detecting additional movement of the first physical object in the physical environment; and in response to detecting the additional movement of the first physical object in the physical environment, changing the appearance of another portion of the virtual content displayed at a position corresponding to the current location of the second portion of the first physical object.

16. A computer system, comprising:
a display generation component;
one or more input devices;
one or more processors; and memory storing one or more programs, wherein the one or more programs are configured to be executed by the one or more processors, the one or more programs including instructions for:

displaying, via the display generation component, a view of a computer-generated environment;

while displaying the computer-generated environment and while the computer-generated environment does not include a visual representation of a first portion and a second portion of a first physical object present in a physical environment in which a user is located, detecting first movement of the first physical object in the physical environment;

in response to detecting the first movement of the first physical object in the physical environment:

in accordance with a determination that the user is within a threshold distance of the first portion of the first physical object and outside the threshold distance of the second portion of the first physical object, and that the first physical object meets preset criteria, the preset criteria including a requirement related to a preset characteristic of the first physical object other than a distance of the first physical object from the user, changing an appearance of a portion of virtual content displayed at a position corresponding to a current location of the first portion of the first physical object, without changing an appearance of a portion of the virtual content displayed at a position corresponding to the second portion of the first physical object, wherein the first portion of the first physical object and the second portion of the physical object are both part of an extent of the first physical object that is potentially visible to the user based on a field of view of the user for the computer-generated environment; and in accordance with a determination that the user is within the threshold distance of the first physical object present in the physical environment surrounding the user and that the first physical object does not meet the preset criteria, forgoing changing an appearance of a portion of virtual content displayed at a position corresponding to a current location of the first portion of the first physical object.

17. The computer system of claim 16, wherein the first portion of the first physical object and the second portion of the first physical object are continuous portions of the first physical object.

18. The computer system of claim 16, wherein the portion of the virtual content displayed at the position corresponding to the first portion of the first physical object and the portion of the virtual content displayed at the position corresponding to the second portion of the first physical object include respective portions of the same virtual object.

19. The computer system of claim 16, wherein changing the appearance of the portion of virtual content displayed at the position corresponding to the current location of the first portion of the first physical object, without changing the appearance of the portion of the virtual content displayed at the position corresponding to the second portion of the first physical object includes:

while maintaining display of the virtual content, applying a first visual effect to the portion of virtual content displayed at the position corresponding to the current location of the first portion of the first physical object, without applying the first visual effect to the portion of the virtual content displayed at the position corresponding to the second portion of the first physical object.

20. The computer system of claim 16, wherein the preset characteristic of the first physical object includes a first characteristic that distinguishes between a person and non-person physical objects, and determining that the first physical object meets the preset criteria includes detecting presence of the first characteristic on the first physical object.

21. The computer system of claim 16, wherein the preset characteristic of the first physical object includes a second characteristic that is indicative of human speech coming from the first physical object as the first physical object is moving toward the user, and determining that the first physical object meets the preset criteria includes detecting the second characteristic at the location of the first physical object.

22. The computer system of claim 16, wherein the preset characteristic of the first physical object includes a third characteristic that distinguishes an animal from a person and non-person physical objects, and determining that the first physical object meets the preset criteria includes detecting presence of the third characteristic on the first physical object.

23. The computer system of claim 16, wherein the preset characteristic of the first physical object includes a fourth characteristic that is based on a movement speed of the first physical object, and determining that the first physical object meets the preset criteria includes detecting a characteristic value of the fourth characteristic of the first physical object exceeds a preset threshold value.

24. The computer system of claim 16, wherein the preset characteristic of the first physical object includes a fifth characteristic that is indicative of occurrence of an event that requires the user's immediate attention, and determining that the first physical object meets the preset criteria includes detecting presence of the fifth characteristic on the first physical object.

25. The computer system of claim 16, wherein the preset characteristic of the first physical object includes a sixth characteristic that is indicative of presence of an identifier object on the first physical object, and determining that the first physical object meets the preset criteria includes detecting presence of the sixth characteristic at a location corresponding to the first physical object.

26. The computer system of claim 16, wherein the preset characteristic of the first physical object includes a seventh characteristic that is based on a movement pattern of the first physical object, and determining that the first physical object meets the preset criteria includes detecting the seventh characteristic based on the movement pattern of the first physical object meets preset criteria.

27. The computer system of claim 16, wherein the preset characteristic of the first physical object includes an eighth characteristic that is based on a match between a recognized identity of the first physical object and a first preset identity, and determining that the first physical object meets the preset criteria includes detecting the eighth characteristic meeting preset criteria.

28. The computer system of claim 16, wherein the computer-generated environment includes a virtual environment without concurrently including a representation of a physical environment surrounding the user.

29. The computer system of claim 16, wherein the computer-generated environment includes an augmented reality environment that includes a representation of the physical environment concurrently displayed with the virtual content, and wherein the change in appearance in the virtual content is displayed concurrently with a portion of the representation of the physical environment that is displayed via the display generation component in regions adjacent to the virtual content.

30. The computer system of claim 16, wherein the one or more programs include instructions for:
after changing the appearance of the portion of virtual content displayed at the position corresponding to the current location of the first portion of the first physical object without changing the appearance of the portion of the virtual content displayed at the position corresponding to the second portion of the first physical object, detecting additional movement of the first physical object in the physical environment; and
in response to detecting the additional movement of the first physical object in the physical environment, changing the appearance of another portion of the virtual content displayed at a position corresponding to the current location of the second portion of the first physical object.

31. A non-transitory computer readable storage medium storing one or more programs, the one or more programs comprising instructions that, when executed by a computer system that includes a display generation component, and one or more input devices, cause the computer system to:
display, via the display generation component, a view of a computer-generated environment;
while displaying the computer-generated environment and while the computer-generated environment does not include a visual representation of a first portion and a second portion of a first physical object present in a physical environment in which a user is located, detect first movement of the first physical object in the physical environment;
in response to detecting the first movement of the first physical object in the physical environment:
in accordance with a determination that the user is within a threshold distance of the first portion of the first physical object and outside the threshold distance of the second portion of the first physical object, and that the first physical object meets preset criteria, the preset criteria including a requirement related to a preset characteristic of the first physical object other than a distance of the first physical object from the user, change an appearance of a portion of virtual content displayed at a position corresponding to a current location of the first portion of the first physical object, without changing an appearance of a portion of the virtual content displayed at a position corresponding to the second portion of the first physical object, wherein the first portion of the first physical object and the second portion of the physical object are both part of an extent of the first physical object that is potentially visible to the user based on a field of view of the user for the computer-generated environment; and
in accordance with a determination that the user is within the threshold distance of the first physical object present in the physical environment surrounding the user and that the first physical object does not meet the preset criteria, forgo changing an appearance of a portion of virtual content displayed at a position corresponding to a current location of the first portion of the first physical object.

32. The non-transitory computer-readable storage medium of claim 31, wherein the first portion of the first physical object and the second portion of the first physical object are continuous portions of the first physical object.

33. The non-transitory computer-readable storage medium of claim 31, wherein the portion of the virtual content displayed at the position corresponding to the first portion of the first physical object and the portion of the virtual content displayed at the position corresponding to the second portion of the first physical object include respective portions of the same virtual object.

34. The non-transitory computer-readable storage medium of claim 31, wherein changing the appearance of the portion of virtual content displayed at the position corresponding to the current location of the first portion of the first physical object, without changing the appearance of the portion of the virtual content displayed at the position corresponding to the second portion of the first physical object includes:
while maintaining display of the virtual content, applying a first visual effect to the portion of virtual content displayed at the position corresponding to the current location of the first portion of the first physical object, without applying the first visual effect to the portion of the virtual content displayed at the position corresponding to the second portion of the first physical object.

35. The non-transitory computer-readable storage medium of claim 31, wherein the preset characteristic of the first physical object includes a first characteristic that distinguishes between a person and non-person physical objects, and determining that the first physical object meets the preset criteria includes detecting presence of the first characteristic on the first physical object.

36. The non-transitory computer-readable storage medium of claim 31, wherein the preset characteristic of the first physical object includes a second characteristic that is indicative of human speech coming from the first physical object as the first physical object is moving toward the user, and determining that the first physical object meets the preset criteria includes detecting the second characteristic at the location of the first physical object.

37. The non-transitory computer-readable storage medium of claim 31, wherein the preset characteristic of the first physical object includes a third characteristic that distinguishes an animal from a person and non-person physical objects, and determining that the first physical object meets the preset criteria includes detecting presence of the third characteristic on the first physical object.

38. The non-transitory computer-readable storage medium of claim 31, wherein the preset characteristic of the first physical object includes a fourth characteristic that is based on a movement speed of the first physical object, and determining that the first physical object meets the preset criteria includes detecting a characteristic value of the fourth characteristic of the first physical object exceeds a preset threshold value.

39. The non-transitory computer-readable storage medium of claim 31, wherein the preset characteristic of the first physical object includes a fifth characteristic that is indicative of occurrence of an event that requires the user's immediate attention, and determining that the first physical object meets the preset criteria includes detecting presence of the fifth characteristic on the first physical object.

40. The non-transitory computer-readable storage medium of claim 31, wherein the preset characteristic of the first physical object includes a sixth characteristic that is indicative of presence of an identifier object on the first physical object, and determining that the first physical object meets the preset criteria includes detecting presence of the sixth characteristic at a location corresponding to the first physical object.

41. The non-transitory computer-readable storage medium of claim 31, wherein the preset characteristic of the first physical object includes a seventh characteristic that is based on a movement pattern of the first physical object, and determining that the first physical object meets the preset criteria includes detecting the seventh characteristic based on the movement pattern of the first physical object meets preset criteria.

42. The non-transitory computer-readable storage medium of claim 31, wherein the preset characteristic of the first physical object includes an eighth characteristic that is based on a match between a recognized identity of the first physical object and a first preset identity, and determining that the first physical object meets the preset criteria includes detecting the eighth characteristic meeting preset criteria.

43. The non-transitory computer-readable storage medium of claim 31, wherein the computer-generated environment includes a virtual environment without concurrently including a representation of a physical environment surrounding the user.

44. The non-transitory computer-readable storage medium of claim 31, wherein the computer-generated environment includes an augmented reality environment that includes a representation of the physical environment concurrently displayed with the virtual content, and wherein the change in appearance in the virtual content is displayed concurrently with a portion of the representation of the physical environment that is displayed via the display generation component in regions adjacent to the virtual content.

45. The non-transitory computer-readable storage medium of claim 31, wherein the one or more programs include instructions that, when executed by the one or more processors, cause the computer system to:
- after changing the appearance of the portion of virtual content displayed at the position corresponding to the current location of the first portion of the first physical object without changing the appearance of the portion of the virtual content displayed at the position corresponding to the second portion of the first physical object, detect additional movement of the first physical object in the physical environment; and
- in response to detecting the additional movement of the first physical object in the physical environment, change the appearance of another portion of the virtual content displayed at a position corresponding to the current location of the second portion of the first physical object.

\* \* \* \* \*

UNITED STATES PATENT AND TRADEMARK OFFICE
CERTIFICATE OF CORRECTION

PATENT NO. : 11,615,596 B2
APPLICATION NO. : 17/483722
DATED : March 28, 2023
INVENTOR(S) : Faulkner et al.

Page 1 of 1

It is certified that error appears in the above-identified patent and that said Letters Patent is hereby corrected as shown below:

On the Title Page

Item (72) Inventors, please delete "Jeffrey M. Faulkner, San Francisco, CA (US); Stephen O. Lemay, Palo Alto, CA (US); William A. Sorrentino, III, Mill Valley, CA (US); Jonathan Ive, San Francisco, CA (US); Kristi E. S. Bauerly, Los Gatos, CA (US)" and please insert -- Jeffrey M. Faulkner, San Francisco, CA (US); Stephen O. Lemay, Palo Alto, CA (US); William A. Sorrentino, III, Mill Valley, CA (US); Jonathan Ive, San Francisco, CA (US); Kristi E. S. Bauerly, Los Gatos, CA (US), Peter D. Anton, Portola Valley, CA (US); Alan C. Dye, San Francisco, CA (US) --.

Signed and Sealed this
Fourteenth Day of October, 2025

John A. Squires
*Director of the United States Patent and Trademark Office*